(12) United States Patent
Hanna

(10) Patent No.: US 9,495,526 B2
(45) Date of Patent: Nov. 15, 2016

(54) EFFICIENT PREVENTION OF FRAUD

(71) Applicant: Eyelock, Inc., Caguas, PR (US)

(72) Inventor: Keith J. Hanna, New York, NY (US)

(73) Assignee: Eyelock LLC, New York, NY (US)

( * ) Notice: Subject to any disclaimer, the term of this patent is extended or adjusted under 35 U.S.C. 154(b) by 0 days.

(21) Appl. No.: 13/836,476

(22) Filed: Mar. 15, 2013

(65) Prior Publication Data

US 2014/0283113 A1    Sep. 18, 2014

(51) Int. Cl.
| | |
|---|---|
| *G06F 7/04* | (2006.01) |
| *G06F 17/30* | (2006.01) |
| *H04N 7/16* | (2011.01) |
| *G06F 21/32* | (2013.01) |
| *G06Q 20/40* | (2012.01) |

(52) U.S. Cl.
CPC .......... *G06F 21/32* (2013.01); *G06Q 20/4016* (2013.01); *G06Q 20/40145* (2013.01); *G06F 2221/2113* (2013.01); *G06Q 20/401* (2013.01)

(58) Field of Classification Search
CPC ................ G06Q 20/316; G06Q 20/401; G06Q 20/4014; G06Q 20/40145; G06Q 20/4016; G06F 21/316
See application file for complete search history.

(56) References Cited

U.S. PATENT DOCUMENTS

| | | | |
|---|---|---|---|
| 4,641,349 A | 2/1987 | Flom et al. | |
| 4,654,877 A | 3/1987 | Shimoni et al. | |
| 5,259,040 A | 11/1993 | Hanna | |
| 5,291,560 A | 3/1994 | Daugman | |
| 5,488,675 A | 1/1996 | Hanna | |
| 5,572,596 A | 11/1996 | Wildes et al. | |
| 5,581,629 A | 12/1996 | Hanna et al. | |
| 5,613,012 A | 3/1997 | Hoffman et al. | |
| 5,615,277 A | 3/1997 | Hoffman | |

(Continued)

FOREIGN PATENT DOCUMENTS

| | | |
|---|---|---|
| KR | 101010008 | 1/2011 |
| WO | WO-2010/062371 | 6/2010 |
| WO | WO-2011/093538 | 8/2011 |

OTHER PUBLICATIONS

B. Galvin, et al., Recovering Motion Fields: An Evaluation of Eight Optical Flow Algorithms, Proc. of the British Machine Vision Conf. (1998).

(Continued)

*Primary Examiner* — Daniel Potratz
(74) *Attorney, Agent, or Firm* — Foley and Lardner LLP; John D. Lanza; Paul M. H. Pua

(57) ABSTRACT

This disclosure is directed to methods and systems for managing difficulty of use and security for a transaction. A transaction manager operating on a computing device may determining a range of possible steps for a transaction comprising security measures available for the transaction. The transaction manager may identify a threshold for a security metric to be exceeded for authorizing the transaction, the security metric to be determined based on performance of steps selected for the transaction. The transaction manager may select for the transaction at least one step from the range of possible steps, based on optimizing between (i) a difficulty of use quotient of the transaction from subjecting a user to the at least one step, and (ii) the security metric relative to the determined threshold.

20 Claims, 40 Drawing Sheets

(56) References Cited

U.S. PATENT DOCUMENTS

| | | |
|---|---|---|
| 5,737,439 A | 4/1998 | Lapsley et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,064,752 A | 5/2000 | Rozmus et al. |
| 6,069,967 A | 5/2000 | Rozmus et al. |
| 6,144,754 A | 11/2000 | Okano et al. |
| 6,192,142 B1 | 2/2001 | Pare et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 | 3/2004 | Hanna et al. |
| 6,760,467 B1 | 7/2004 | Min et al. |
| 6,761,308 B1 | 7/2004 | Hanna et al. |
| 6,850,631 B1 | 2/2005 | Oda et al. |
| 6,917,695 B2 | 7/2005 | Teng et al. |
| 6,980,670 B1 | 12/2005 | Hoffman et al. |
| 6,985,608 B2 | 1/2006 | Hoffman et al. |
| 7,095,901 B2 | 8/2006 | Lee et al. |
| 7,139,444 B2 | 11/2006 | Ameline et al. |
| 7,146,027 B2 | 12/2006 | Kim et al. |
| 7,248,719 B2 | 7/2007 | Hoffman et al. |
| 7,271,939 B2 | 9/2007 | Kono |
| 7,385,626 B2 | 6/2008 | Aggarwal et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,797,606 B2 | 9/2010 | Chabanne |
| 7,869,627 B2 | 1/2011 | Northcott et al. |
| 7,929,732 B2 | 4/2011 | Bringer et al. |
| 7,942,314 B1 | 5/2011 | Grimm et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,059,858 B2 | 11/2011 | Brundage et al. |
| 8,092,021 B1 | 1/2012 | Northcott et al. |
| 8,132,912 B1 | 3/2012 | Northcott et al. |
| 8,170,295 B2 | 5/2012 | Fujii et al. |
| 8,233,680 B2 | 7/2012 | Bringer et al. |
| 8,243,133 B1 | 8/2012 | Northcott et al. |
| 8,279,042 B2 | 10/2012 | Beenau et al. |
| 8,317,325 B2 | 11/2012 | Raguin et al. |
| 8,443,202 B2 * | 5/2013 | White .................. G06F 21/32 380/258 |
| 8,572,391 B2 * | 10/2013 | Golan .................. G06F 21/40 705/72 |
| 8,584,219 B1 * | 11/2013 | Toole .................. G06F 21/60 726/25 |
| 8,745,698 B1 * | 6/2014 | Ashfield .............. H04L 63/08 726/26 |
| 2002/0138371 A1 | 9/2002 | Lawrence et al. |
| 2004/0036574 A1 | 2/2004 | Bostrom |
| 2005/0084137 A1 | 4/2005 | Kim et al. |
| 2006/0074986 A1 | 4/2006 | Mallalieu et al. |
| 2006/0153429 A1 | 7/2006 | Gehlen et al. |
| 2006/0156385 A1 * | 7/2006 | Chiviendacz ......... G06F 21/36 726/2 |
| 2006/0239514 A1 | 10/2006 | Watanabe et al. |
| 2006/0269152 A1 | 11/2006 | Fenney |
| 2007/0211922 A1 | 9/2007 | Crowley et al. |
| 2009/0074256 A1 | 3/2009 | Haddad |
| 2009/0097715 A1 | 4/2009 | Cottard et al. |
| 2009/0161925 A1 | 6/2009 | Cottard et al. |
| 2009/0231096 A1 | 9/2009 | Bringer et al. |
| 2010/0014720 A1 | 1/2010 | Hoyos et al. |
| 2010/0021016 A1 | 1/2010 | Cottard et al. |
| 2010/0074477 A1 | 3/2010 | Fujii et al. |
| 2010/0127826 A1 | 5/2010 | Saliba et al. |
| 2010/0182456 A1 | 7/2010 | Kim et al. |
| 2010/0246903 A1 | 9/2010 | Cottard |
| 2010/0278394 A1 | 11/2010 | Raguin et al. |
| 2010/0310070 A1 | 12/2010 | Bringer et al. |
| 2011/0096187 A1 | 4/2011 | Steinberg et al. |
| 2011/0158486 A1 | 6/2011 | Bringer et al. |
| 2011/0194738 A1 | 8/2011 | Choi et al. |
| 2011/0206288 A1 | 8/2011 | Lee et al. |
| 2011/0277518 A1 | 11/2011 | Lais et al. |
| 2011/0317893 A1 | 12/2011 | Ernvik et al. |
| 2012/0240223 A1 | 9/2012 | Tu |
| 2012/0257797 A1 | 10/2012 | Leyvand et al. |
| 2012/0268241 A1 | 10/2012 | Hanna et al. |
| 2012/0328164 A1 | 12/2012 | Hoyos et al. |
| 2014/0189829 A1 * | 7/2014 | McLachlan ........ G06Q 20/4014 726/6 |

OTHER PUBLICATIONS

International Search Report on PCT/US2013/032830 dated Dec. 20, 2013.
J. R. Bergen, et al., Hierarchical Model-Based Motion Estimation, European Conf. on Computer Vision (1993).
K. Nishino, et al., The World in an Eye, IEEE Conf. on Pattern Recognition, vol. 1, at pp. 444-451 (Jun. 2004).
Office Action on U.S. Appl. No. 13/836,668 dated Oct. 23, 2014.
Office Action on U.S. Appl. No. 13/836,770 dated Oct. 3, 2014.
R. P. Wildes, Iris Recognition: An Emerging Biometric Technology, Proc. IEEE 85(9) at pp. 1348-1363 (Sep. 1997).
Written Opinion on PCT/US2013/032830 dated Dec. 20, 2013.

* cited by examiner

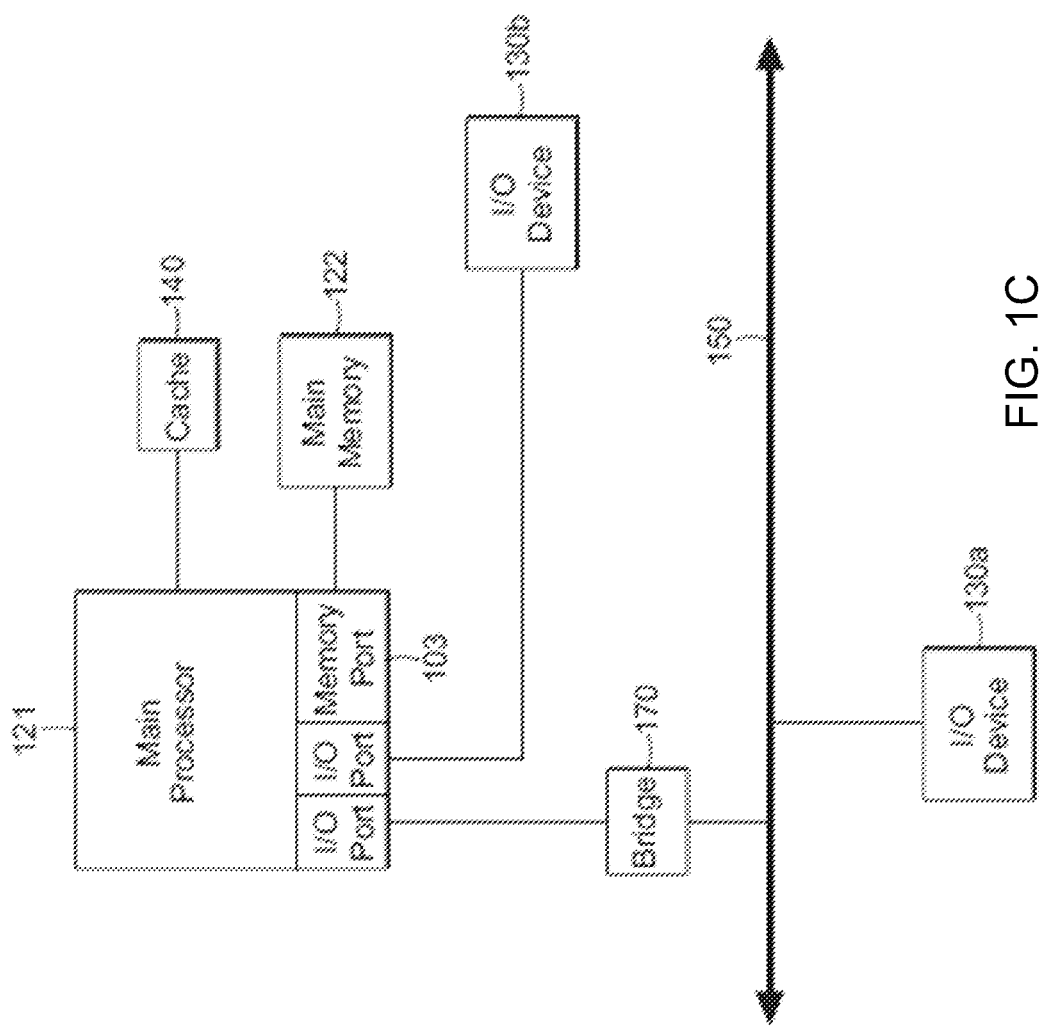

Figure 2B

| Feature number | Feature | N = No. of Steps | D = Difficulty of Steps | Q = Difficulty-of-Use Quotient | P = (Typ.) Example Risk Mitigation (can vary widely between transactions) | P = (Typ.) Example *Minimum* Risk Mitigation (can vary) |
|---|---|---|---|---|---|---|
| 1 | GPS | 0 | 0 | 0 | *0.7* | *0.5* |
| 2 | SMS code reading and entry | 3 | 1 | 3 | 0.9 | 0.9 |
| 3 | PIN entry | 1 | 1 | 1 | 0.7 | 0.7 |
| 4 | Complex Password Entry | 1 | 4 | 4 | 0.8 | 0.8 |
| 5 | Know Your Customer (KYC information) | 4 | 3 | 12 | 0.97 | 0.97 |
| 6 | Unique Device ID | 0 | 0 | 0 | 0.9 | 0.9 |
| 7 | Scan Code on Device | 1 | 3 | 3 | 0.9 | 0.9 |
| 8 | Biometric Match - Fingerprint | 1 | 2 | 2 | *0.95* | *0.5* |
| 9 | Biometric Match - Iris | 1 | 1 | 1 | *0.99* | *0.5* |
| 10 | Biometric Match - Face | 1 | 1 | 1 | *0.8* | *0.5* |
| 11 | Biometric Liveness Measure - Face | 1 | 1 | 1 | *0.7* | *0.7* |
| 12 | Biometric Liveness Measure - Fingerprint | 1 | 1 | 1 | *0.7* | *0.7* |
| 13 | Biometric Deterrent Measure - Face | 1 | 1 | 1 | *0.95* | *0.95* |
| 14 | Biometric Deterrent Measure - Fingerprint | 1 | 2 | 2 | 0.7 | 0.7 |

| Feature number | Feature | N = Number of Steps | D = Difficulty of Steps | Q = Difficulty-of-Use Quotient | P = Example Risk Mitigation (can vary widely from transaction to transaction) | P = Example *Minimum* Risk Mitigation (can vary) |
|---|---|---|---|---|---|---|
| A 1 | Unique Device ID | 0 | 0 | 0 | *0.9* | 0.9 |
| A 1b | Unique Device ID with KYC performed at device registration or previous transaction | 0 | 0 | 0 | *0.996* | 0.95 |
| A 2 | Biometric Match - Fingerprint | 1 | 2 | 2 | *0.95* | 0.5 |
| A 2b | Biometric Match - Fingerprint, with Iris collected at device registration or at previous transaction | 1 | 2 | 2 | *0.999* | 0.5 |
| A 3 | Biometric Match - Iris | 1 | 1 | 1 | *0.99* | 0.5 |
| A 4 | Biometric Match - Face | 1 | 1 | 1 | *0.8* | 0.5 |
| A 4b | Biometric Match – Face, with iris collected at device registration or at previous transaction | 1 | 1 | 1 | *0.997* | 0.5 |

Figure 2C

| Index | Transaction Value | Required Combined Risk Mitigation |
|---|---|---|
| 1 | $1 | 0.95 |
| 2 | $5 | 0.96 |
| 3 | $10 | 0.97 |
| 4 | $50 | 0.98 |
| 5 | $100 | 0.985 |
| 6 | $2000 | 0.99 |
| 7 | $50000 | 0.999 |

Figure 2D

| Transaction # | Biometric Data in Field of View of Camera | Comment on Biometric Data |
|---|---|---|
| 1 |  | User's face data is shifted to the right of the field of view. Face image may be too large with too much details. |
| 2 |  | User's face data is bright, rotated and zoomed out |
| 3 |  | User's face data is rotated and zoomed out, but sufficient features for recognition |
| 4 | 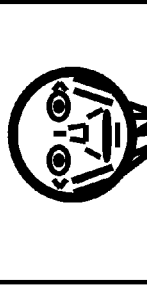 | User's face data doesn't appear similar to that in other transactions, due to appearance change (e.g. beard growth) or due to a different (fraudulent) user |
| 5 | 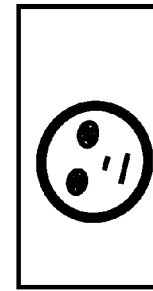 | User's face data is bright, rotated and zoomed out |

Figure 3B

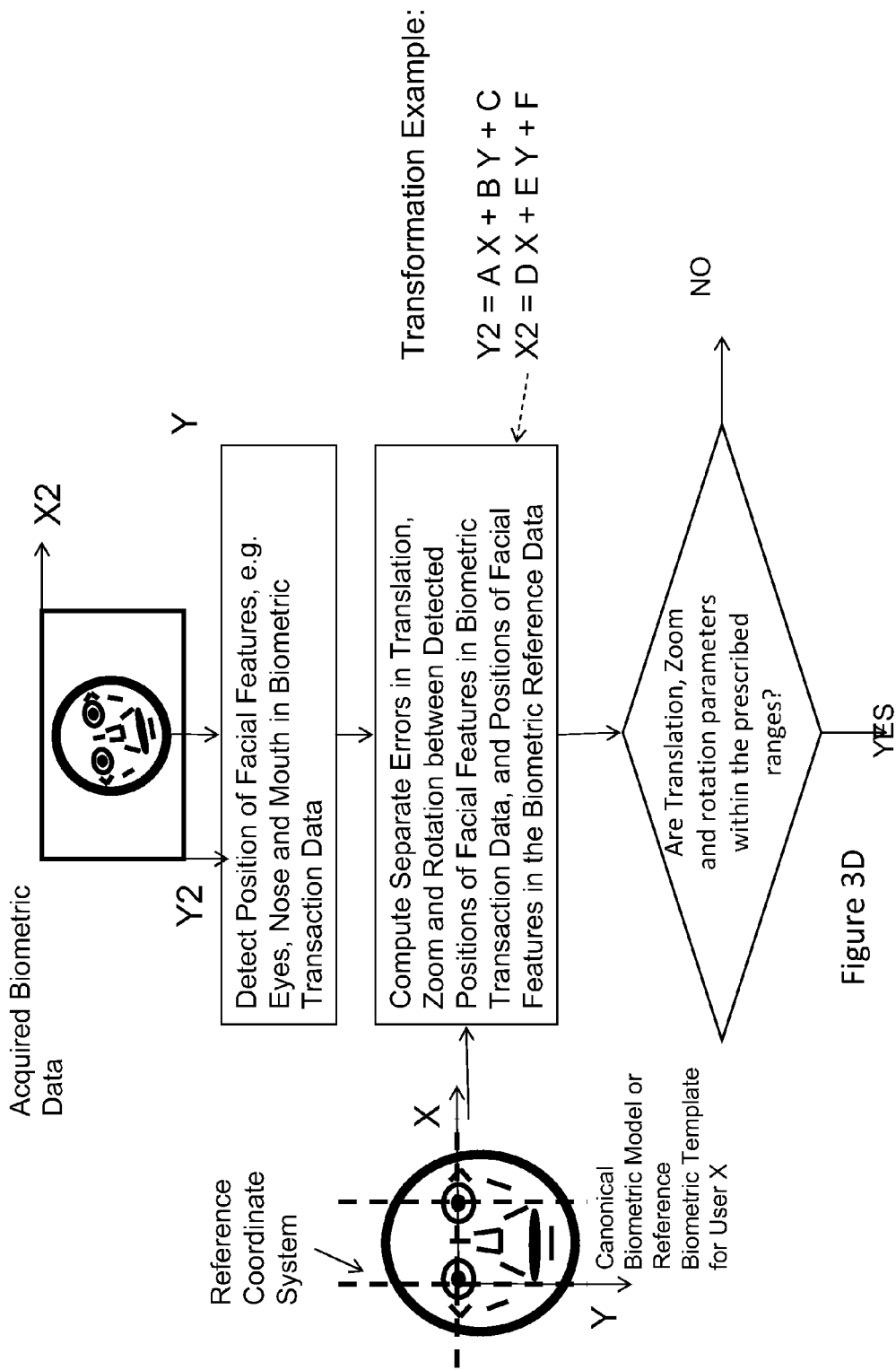

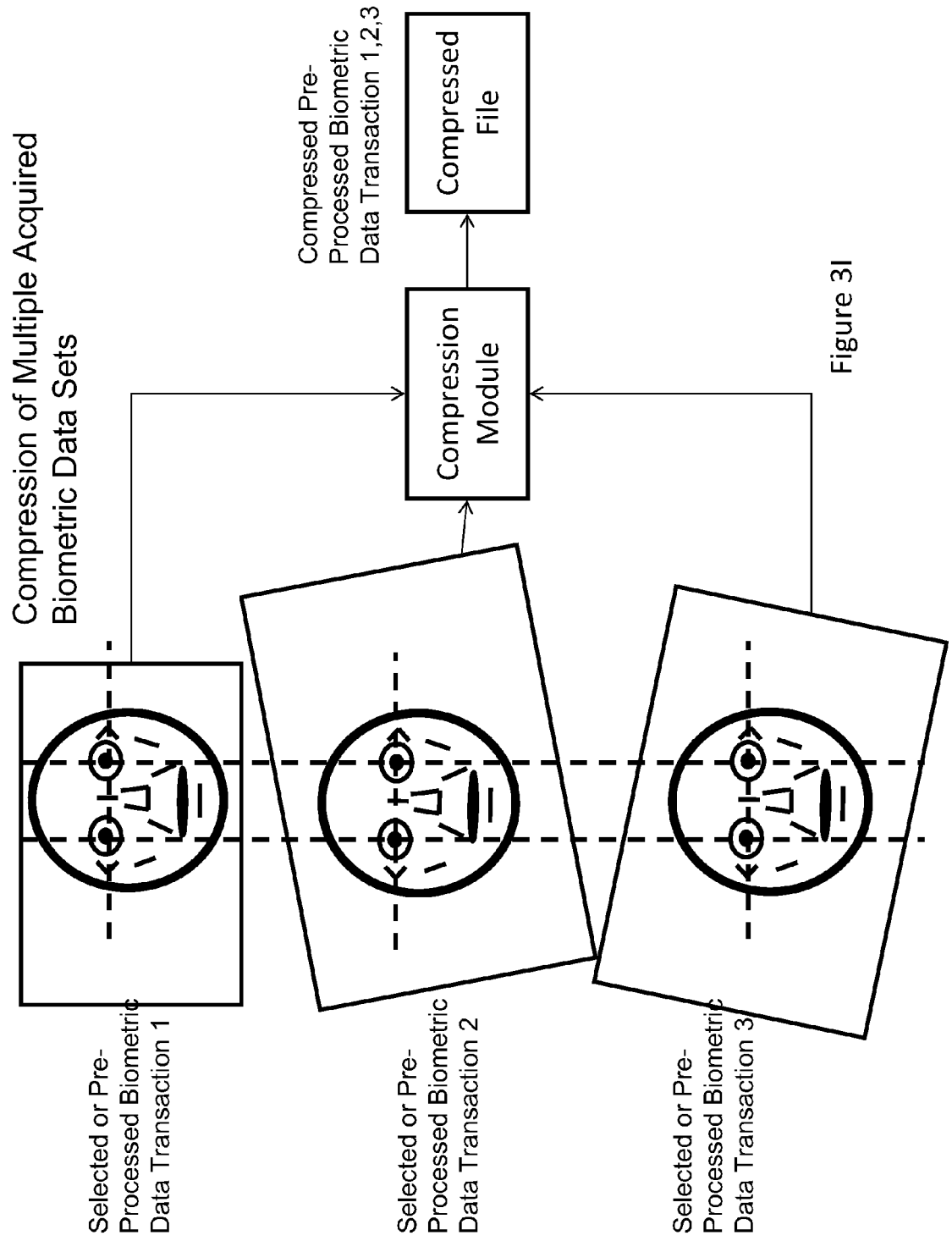

Example image from data set

| Data Set | Compressed File Size |
|---|---|
| Unregistered Data Set | 928KB |
| Registered Data Set | 780KB |

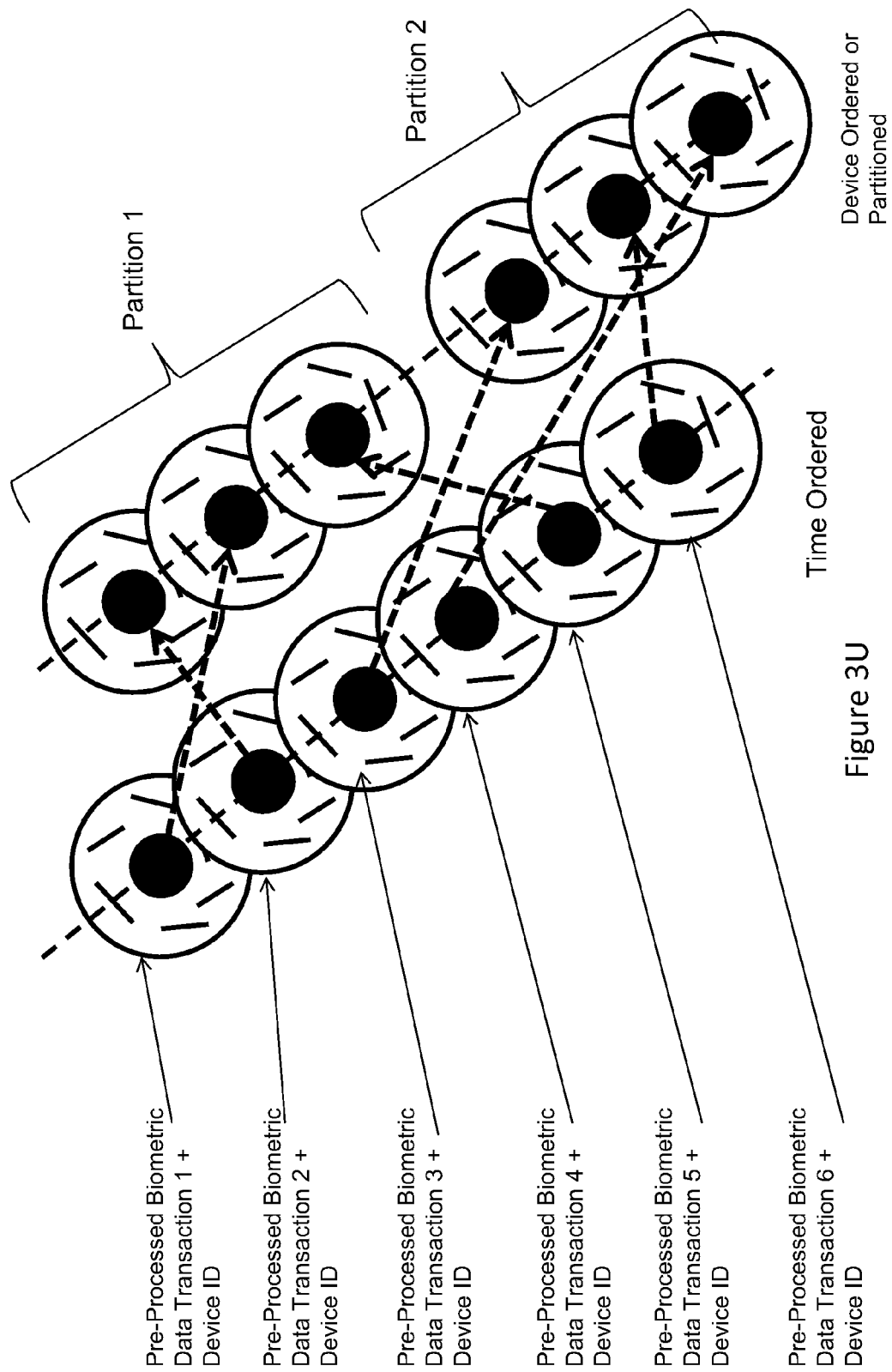

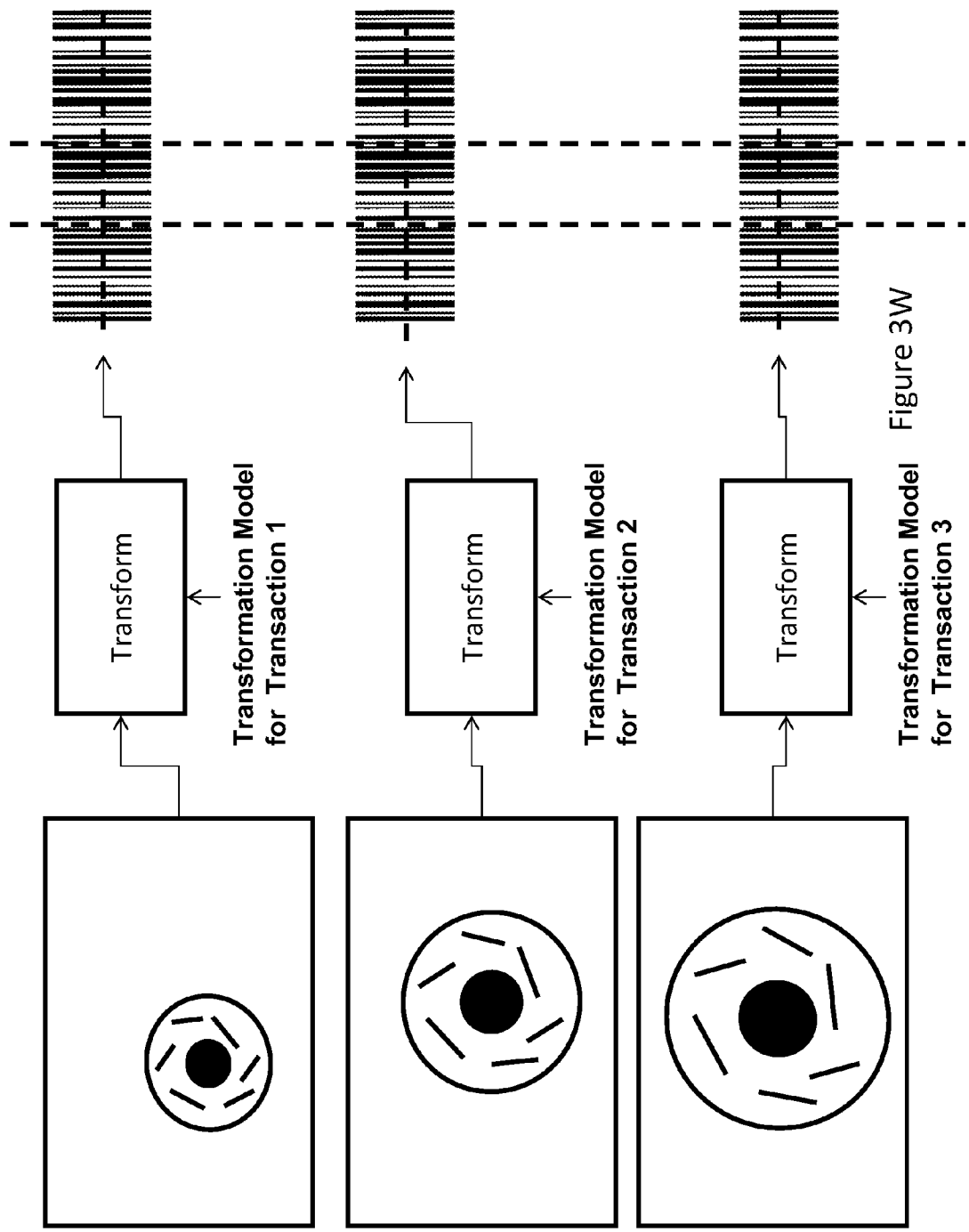

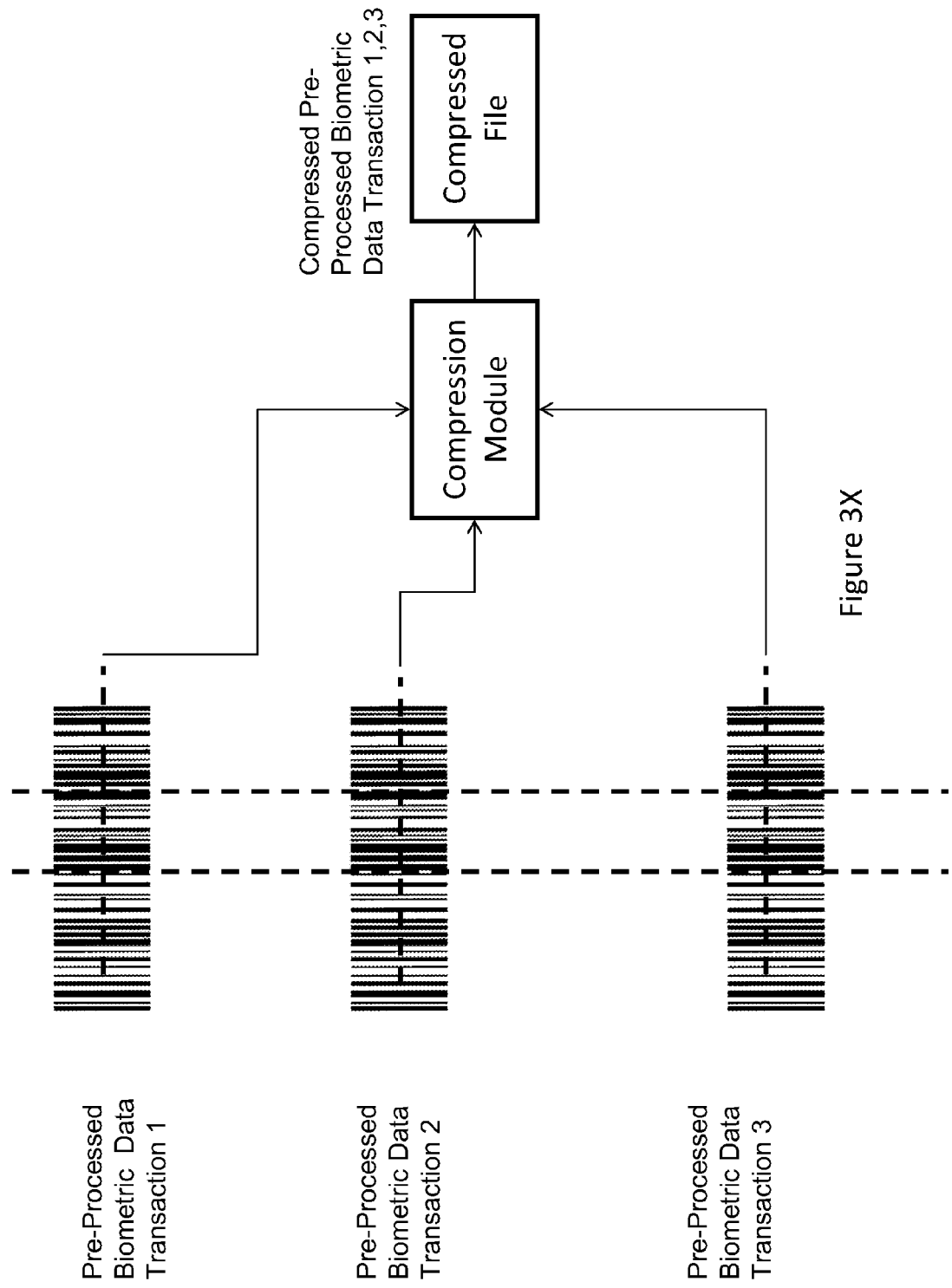

EFFICIENT PREVENTION OF FRAUD

FIELD OF THE DISCLOSURE

This disclosure relates generally to systems and methods for prevention of fraud. In particular, this disclosure relates to systems and methods wherein security measures comprising biometric and non-biometric features are deployed on electronic devices and risk assessment needs are performed to prevent fraudulent transactions.

BACKGROUND

The diversity and number of computing devices is increasing exponentially. For example, there are hand-held devices such as smart-phones and tablets, reading devices that can also be used for web purchases, and also traditional desk-bound computing platforms. Each of these platforms may have different hardware and software capabilities, that can be used to perform transactions. Some of these capabilities may provide s security measure for preventing fraud, for example. However, these capabilities and features can change rapidly from product release to product release. Some of these features may not be available all the time for any given transaction. For example, GPS (Global Positioning System) features of a device may not be available indoors. It is therefore difficult to rely on a single feature as a security measure for protecting the integrity of every transaction, or even a subset of transactions.

SUMMARY

In one aspect, the disclosure is directed at a method of managing difficulty of use and security for a transaction. The method may include determining, by a transaction manager operating on a computing device, a range of possible steps for a transaction comprising security measures available for the transaction. The transaction manager may identify a threshold for a security metric to be exceeded for authorizing the transaction, the security metric to be determined based on performance of steps selected for the transaction. The transaction manager may select for the transaction at least one step from the range of possible steps, based on optimizing between (i) a difficulty of use quotient of the transaction from subjecting a user to the at least one step, and (ii) the security metric relative to the determined threshold.

The transaction manager may calculate the difficulty of use quotient based on the at least one step selected. Each of the at least one step may be assigned a score based on at least one of: an amount of action expected from the user, an amount of attention expected from the user, and an amount of time expected of the user, in performing the respective step. The transaction manager may update the difficulty of use quotient based on a modification in remaining steps of the transaction, the modification responsive to a failure to satisfy a requirement of at least one selected step. The transaction manager may identify the threshold for the security metric based on at least one of: a value of the transaction, risk associated with a person involved in the transaction, risk associated with a place or time of the transaction, risk associated with a type of the transaction, and security measures available for the transaction. The transaction manager may select the at least one step from the range of possible steps such that successful performance of the at least one step results in the identified threshold being exceeded.

The transaction manager may update the security metric responsive to a failure to satisfy a requirement of at least one selected step. The transaction manager may update the security metric responsive to a modification in remaining steps of the transaction. The device may acquire biometric data as part of the selected at least one step, the biometric data comprising at least one of: iris, face and fingerprint. The device may acquire biometric data as part of the selected at least one step, the biometric data for at least one of liveness detection and biometric matching. The device may acquire biometric data as a prerequisite of one of the selected at least one step. The device may performing biometric matching as a prerequisite of one of the selected at least one step.

The transaction manager may at least require a step for acquiring a first type of biometric data, in the event of a failure to satisfy a requirement of at least one selected step. The transaction manager may at least requiring a step for acquiring a second type of biometric data if a first type of biometric data is unavailable, of insufficient quality, or fails a liveness detection or biometric matching. The device may perform liveness detection as part of the selected at least one step. The device may perform liveness detection as a prerequisite of one of the selected at least one step.

The transaction manager may at least requiring a step for performing liveness detection, in the event of a failure to satisfy a requirement of at least one selected step. The device may perform a deterrence activity as part of the selected at least one step. The device may perform a deterrence activity as a prerequisite of one of the selected at least one step. The transaction manager may at least require a deterrence activity, in the event of a failure to satisfy a requirement of at least one selected step.

In another aspect, the disclosure is directed to a system for managing difficulty of use and security for a transaction. The system may include a transaction manager operating on a computing device. The transaction manager may determine a range of possible steps for a transaction comprising security measures available for the transaction. The transaction manager may identify a threshold for a security metric to be exceeded for authorizing the transaction, the security metric to be determined based on performance of steps selected for the transaction. The transaction manager may select, for the transaction, at least one step from the range of possible steps, based on optimizing between (i) a difficulty of use quotient of the transaction from subjecting a user to the at least one step, and (ii) the security metric relative to the determined threshold.

In certain aspects, this disclosure is directed to systems and methods wherein biometrics of an individual person are acquired using mobile and/or fixed devices in the course of a transaction, and stored in a database as biometric receipts for later retrieval in case of a dispute or other reason. In order to reduce the database storage space required and/or transmission bandwidth for transferring the biometric data, the present systems and methods can provide for efficient compression of biometric data while at the same time ensuring that the biometric data is of sufficient quality for automatic or manual recognition when retrieved. In certain embodiments, the system may allow for compression of biometric data for optimal subsequent automatic or manual recognition, by optimally selecting which biometric data to acquire. The selection may be based on biometric quality criteria, at least one of which relates to a biometric quality metric not related to compression, as well as a criteria which relates to a biometric quality metric related to compression.

In one aspect, the disclosure is directed to a method for selective identification of biometric data for efficient compression. The method may include determining, by an evaluation module operating on a biometric device, if a set of acquired biometric data satisfies a quality threshold for subsequent automatic or manual recognition, while satisfying a set of predefined criteria for efficient compression of a corresponding type of biometric data, the determination performed prior to performing data compression on the acquired biometric data. The evaluation module may classify, decide or identify, based on the determination, whether to retain the acquired set of acquired biometric data for subsequent data compression.

The evaluation module may determine at least one of: an orientation, a dimension, a location, a brightness and a contrast of a biometric feature within the acquired biometric data. The evaluation module may determine if the set of acquired biometric data meets a threshold for data or image resolution. The evaluation module may determine an amount of distortion that data compression is expected to introduce to the set of biometric data, prior to storing the set of biometric data in a compressed format. A processor of the biometric device may preprocess the acquired set of biometric data prior to data compression. The preprocessing may include at least one of performing: an image size adjustment, an image rotation, an image translation, an affine transformation, a brightness adjustment, and a contrast adjustment.

The processor may transform the set of biometric data to minimize least squared error between corresponding features in the transformed set of biometric data and a reference template, prior to data compression. A compression module of the biometric device may calculate a delta image or delta parameters between the set of biometric data and another set of biometric data, for compression. A classification module of the biometric device may group the set of biometric data with one or more previously acquired sets of biometric data that are likely to be, expected to be, or known to be from a same subject. The compression module may calculate a delta image or delta parameters between at least two of the biometric data sets, for compression. The compression module may perform a first level of compression on a first portion of the acquired set of biometric data, and a second level of compression on a second portion of the acquired set of biometric data. A guidance module of the biometric device may provide, responsive to the determination, guidance to a corresponding subject to aid acquisition of an additional set of biometric data from the subject.

In another aspect, the disclosure is directed at a system for selective identification of biometric data for efficient compression. The system may include a sensor, acquiring a set of acquired biometric data. An evaluation module may determine, prior to performing data compression on the acquired set of biometric data, if the set of acquired biometric data satisfies a quality threshold for subsequent automatic or manual recognition, while satisfying a set of predefined criteria for efficient compression of a corresponding type of biometric data. The evaluation module may decide, identify or classify, based on the determination, whether to retain the acquired set of acquired biometric data for subsequent data compression.

The evaluation module may determine at least one of: an orientation, a dimension, a location, a brightness and a contrast of a biometric feature within the acquired biometric data. The evaluation module may determine if the set of acquired biometric data meets a threshold for data or image resolution. The evaluation module may determine an amount of distortion that data compression is expected to introduce to the set of biometric data, prior to storing the set of biometric data in a compressed format. The processor may preprocess the acquired set of biometric data prior to data compression. The preprocessing may include at least one of performing: an image size adjustment, an image rotation, an image translation, an affine transformation, a brightness adjustment, and a contrast adjustment. The processor may transform the set of biometric data to minimize least squared error between corresponding features in the transformed set of biometric data and a reference template, prior to data compression.

The processor may calculate a delta image or delta parameters between the set of biometric data and another set of biometric data, for compression. The processor or a classification module may group the set of biometric data with one or more previously acquired sets of biometric data that are likely to be, expected to be, or known to be from a same subject, and calculating a delta image or delta parameters between at least two of the biometric data sets, for compression. The processor or a compression module may perform a first level of compression on a first portion of the acquired set of biometric data, and a second level of compression on a second portion of the acquired set of biometric data. A guidance mechanism or module may provide, responsive to the determination, guidance to a corresponding subject to aid acquisition of an additional set of biometric data from the subject.

In some aspects, this disclosure relates to systems and methods wherein biometrics of an individual person are acquired using mobile and/or fixed devices in the course of a transaction. A biometric device may blend acquired biometric data with data relating to the transaction into a single monolithic biometric image or receipt, to be stored as a biometric receipt in a database for later retrieval in case of a dispute or other reason. The biometric device displays the blended image to the person engaged in the transaction store, with appropriate details for inspection, prior to completion of the transaction as a deterrent for possible fraud or dispute. The displayed image is designed to perceptibly and convincingly demonstrate to the person involved in the transaction, that components on the image (e.g., acquired biometric data, and data relating to the traction) are purposefully integrated together to provide an evidentiary record of the person having performed and accepted the transaction.

In one aspect, the disclosure is directed to a system for managing risk in a transaction with a user, which presents to the user, with sufficient detail for inspection, an image of the user blended with information about the transaction. The system may include a processor of a biometric device, for blending an acquired image of a user of the device during a transaction with information about the transaction. The acquired image may comprise an image of the user suitable for manual or automatic recognition. The information may include a location determined via the device, an identifier of the device, and a timestamp for the image acquisition. The system may include a display, for presenting the blended image to the user. The presented image may show purposeful integration of the information about the transaction with the acquired image, to comprise a record of the transaction to be stored if the user agrees to proceed with the transaction.

In some embodiments, the display presents the blended image, the presented image comprising a deterrent for fraud, abuse or dispute. The display may present the blended image, the presented image further comprising an image of the user's face with sufficient detail for inspection by the user prior to proceeding with the transaction. The display may present the blended image, the presented image further including the information about the transaction in textual form with sufficient detail for inspection by the user prior to proceeding with the transaction. The display may present the blended image, the presented image further including the information about the transaction in textual form having a specific non-horizontal orientation and having sufficient detail for inspection by the user prior to proceeding with the transaction. The display may present the blended image, the presented image further including watermarking or noise features that permeate across the image of the user and the information about the transaction, on at least a portion of the presented image.

The display may present the blended image, the presented image further displaying the information about the transaction in textual form using at least one of: a uniform font type, a uniform font size, a uniform color, a uniform patterned scheme, a uniform orientation, a specific non-horizontal orientation, and one or more levels of opacity relative to a background. The display may present to the user an agreement of the transaction for inspection or acceptance by the user. The display may further present to the user an indication or warning that the presented image is to be stored as a record of the transaction if the user agrees to proceed with the transaction. The display may present the blended image, the presented image including a region of influence of biometric deterrent within which the information about the transaction is purposefully integrated, and a region of influence of biometric matching that excludes the information.

In another aspect, the disclosure is directed to a method of managing risk in a transaction with a user. The method may include acquiring, by a device of a user during a transaction, biometric data comprising an image of the user suitable for manual or automatic recognition. The device may blend the acquired image of the user with information about the transaction, the information comprising a location determined via the device, an identifier of the device, and a timestamp for the image acquisition. The device may display the blended image to the user, the displayed image showing purposeful integration of the information about the transaction with the acquired image, and an indication that the blended image is to be stored as a record of the transaction if the user agrees to proceed with the transaction.

In various embodiments, the device acquires the image of the user based on one or more criteria for efficient image compression. The device may perform liveness detection of the user during the transaction. The device may blend the acquired image of the user with information about the transaction into a single alpha-blended image. The device may blend the information about the transaction on a portion of the acquired image proximate to but away from at least one of: a face and an eye of the user. The device may blend the information about the transaction within a region of influence of biometric deterrent that excludes a face of the user, and excluding the information from a region of influence of biometric matching that includes the face.

The device may incorporate, in the blended image, watermarking or noise features that permeate across the image of the user and the information about the transaction, on at least a portion of the image presented. The device may present the blended image with the information about the transaction in textual form having a specific non-horizontal orientation and having sufficient detail for inspection by the user prior to proceeding with the transaction. The device may present to the user an indication or warning that the presented image is to be stored as a record of the transaction if the user agrees to proceed with the transaction. The device may store the blended image on at least one of: the device and a server.

BRIEF DESCRIPTION OF THE DRAWINGS

The following figures depict certain illustrative embodiments of the methods and systems described herein, where like reference numerals refer to like elements. Each depicted embodiment is illustrative of these methods and systems and not limiting.

FIGS. 1B and 1C are block diagrams illustrative of embodiments of computing machines for practicing the methods and systems described herein;

FIG. 2B depicts one embodiment of a table for indicating a difficulty of use for various device features;

FIG. 2C depicts one embodiment of a class of risk mitigation features;

FIG. 2D depicts an example embodiment of a table that relates a value of the transaction to an appropriate risk mitigation factor;

FIG. 3B depicts one embodiment of a set of biometric data acquired over a plurality of transactions;

FIGS. 3D and 3E depict example embodiments of an acquisition selection module;

FIG. 3I depicts one embodiment of a system for efficient compression of biometric data sets;

FIG. 3O depicts an illustrative embodiment of a system for efficient compression of biometric data;

FIG. 3U depicts one embodiment of a compression scheme employing grouping;

FIGS. 3W, 3X and 3Y depict embodiments of a system and method for pre-processing or transforming biometric data into encoded data;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for efficient prevention of fraud;

Section C describes embodiments of systems and methods for efficient compression of biometric data; and Section D describes embodiments of systems and methods for efficient biometric deterrent.

A. Network and Computing Environment

Figure 1A:
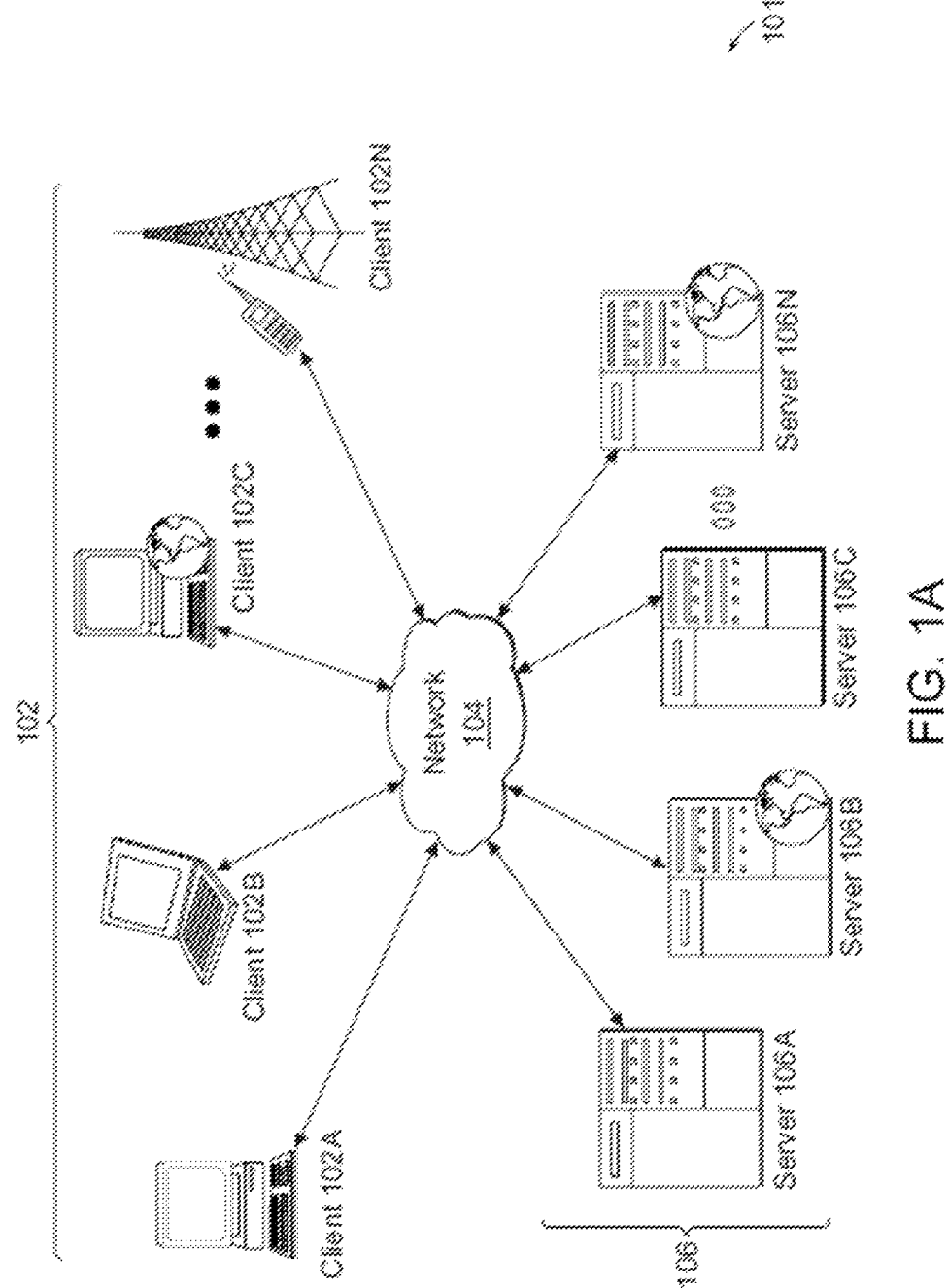
FIG. 1A is a block diagram illustrative of an embodiment of a networked environment with a client machine that communicates with a server.

Before addressing specific embodiments of the present solution, a description of system components and features suitable for use in the present systems and methods may be helpful. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more subnetworks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
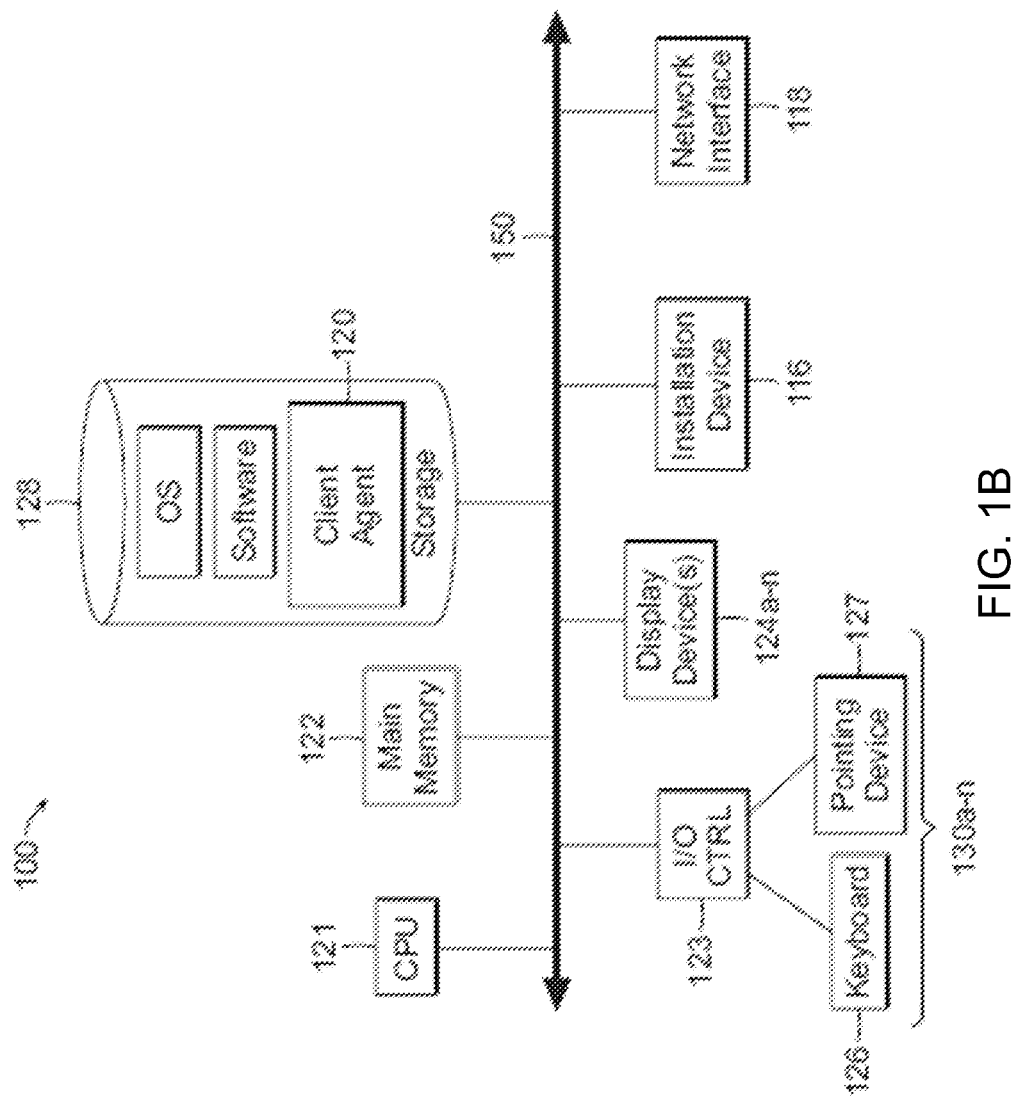

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM), SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Efficient Prevention of Fraud

As disclosed herein, specific embodiments of our transaction systems may use particular combination of features to secure a transaction. Such features may include, for example, PIN number entry, and an SMS message for confirmation. Other features may include biometric recognition. Some of these features may require user action (for example, the acquisition of a biometric, or the entry of a PIN number), while others may not (such as recovery of GPS location). These systems may be configured to select transaction features and steps that minimize risk for the transaction while at the same time minimizing the difficulty of use to the user during the course of the transaction.

Figure 2A:
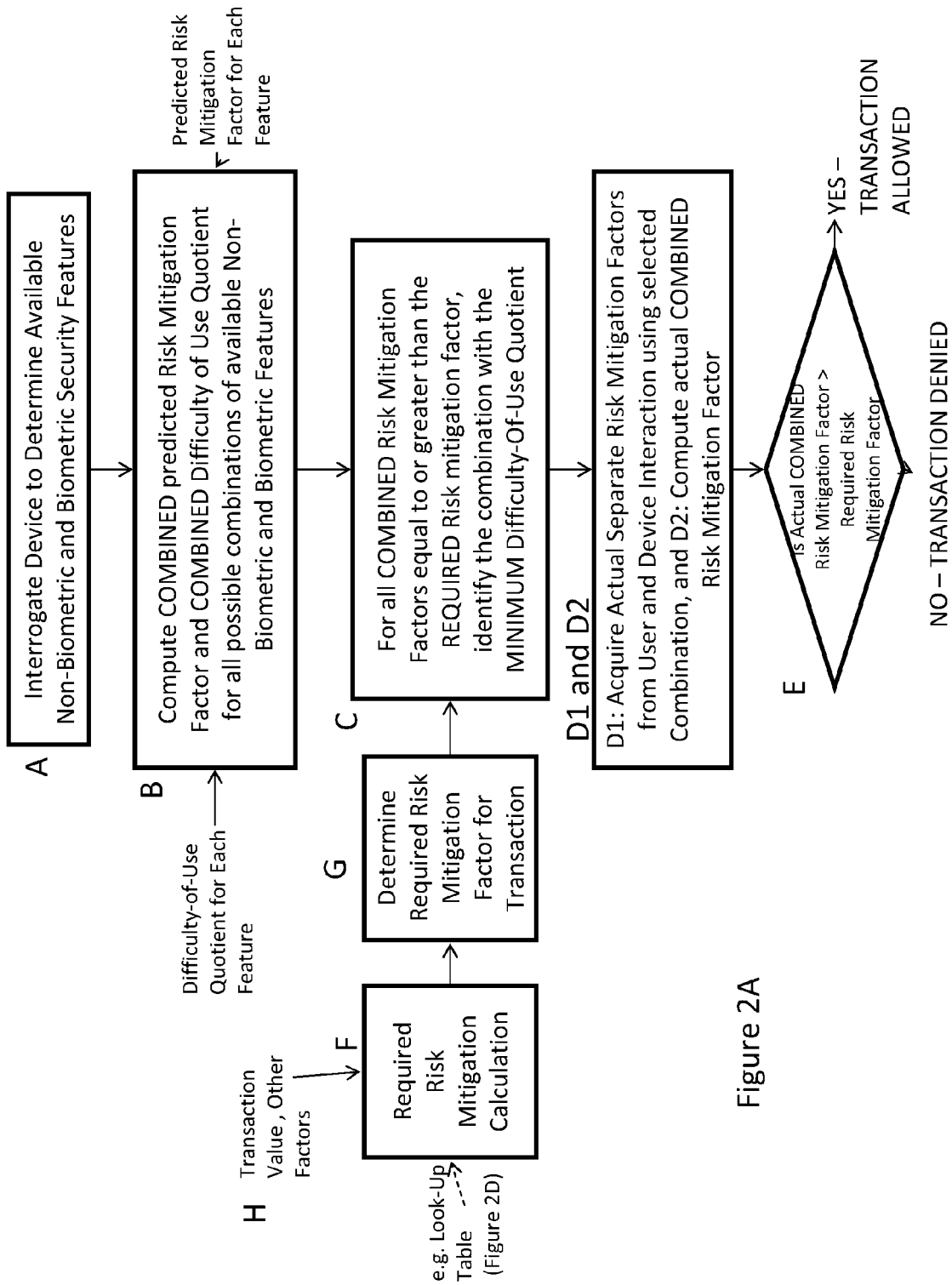
FIG. 2A is a block diagram illustrative one embodiment of a method and system for efficient prevention of fraud.

Referring to FIG. 2A, one embodiment of a method of a system for efficient prevention of fraud is depicted. The system may include one or more modules to perform one or more of the steps disclosed herein. In particular, the system may include a transaction manager for performing the disclosed steps. Certain embodiments of the system disclosed herein may perform one or more steps of the method. For example, the system may first interrogate, access or check a device to determine what security features of the device are available at a particular time to assist in securing a transaction. For features that require user action for example, the system may determine or predict an ease-of-use or difficulty-of-use quotient for performing the user action (e.g., for the user to enter in particular data related to each feature). The system may determine or predict a risk mitigation factor and/or a security metric threshold, corresponding to predicted risk mitigation steps and/or the amount of risk mitigation that may be appropriate or that may occur for the transaction, e.g., based on information that was entered by the user and/or features that are available. Based on the determination, the system may choose one or more specific set of features that minimizes difficulty-of-use (or maximizes ease-of-use) to the user while ensuring that risk associated with the transaction lies below a threshold.

Certain embodiments of the system may focus on minimizing difficulty-of-use while ensuring that risk is acceptable. For example, mobile devices are often used in environments where the user can only enter in small amounts of data, and/or the user is typically in circumstances where it is difficult to do so. For example, it may be more difficult to enter in data on a larger touch-screen compared to a small touch-screen. In such situations, the system may place more emphasize on minimizing difficulty-of-use, rather than minimizing risk, or may use more security features that have a lower difficulty-of-use quotient (like GPS location) in order to compensate for the higher difficulty-of-use quotient for data entry on the smaller screen, so that the eventual risk mitigation is the same on the device with the small screen as on the device with the larger screen. Moreover, some biometrics may be easier to acquire than other biometrics. In an ideal situation, every transaction could be perfectly secured by requiring the user to enter large quantities of data (e.g., security data), and configuring the transaction device to acquire large quantities of data, but the result would be an unwieldy or difficult-to-use system that no-one can use.

The present systems and methods can determine an optimal set of security and transaction features (or steps) for the user, and the optimal set can be identified or selected dynamically, e.g., based on the particular features of the transaction device, and the environment that the device is in. Moreover, if the data collected by certain device features is erroneous, of insufficient quality or incomplete, for example a biometric match score is low due to particular conditions (for example, the user has a cut on their finger preventing a fingerprint match on a biometric sensor that is on the device), then the optimal set of features can be recalculated or re-determined. This may require the user to perform more or different steps, but the system can ensure that the user is to endure a minimum level of difficulty for performing these additional steps.

The system may provide a high confidence in the risk assessment of a transaction. Typically, one may desire such confidence to be higher as the value of the transaction increases. Some embodiments of the system may provide or include a pre-computed table that relates risk to transaction value. The system may use a transaction value to index into the table to obtain a projected or desired risk level or risk threshold. The system may then determine transaction steps that result in a minimum level of difficulty-of-use (e.g., represented by an ease-of-use or difficulty-of-use quotient) for the user to perform to achieve that desired risk level. Thus, in some if not most cases, the system may require the user to perform more difficult steps for higher value transactions. Conversely, the system may determine that lower value transactions may require easier steps.

Difficulty of Use

It may be helpful to define a typical set of security features that may be available through an electronic device, and that may be supported by or considered by embodiments of the disclosed system. The systems and methods are not limited to support for these features, since the difficulty-of-use framework can be used for any security feature. The present systems and methods may define difficulty-of-use for each feature (e.g., transaction steps corresponding to each feature) by, for example, two parameters:

1) N=the number and/or length of steps that a user may perform to provide data required by or related to a specific feature, and
2) D=the level of difficulty or ease of the user in the performance of the steps. The system may, for example use a range of D such D varies from 1.0 to 4.0 depending on the difficulty.

In some embodiments, the system defines, determines or calculates a difficulty (or ease) of use quotient Q, by taking a product of N and D, for example. Various embodiments of formulas involving N and D may be used instead (e.g., N+D), and one or the other parameters may be emphasized over the other (e.g., N over D, or D over N). Specific examples are provided herein. For example, entering a short 4-digit PIN number may be defined as a single step with a difficulty of 1 since 4-digit PINs are relatively simple for a user to remember and there are only 4 digits, whereas entering in a complex password may be defined as a single step but has a difficult of 4 since it may be harder to remember and there are more digits/characters to enter, which can be troublesome and more time-consuming when entering in data. The system may allow vendors and device manufacturers to select and assign specific difficulty-of-use parameters to particular transaction steps.

Referring to FIG. 2B, one embodiment of a table for indicating a difficulty of use for various device features is depicted. In general, there may be two types of features: biometric and non-biometric. The biometric features are discussed later in this disclosure. Non-biometric features may include GPS. By way of illustration, the difficulty-of-use associated with obtaining GPS data may be 0, since the user may not be required to take part in any data entry or to participate in any action. Referring to FIG. 2B, the difficulty-of-use for feature 6—Unique Device ID—may be 0 since the user may not be required to take part in any data entry or to participate in any action to provide the Device ID.

In another example, KYC (Know Your Customer) information may require or involve a high number of steps since there may be many associated questions to answer. Moreover, some of these questions may require a significant number of key stroke entries to answer. In this case, both N and D may be high, resulting in a very large difficulty-of-use quotient of 12, for example. In another example, feature 7 pertains to obtaining "Scan Code on Device". This may involve presenting a mobile device to a bar code scanner at a point of sale location. This may involve only one step as shown in FIG. 2B, however the user may have to orient the mobile device awkwardly and at the correct angle to ensure that the bar code can be read correctly. Therefore, the difficulty of the steps may be relatively high.

In another example, SMS code reading and entry may involve a large number of steps (e.g., 3 steps). Since a SMS signal may have to be received on a phone, the user may have to take out the user's phone from a purse or holder, read the SMS code and then enter the SMS code into a keyboard. Each step is fairly simple, however, and can be assigned low difficulty-of-use values (e.g., 1). Device manufacturers and vendors can include particular features and/or values of N and D to the list, since they may have developed specific technologies that improves data entry or device interaction in some way. In view of the above, the system can provide a quantitative framework to minimize difficulty-of-use for a user on a diverse range of platforms (e.g., devices) while ensuring that a minimum risk mitigation value (or a high security metric) is achieved.

Combining Difficulty of Use Quotients

In order to compute or determine an overall difficulty (or ease) of use quotient, Q_total, for the use of a given set of non-biometric or biometric security features in any given transaction, we can for example assume that each feature is independent of each other in terms of user-action. Therefore, certain embodiments of the systems and methods disclosed herein may accumulate individual feature's ease or difficulty of use quotients Q, over a given set of features. For example, the system may define or describe that a combination equation for Q_total as:

$$Q\_total = Q1+Q2+Q3+ \ldots = N1 \cdot D1 + N2 \cdot D2 + N3 \cdot D3 + \ldots$$

For example, if a set of features relates to GPS, Device ID, Biometric Liveness (face), Biometric Deterrent (face), then Q_total=0+0+1+1=2. In another example, if a set of features relates to Device ID, Biometric Liveness (face), Complex Password Entry, then Q_total=0+1+4=5.

Risk Assessment

Prior to discussing the difficulty-of-use for each feature in more detail, it may be helpful to introduce the concept of risk mitigation afforded by each feature, in the context of the present systems and methods. Each feature activated or selected for a transaction, or the result(s) of comparing data corresponding to the feature (e.g., acquired biometric data, or GPS information) to reference data that may be stored on the device (for example, a biometric template) or on a remote server (for example, the GPS location of a previous transaction), can provides separate or cumulative evidence that the transaction is not fraudulent. Certain implementations of the system may represent the resultant evidence (e.g., evidence of non-fraud, based on each result or set of results) as a probability P of a non-fraud for each feature. A resultant evidence of non-fraud (e.g., an authentic or valid transaction step) may be expressed as a probability that steps of a feature is performed validly or non-fraudulently. The disclosure will address how specific probabilities are assigned, but as an example, in FIG. 2B, the table may provide or indicate a typical example probability (or example risk mitigation factor) for a resulting evidence, and also a typical minimum probability (or example minimum risk mitigation factor) for a resulting evidence.

In many cases the typical minimum probability may be the same as the typical example probability since, for example, there are very few conditions that can change the probability. An example is feature 6 (a unique device ID) which may yield the same result under most if not all conditions (e.g., because no user intervention is expected and/or allowed). Feature 1 (GPS location) may provide evidence of a non-fraudulent transaction outdoors, but may not be able to provide any evidence indoors. A probability of 0.5 may mean that a corresponding feature provided no evidence, or in other words, the likelihood of a fraudulent or non-fraudulent transaction is the same based on the corresponding piece of evidence. Therefore, in the case of GPS for example, the typical example probability and the typical minimum probability may be different.

Addressing Scalability of Risk Assessment

In a given system, a failure rate of only 1% for 100 million transactions per day can result in 1 million transactions in which the user may be left dissatisfied or frustrated. Such occurrences may require intervention by a phone call to a call center, for example. Thus, such a failure rate may not be acceptable in many scalable systems. In some cases, a failure-to-scale over large number of transactions can be a reason why some features, for example biometric features, have not become prevalent on transaction devices (e.g., mobile devices) despite what might seem like an advantage. For example, features 8, 9 and 10 in FIG. 2B are biometric match features based on fingerprint, iris and face respectively. Fingerprint matches can be moderately accurate, and an example typical risk mitigation for such a feature may be listed as 0.95. However, a corresponding example minimum risk mitigation is listed as 0.5—which as discussed earlier, can mean that not much useful information is provided by the result. This may be because fingerprint recognition has a relatively high failure rate compared to requirements for zero or low levels of errors to process hundreds of millions of transactions each day. The relatively high failure rate may be due to dirt on the fingers, or incorrect usage by the user.

Iris matches are even more accurate since the typical iris has much more information than a fingerprint. Therefore, a typical risk mitigation is listed as high as 0.99. However, the minimum risk mitigation may be listed as 0.5 since a user may find himself/herself in an environment where it is difficult for iris recognition to be performed, for example, in an extremely bright outdoor environment. As discussed, this can mean that no information is provided in one of the extreme situations. In another example, face recognition may be typically less accurate than fingerprint or iris recognition in an unconstrained environment, and a typical risk mitigation may be listed as 0.8. However, the typical minimum risk mitigation may be 0.5 since face recognition can fail to perform in many different environments, due to illumination variations for example. This does not mean that biometric matching is not useful for transactions; indeed many transactions can be protected using biometric matching. Rather, other security features can be computed successfully and may be fully scalable over hundreds of millions of transactions, such as biometric liveness or biometric deterrent. These latter features may be emphasized over biometric matching in order to provide a fully scalable transactional system, as discussed herein.

Non-Biometric, Scalable Risk Assessment Features

As discussed, a fully scalable feature is one where the minimum risk mitigation probability is the same, or close to the value of the typical risk mitigation probability. In other words, a fully scalable feature may have inherently no or few outliers in terms of performance. A non-biometric example of such a scalable feature may be feature 6 in FIG. 2B—the Unique Device ID. It may be expected that a device ID can be recovered with certainty in most or every situation, and therefore the typical and risk mitigation probabilities may be equal, and in this case afford a risk mitigation of 0.9. A potential problem with using such non-biometric scalable features is that these features may not contain or acquire any or sufficient information about a person performing the transaction. To address this, the present systems and methods may support one or more biometric, scalable risk assessment features.

Biometric, Scalable Risk Assessment Features

In certain embodiments, there may be classes of biometric, scalable risk assessment features that can be recovered more robustly than typical biometric features. The reasons for the robustness are described in more detail herein. Two such classes may include: biometric liveness, and biometric deterrent.

Biometric Liveness

Biometric liveness may be defined as a measure that a live person is performing a specific transaction or using a specific transaction device. This is as opposed to a spoof image of a person being placed in front of the camera, or a spoof finger being placed on a fingerprint sensor. Liveness can be computed more robustly than matching, for example because biometric liveness is typically computed by comparing measured biometric data against a generic, physical parameter of a model of a live person (e.g. finger temperature), while biometric matching is typically computed by comparing measured biometric data against other measured biometric data recorded for example on a different device at a different time. Inherently, there may be more opportunity for error and mismatch in biometric match computation as compared to biometric liveness computation or detection. A fully or highly scalable biometric transactional system can be achieved by emphasizing liveness over matching, especially in cases where biometric match scores are expected to be poor. For example, referring to the biometric liveness measures in FIG. 2B, it can be seen that features 11 and 12 (face and fingerprint liveness measures) may each have been assigned the same minimum and typical risk mitigation values. As discussed, this is one of the requirements for a fully scalable risk mitigation feature.

Biometric Deterrent

In some implementations, the system may address another class of fully scalable, biometric features, sometimes referred to as biometric deterrent features. These may include biometric features that are acquired for the purposes of registering or storing a biometric record of a transaction with or for a third party, such as a bank, as a deterrent against a fraudulent transaction from occurring or from being attempted or completed. Not all biometrics are powerful or suitable biometric deterrents. For example, to be a strong deterrent, it may be important that simple manual recognition processes can be used so that it is clear to a fraudulent user that the user can be recognized easily or by any of the user's friends and associates, and not just by an anonymous automated recognition process. A face biometric may be an example of a powerful deterrent with a high risk mitigation factor (e.g., feature 13 in FIG. 2B—risk mitigation factor of 0.95). Ironically, fingerprint and iris biometrics that typically provide more accurate automated match score results may provide a lower risk mitigation factor (e.g., feature 14—fingerprint deterrent—risk mitigation factor of 0.7), since such biometrics are not easily recognizable (e.g., by friends and associates). As discussed, these biometric deterrent features can be fully scalable and can work over hundreds of millions of transactions each day, since the typical and minimum risk mitigation factors are similar or the same. A fully or highly scalable biometric transactional system can therefore be achieved by emphasizing biometric deterrence (or biometric deterrent features) over matching, especially in cases where biometric match scores are expected to be poor.

Inferred Risk Mitigation Features, Including Biometric Chains of Provenance

Referring to FIG. 2C, a different class of risk mitigation features, sometimes referred to as Inferred risk mitigation features, is depicted. These are features that might appear to have the same use case from the user perspective for a given transaction, but because of prior association of the feature to a feature acquired at a previous transaction, may each have a higher risk mitigation factor assigned to it. For example, feature A1 in FIG. 2C may be a Unique Device ID and has been assigned a risk mitigation factor of 0.9. Feature A1$b$ on the other hand is also a Unique Device ID, except that at a previous transaction, the device ID was associated with a "Know Your Customer" feature (e.g., feature 5 in FIG. 2C), which increased the risk mitigation factor to 0.996. This is because the current transaction can be associated with a prior transaction where more or different features were available, and therefore the risk mitigation factor may be increased. These risk mitigation factors can be combined within a transaction and between transactions.

A benefit of such an inferred risk mitigation is that biometric features having lower risk mitigation values, such as fingerprint-related features (e.g., which may be implemented using small and low-cost modules that fit on mobile devices), can benefit from or be supplemented by biometric features that have higher risk mitigation values, such as biometric iris matching, which may have been performed just a few times in prior transactions, for example at a time of enrollment or device registration. For example, the iris biometric, unlike most other biometrics, can be used to perform matching across very large databases and recover a unique match. This is helpful for preventing duplicate accounts from being set up at a time of device registration or enrollment. This inferred risk mitigation may also be referred to as a biometric chain of provenance.

Combining Risk Mitigation Values within a Transaction

Prior to further discussion of how the present methods may optimize difficulty-of-use to the user in consideration of the risk mitigation values, it may be helpful to describe how different risk mitigation values can be combined. The present systems and methods may use or incorporate various ways for combining risk values. In certain embodiments, the system uses a naïve Bayesian approach. In this case, if P1, P2 and P3 are risk factors associated with three independent features (e.g., feature 6–device ID–assigned P1=0.9, feature 8–fingerprint–assigned P2=0.95 example or 0.5 minimum, and feature 13–face deterrent–assigned P3=0.95, respectively), then in combination, a risk mitigation value Pc may be defined or calculated, for example, as:

$$Pc=(P1 \times P2 \times P3)/((P1 \times P2 \times P3)+(1-P1) \times (1-P2) \times (1-P3))$$

This equation can of course be altered and/or extended to include any number of features:

$$Pc=(P1 \times P2 \times \ldots)((P1 \times P2 \times \ldots)+(1-P1) \times (1-P2) \times \ldots)$$

In the example above, if a corresponding feature (e.g., fingerprint reader) is operational or works (in which case P2=0.95), then Pc=0.9997. If the fingerprint reader does not work (in which case P2=0.5), then Pc=0.994. While these risk mitigation values may seem very close to the perfect score of 1.0, as discussed earlier, when scaled over hundreds of millions of transactions, such small departures from 1.0 can result in many failed transactions. If the value of Pc=0.994 is too low for the value of the transaction being performed, then the system can offer a mechanism for additional features to be added as necessary so that the combined risk mitigation factor (or combined security metric) may reach or exceed the appropriate threshold, while at the same time selecting a set of features that minimizes the difficulty of use (maximize the ease of use quotient) for the user, as discussed herein.

Combining Risk Mitigation Values Between Transactions

The present systems and methods can combine risk mitigation values between transactions to compute inferred risk mitigation values. The same combination method used to combine risk mitigation values within a transaction may be employed, although the system may reduce the weight of a previous risk mitigation value since the associated feature is not recorded simultaneously with the current risk mitigation value. More specifically, the system may reduce the weight of the previous risk mitigation value based on whether the previous feature was acquired on the same or different device, at a similar or different location, or at a nearby or distant time in the past. In an extreme example, when placed with a very low weight, a previous risk mitigation value may become 0.5, which means it provides little or no useful information.

The present systems and methods may employ a weighting formula such as, but not limited to:

$$P1\_weighted=K*(P1-0.5)+0.5$$

When the weight, K=1, then P1_weighted=P1, which is the original risk mitigation value for that feature. When K=0, then P1_weighted=0.5. Different pre-determined values of K may be selected depending on various factors defined or described above.

The same combinatorial formula described earlier may be employed to combine P1_weighted with other risk mitigation values.

Optimizing Difficulty of Use and Risk Mitigation

The present systems and methods may use any of the equations and framework discussed herein to minimize risk for a transaction while at the same time minimizing the difficulty of use to the user, for example, as shown in FIG. 2A.

As discussed above, the system may interrogate a device involved in a transaction to determine what features of the device are available at that particular time to assist in securing or authorizing the transaction. The system may determine the required risk mitigation value or security metric for the transaction using various factors, such as the financial value or importance of the transaction. The higher the value/importance of the transaction, the higher the risk mitigation factor may need to be, e.g., in order to secure and authorize the transaction. The system may implement this using a table that relates the value of the transaction to the required risk mitigation factor. FIG. 2D depicts an example embodiment of a table that relates a value of the transaction to the appropriate risk mitigation factor or value.

For all possible (or the most likely or most viable) combinations of available features, the system may compute both the combined difficulty of use and the combined predicted risk mitigation value. For example, if there are 4 features available on a device, then there are $(2^4)-1=15$ ways that one or more features can be combined. The system can identify combinations where the predicted risk mitigation value or security metric meets or exceeds requirements relative to a threshold level. From those remaining combinations, the system may choose a combination with a lowest combined difficulty-of-use quotient. In certain embodiments, the system may optimize or balance between a lowest combined difficulty-of-use quotient and a security metric that best meets or exceeds requirements relative to a threshold level.

Dynamic Optimization

Figure 2E:
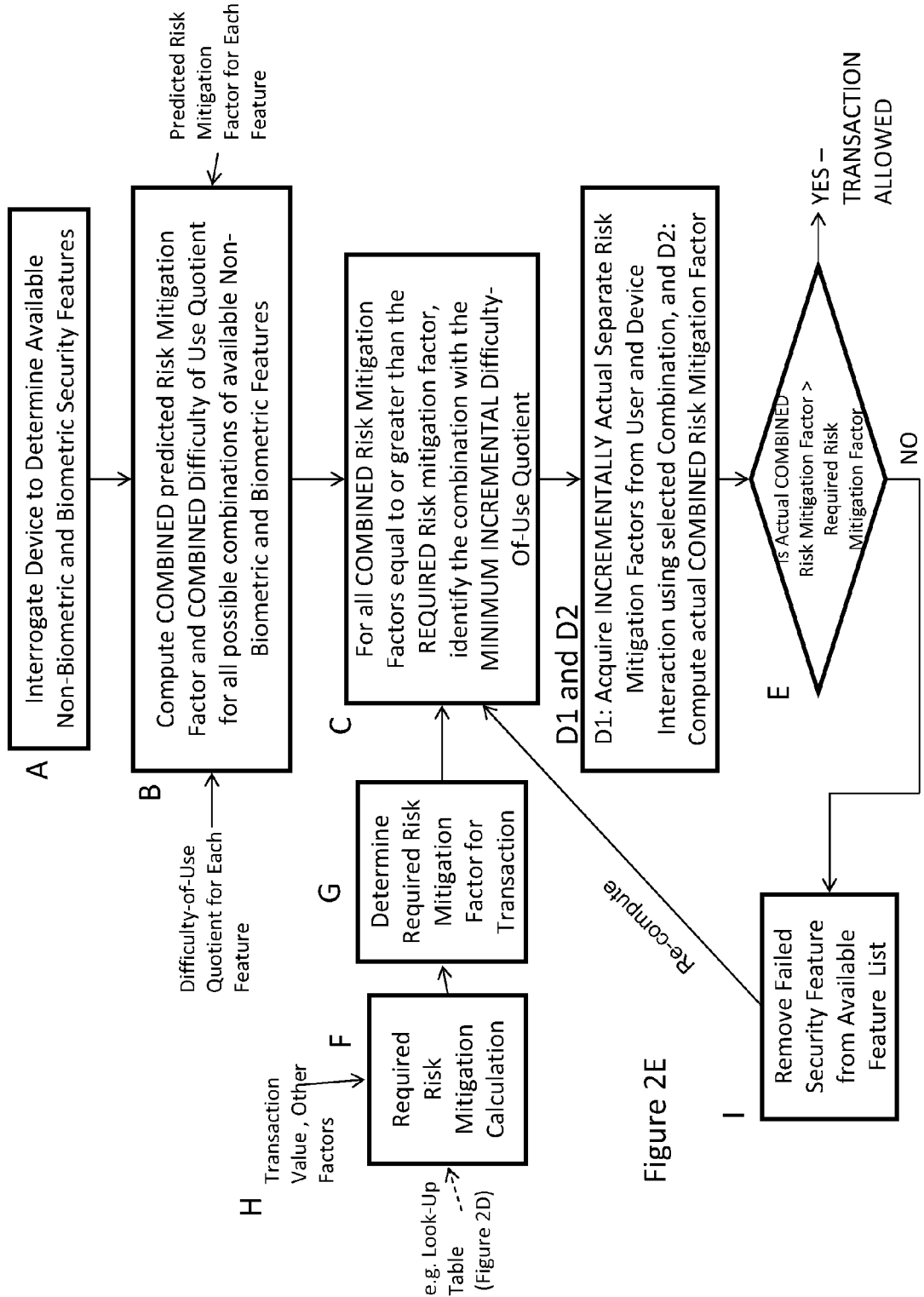
FIG. 2E depicts one embodiment of a method involving re-computation of a combined risk mitigation value.

As discussed, it may be possible that the measured risk mitigation value for a feature may be different from that predicted from the process defined above. For example, a fingerprint reader may not work for a particular individual, resulting in a measured value that is at the minimum risk mitigation value. FIG. 2E depicts one embodiment of a method involving re-computation of a combined risk mitigation value. If the measured risk mitigation value is different from the predicted risk mitigation value at any point along the steps that a user is subject to, then the combined risk mitigation values and combined difficulty of use quotients for possible combinations of available features are re-computed with the measured risk mitigation value. Alternatively, the system may re-compute with the failed feature/step removed from the calculation. Features that have already been entered by the user already may not be included in this dynamically-updated difficulty-of-use quotient, where the objective is to minimize any further incremental difficulty-of-use for the user in the transaction. However the total combined risk mitigation value may be used in the optimization, for example as shown in FIG. 2E.

Figure 2F:
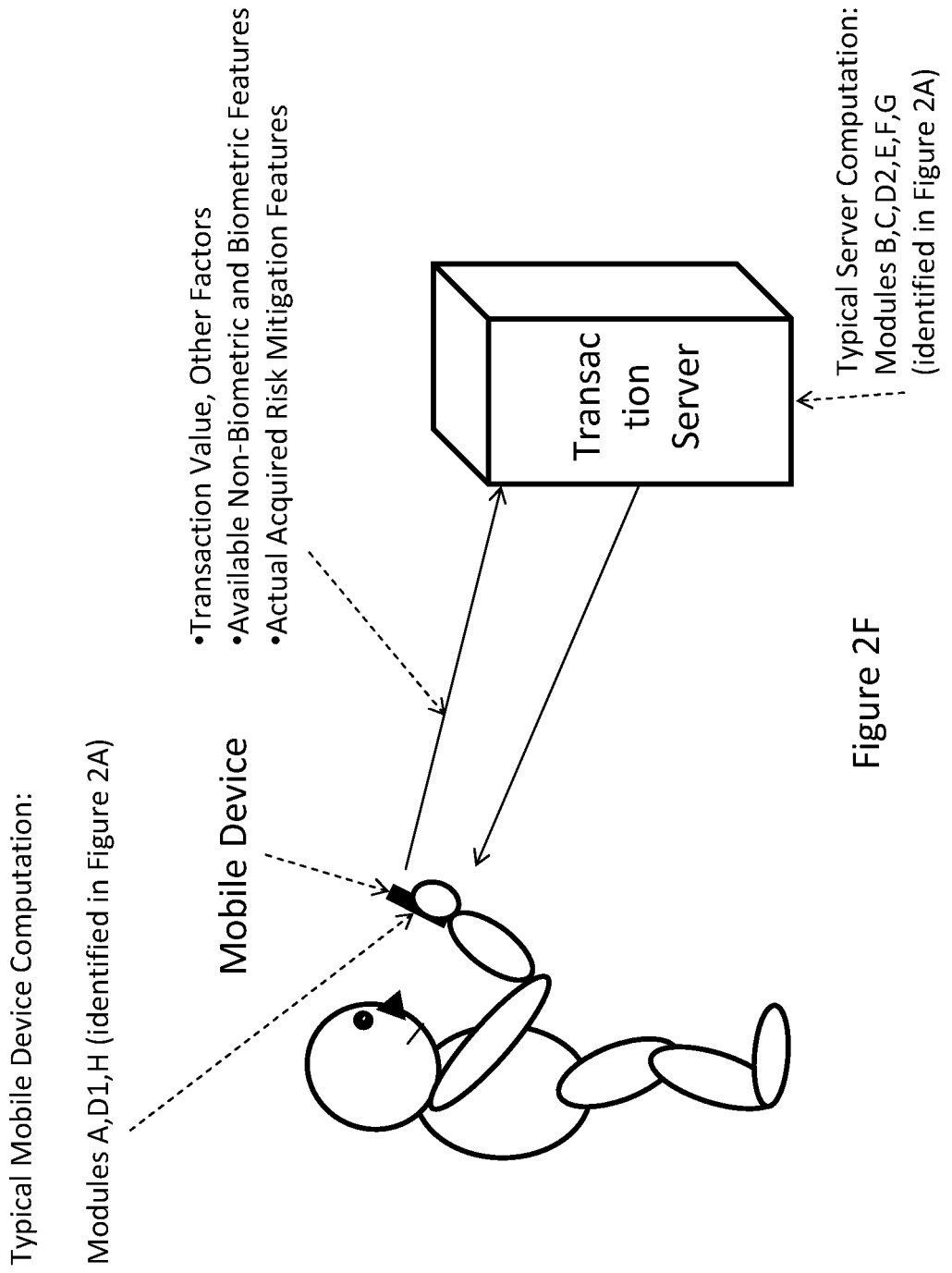
FIG. 2F depicts one embodiment of a system involving optimization of a combined risk mitigation value (security metric) and an difficulty-of-use quotient.

FIG. 2F depicts one embodiment of a system involving optimization of a combined risk mitigation value (security metric) and an difficulty-of-use quotient. The system may authorize a transaction if the combined risk mitigation value exceeds or meets a threshold. Such a system can be implemented on or with one or more devices, as shown in FIG. 2F. In this case, a user may perform a transaction on a mobile phone, and the mobile phone may communicate wirelessly to a remote server. Not all modules of the system are required to be performed on or reside on the mobile phone or device. For example, in the system of FIG. 2F, only the steps of interrogating the device to determine available features, acquiring the actual risk mitigation factors (e.g. asking the user for fingerprint), and acquiring the transaction value are performed on the mobile device. Steps, such as those involving more complex probabilistic modeling and decision-making may be performed on a remote server. This system architecture can minimize the opportunity for hacking attempts and can allow the risk probabilities to be adjusted by the service provider, e.g., without the user having to upgrade the firmware on their mobile device.

Biometric Matching and Biometric Liveness

Figure 2G:
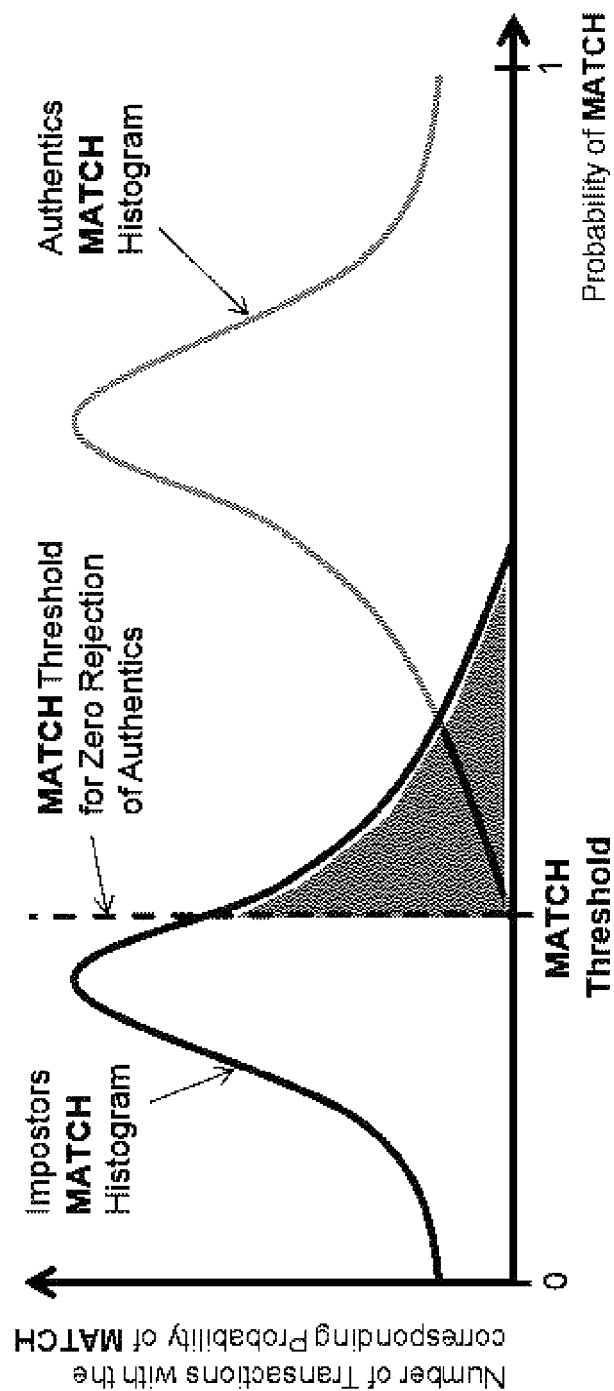
FIG. 2G depicts an example of probability of match curves.

Traditional biometric systems typically rely on or emphasize the probability of matching when authorizing a transaction. FIG. 2G shows an example histograms of the probability of match for traditional biometrics such as fingerprints or face recognition. The impostors histogram curve comprises a distribution of results from comparing biometric templates from different people against each other. The authentics histogram curve comprises a distribution of results from comparing biometric templates from the same people against each other.

The shape and position of the curves may define the performance of the particular biometric system. Values for the cures may be measured using large numbers of users performing large numbers of transactions. These curves can be used to predict the performance of the system for a particular user, given a recovered probability of match recovered at the time of a particular transaction. The curve on the right is called the "Authentics Match Histogram", and may correspond to valid or authentic users using a particular biometric transactional system. A point on the curve is the number of transactions corresponding to a particular probability of match. The curve on the left is called the "Impostors Match Histogram", and corresponds to fraudulent users or impostors using the same biometric transactional system. The curve on the left may be computed by taking a large population of biometric records and by computing the match scores that result when all records are compared to all other records.

A point to note in FIG. 2G is the overlap between the impostors and authentics performance curves. This is a characteristic of many biometric acquisition and matching systems using biometrics such as fingerprints or faces. Another point to note in FIG. 2G is that in any scalable biometric system, up to hundreds of millions of transactions may be performed each day, so that even small errors in performance can result in literally millions of discontented or frustrated users that require manual or other methods of redress to resolve. This is costly, impractical and sometimes entirely unacceptable in certain scalable systems. To avoid this and to achieve scalability using the traditional transactional biometric paradigm, the match threshold could be set to allow all authentic users to correctly have their transactions authorized. This is shown by the vertical dotted line in FIG. 2G, which is the point at which all the of the curve on the right lies to the right of the dotted line. All authentic users can then be authorized, but a large percentage of impostor (fraudulent) users will also be authorized, as shown by the dark-shaded area to the right of the vertical dotted line in FIG. 2G.

Device manufacturers may want to aim to reduce the dark-shaded area in FIG. 2G to zero, and attempting to do so for each and every one of up to hundreds of millions of transactions, performed every day, under widely varying environmental conditions and widely varying user conditions, such as the use of dirty fingers. This is inherently an ill-posed and difficult means of solving the problem of securing hundreds of millions of transactions daily using biometrics.

Biometric Liveness

As discussed herein, earlier approaches to achieving scalability have primarily focused on emphasizing the performance of match scores between a reference template acquired for the user and a newly acquired template acquired at the time of transaction. The present systems and methods recognize that there is advantage in emphasizing measures of biometric liveness when making an authorization decision.

Figure 2H:
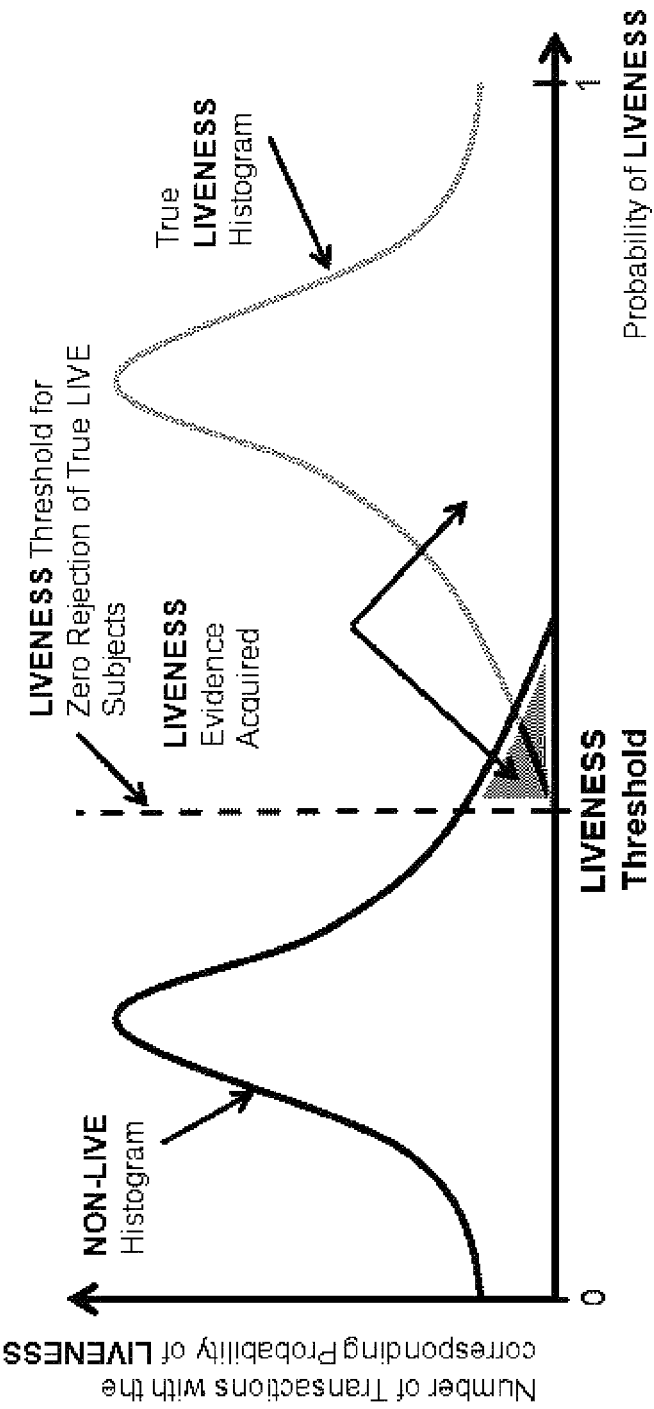
FIG. 2H depicts an example of probability of liveness curves.

Liveness has often been treated as an afterthought, and is often not computed at all or is just computed to be a binary measure. FIG. 2H shows histograms of the probability of liveness curves, which can be contrasted to the histograms of the probability of match curves that were shown in FIG. 2G.

The curve on the right in FIG. 2H is called the "True Liveness Histogram", and corresponds to live authentic or live fraudulent users using a biometric transactional system. Live, fraudulent users are part of this true-liveness category, whereas in the authentic match curve, spoof, non-live methods of performing matching are part of the authentic match score category. The curve on the left is called the "Non-live histogram", and corresponds to non-live (e.g., involving the use of recorded biometrics rather than that acquired from a live person), fraudulent spoof attempts using the same biometric transactional system.

If FIGS. 2G and 2H are compared, one point to note is that FIG. 2H has less overlap between the two curves as compared to those in FIG. 2G. This is because liveness measures can in many cases be computed more robustly than match measures, since match measures inherently depend on a comparison between a biometric template that may have been recorded years earlier in very different environmental and user-conditions, and using a very different device. Liveness measures on the other hand may not require a reference back to such a template, and may instead depend on parameters of basic biological human models that persist, for example, parameters related generically to the human eye. The issue of cross-compatibility of biometric matching can become even more significant as the number and types of mobile and other devices proliferates, and/or if biometric databases become fragmented due to disparate corporate policies or privacy issues.

Liveness measures can be varied from device to device, depending on the configuration of sensors (e.g. cameras) on the device or other data fed into the device (e.g. the user audibly reciting a unique code sent to the device at the time of transaction). Liveness measures can easily embrace new and old technologies separately or together, rather than having to plan to maintain a legacy format or technology developed today so that a compatible biometric match can be performed in the future. This is significant considering the rapid pace of development and wide variety of constraints that drive device-development today.

The present systems and methods recognize that it is beneficial in many cases to compute measures of liveness with one biometric while using measures of match from a second biometric, since each different measure may be more effective in the biometric transactional system from a cost, size or performance viewpoint depending on the particular device being used.

One way of combining biometric matching and biometric liveness is to emphasize biometric liveness over biometric matching when performing a transaction, particularly in cases where the biometric match scores are poor. In this case, rather than reject the transaction, the transaction can still be authorized if the biometric liveness score is emphasized over the match score so that there is a high likelihood that a real person is performing the transaction, rather than a spoof biometric.

Biometric Deterrent

As discussed herein, biometric deterrents are biometric features that are acquired for the purposes of registering/storing a biometric record of the transaction, typically with a third party, such as a bank, as a deterrent against a fraudulent transaction from occurring. There is a strong disincentive for fraudulent users to not try and spoof the system since the transactional biometric paradigm is constructed so that any fraudulent or valid biometric information is documented independently. There is therefore a strong perceived and real deterrent in place. This is also inherently a well-posed means of solving the biometric transactional problem since the user feels a strong expectation of fiscal responsibility imposed on them, and the transparency and comprehensive documentation of such potential biometric evidence is an overwhelming deterrent to fraudulent activity.

Combination of Biometric Matching, Biometric Liveness and Biometric Deterrent

The present systems and methods may support or consider the following biometric features: biometric matching, biometric liveness and biometric deterrent. These features can be combined in several ways, including using the optimization method described herein. For example, one method may include determining a combination of biometric liveness and biometric matching that emphasizes the contribution of biometric liveness to the combination while at the same time acquiring a biometric deterrent. Another method may include performing biometric liveness while at the same time acquiring a biometric deterrent. One feature may be emphasized with respect to another in the combination, e.g., depending on the particular situation such as better system support for one feature over another, or inherent variability in one feature over another due to environmental factors.

Selection of Steps or Features for a Transaction

The present systems and methods may, at a high level, trade, balance or optimize between difficulty-of-use and risk in the selection of steps or features (non-biometric features and/or biometric features) that serve as security measures for a particular transaction. Examples of non-biometric features include the use of GPS, SMS, unique IDs, password, captcha code liveness detection, etc. Examples of biometric features may include face matching, face liveness, face deterrent, iris matching, iris liveness, etc. Therefore, various systems can be constructed from those features, including the following: Iris Matching and Face Liveness; Face Matching and Face Liveness; Iris Matching and iris Liveness; Iris Matching and Iris liveness.

As discussed above, in reference to the risk mitigation factors for liveness and for matching, the minimum risk mitigation for both iris and face matching is 0.5. That means that matching may not provide any useful information in the, say, 2% of cases for all transactions. Biometric liveness, on the other hand, has a minimum risk mitigation value of 0.7. That means that it does provide some risk information in 100% of transactions. Proving that a live person rather than, for example, an automated system trolling through credit card numbers, can be useful information when performing a transaction. Captcha codes, as discussed, is an example of a liveness test. Thus, taking into consideration the relationship of various elements disclosed herein (e.g., as illustrated in relation to the equations discussed), a way to allow the 2% of transactions to be supported or to go through, may be to emphasize liveness detection over matching, at least for those cases. The next nearest biometric feature related to biometric liveness may indeed be biometric deterrence, also addressed in this disclosure. And by the same rationale, our systems can leverage on an emphasis on biometric deterrence (e.g., over biometric matching).

Consistent with this, our present systems and methods can optimize selection of steps or features for protecting the integrity of a transaction by placing an emphasis on either or both of liveness detection and biometric deterrence. For example, in the optimization, the system can place or include a preference for inclusion of a step for liveness detection or biometric deterrence if available. The system may include a preference to include or select a step or feature for liveness detection or biometric deterrence, if available amongst the range of possible steps or features for the transaction. And in the case where at least one of liveness detection and biometric deterrence are selected, an emphasis may be placed on the results of liveness detection and/or biometric deterrence (e.g., over other features that involve biometric matching, GPS and SMS) in the determination of whether to allow a transaction to proceed.

Figure 2I:
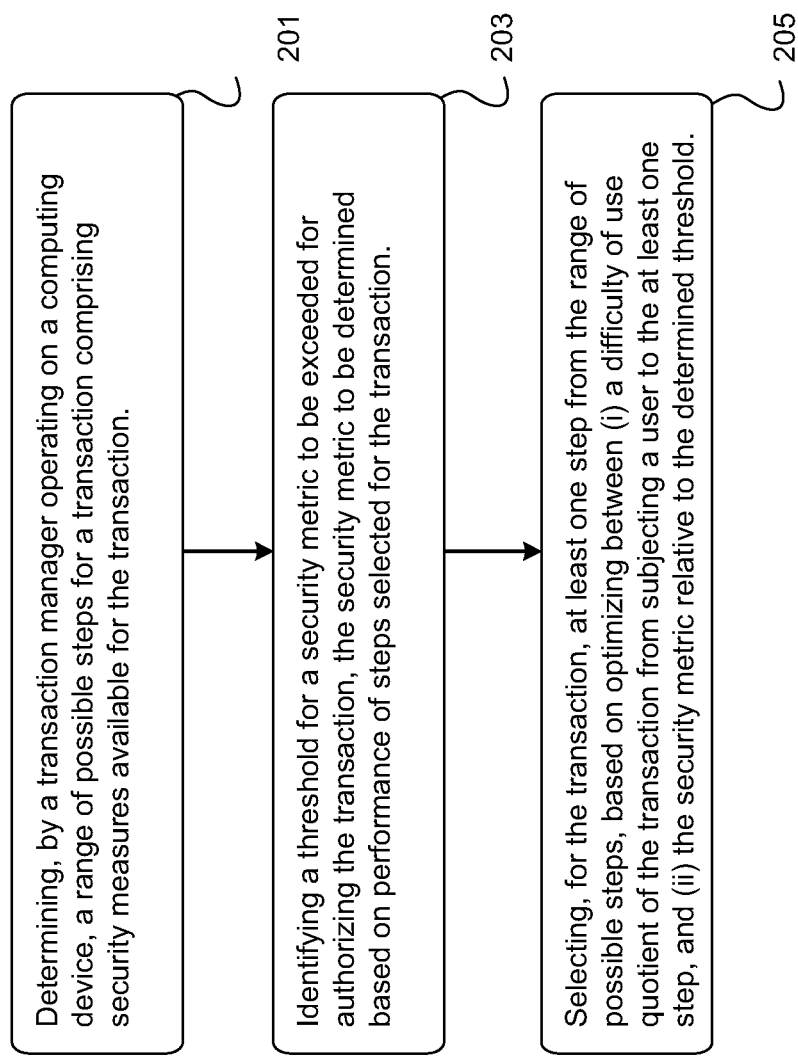
FIG. 2I depicts one embodiment of a method of managing difficulty of use and security for a transaction.

Referring now to FIG. 2I, one embodiment of a method of managing difficulty of use and security for a transaction is depicted. The method may include determining, by a transaction manager operating on a computing device, a range of possible steps for a transaction comprising security measures available for the transaction (201). The transaction manager may identifying a threshold for a security metric to be exceeded for authorizing the transaction, the security metric to be determined based on performance of steps selected for the transaction (203). The transaction manager may select for the transaction at least one step from the range of possible steps, based on optimizing between (i) a difficulty of use quotient of the transaction from subjecting a user to the at least one step, and (ii) the security metric relative to the determined threshold (205).

Referring to (201) and in further details, a transaction manager operating on a computing device may determine a range of possible steps for a transaction comprising security measures available for the transaction. The computing device may comprise a device of the user, such as a mobile device. The computing device may comprise a transaction device at a point of transaction. The computing device may include one or more interfaces to communicate or interact with one or more devices (e.g., peripheral devices such as a finger scanner) available for facilitating or securing the transaction. The transaction manager may communicate with, or interrogate each of the devices to determine features available or operational for facilitating or securing the transaction. The transaction manager may determine features available or operational in the computing device for facilitating or securing the transaction.

The transaction manager may determine, for each available feature, one or more steps required or expected to be performed. The transaction may, in some embodiments, consider each feature as comprising one step. The features and/or steps may comprise security measures for securing the transaction and/or moving the transaction towards authorization or completion. For example, the security measures may include any of the features described above in connection with FIGS. 2B and 2C.

Referring to (203) and in further details, the transaction manager may identify a threshold for a security metric to be exceeded for authorizing the transaction, the security metric to be determined based on performance of steps selected for the transaction. The transaction manager may identify a risk level or risk metric based at least in part on the transaction's value or importance of the transaction. For example, the transaction manager may identify a required combined risk mitigation value or factor as discussed above in connection with at least FIG. 2D. The transaction manager may identify the threshold for the security metric based on at least one of: a value of the transaction, risk associated with a person involved in the transaction, risk associated with a place or time of the transaction, risk associated with a type of the transaction, and security measures available for the transaction. The transaction manager may consider other factors such as the type of the transaction, a person involved in the transaction, a type of payment used for the transaction, etc. The transaction manager may identify a threshold for a security metric to be exceeded for authorizing the transaction, the threshold based on the risk level or risk metric, for example, the required combined risk mitigation value or factor.

The transaction manager may determine or estimate a security metric for the transaction based on the determined range of possible steps. The transaction manager may determine or estimate a security metric for the transaction based on the risk mitigation values or factors discussed earlier in this section. The transaction manager may calculate or determine a range of values for the security metric based on the determined range of possible steps for the transaction. For example, for each combination of possible steps, the transaction manager may calculate or determine one or more corresponding security metrics, e.g., based on the example risk mitigation value and/or the example minimum risk mitigation value of the corresponding step or feature, e.g., as discussed above in connection with at least FIGS. 2B and 2C.

Referring to (205) and in further details, the transaction manager may select for the transaction at least one step or feature from the range of possible steps or features, based on optimizing between (i) a difficulty of use quotient of the transaction from subjecting a user to the at least one step or feature, and (ii) the security metric relative to the determined threshold. The transaction manager may calculate the ease or difficulty of use quotient based on the at least one step or feature selected. Each of the at least one step or feature may be assigned a score based on at least one of: an amount of action expected from the user, an amount of attention expected from the user, and an amount of time expected of the user, in performing the respective step or feature. The score of each step or feature may comprise a value, such as D or Q as described above in connection with FIGS. 2B and 2C. The system may allow a transaction if the security metric for the transaction as determined by all the steps performed, exceeds the determined threshold. For example, the actual combined risk mitigation factor may satisfy or exceed the predicted risk mitigation factor for the transaction.

The transaction manager may select the at least one step or feature from the range of possible steps or features such that successful performance of the at least one step results in the identified threshold being exceeded. The transaction manager may select one or more combinations of features or steps having a predicted risk mitigation value or security metric satisfying or exceeding the threshold. The transaction manager may select one of these combinations where the corresponding ease/difficulty-of-use quotient is highest. The transaction manager may select a combination having the lowest difficulty-of-use quotient, that has a predicted risk mitigation value or security metric satisfying or exceeding the threshold. The transaction manager may select a combination that has a predicted risk mitigation value or security metric exceeding the threshold by the most, and having difficulty-of-use quotient lower than a predefined goal or threshold. The transaction manager may optimize the selection of the at least one step by balancing or assigning weights to the corresponding difficulty-of-use quotient and the predicted risk mitigation value or security metric. For example, the transaction manager may assign equal weights or emphasis on each of these factors, or the transaction manager may emphasize difficulty-of-use over the security metric, or the security metric over difficulty-of-use.

The transaction manager may acquire biometric data as part of the selected at least one step, the biometric data comprising at least one of: iris, face, palm print, palm vein and fingerprint. The transaction manager may acquire biometric data as part of the selected at least one step, the biometric data for at least one of liveness detection, biometric matching, and biometric deterrence. The acquired biometric data may be stored as a biometric record or receipt or part thereof, serving as a deterrent for potential fraud or dispute, for example as discussed in section C. The transaction manager may acquire biometric data as a prerequisite of one of the selected at least one step. For example, the transaction manager may acquire biometric data as a biometric deterrent, as a prerequisite of relying on a password challenge feature instead of a biometric match.

The transaction manager may perform biometric matching as a prerequisite of one of the selected at least one step. For example, the transaction manager may perform biometric matching as a prerequisite of allowing payment by check (which may be more susceptible to fraud) instead of credit card. The transaction manager may at least require a step for acquiring a first type of biometric data, in the event of a failure to satisfy a requirement of at least one selected step. For example, the transaction manager may determine that acquiring a certain type of biometric data for biometric matching can satisfy a required risk mitigation value for the transaction, after failing to authenticate via a password challenge. The transaction manager may at least require a step for acquiring a second type of biometric data if a first type of biometric data is unavailable, of insufficient quality, or fails a liveness detection or biometric matching. For example, the transaction manager may both a step for acquiring a second type of biometric data, as well as another step such as a password, ID card validation, signature, and acquisition of face image for storage or other type of accompanying deterrent.

The transaction manager may perform liveness detection as part of the selected at least one step. The transaction manager may perform liveness detection as a prerequisite of one of the selected at least one step. For example, the transaction manager may require both liveness detection as well as biometric matching, and may even emphasize liveness detection over biometric match results. The transaction manager may at least require a step for performing liveness detection, in the event of a failure to satisfy a requirement of at least one selected step. For example, the transaction manager may require both liveness detection and biometric deterrent, in the event that biometric matching is inconclusive.

The transaction manager may perform a deterrence activity as part of the selected at least one step. The deterrence activity can include the use of biometric deterrence, such as storage of a biometric receipt for potential future retrieval in the event of fraud or dispute. The deterrence activity can include requirement of a signature, or providing addition information which can be incriminating to the user. The transaction manager may perform a deterrence activity as a prerequisite of one of the selected at least one step. The transaction manager may at least requiring a deterrence activity, in the event of a failure to satisfy a requirement of at least one selected step.

The transaction manager may include, in the optimization, a preference for inclusion of a step for liveness detection or biometric deterrence if available. As discussed earlier, liveness detection and biometric deterrence may have minimum risk mitigation factors that are higher than that of other features (e.g., biometric match). To provide scalability up to large numbers of transactions (e.g., to support the 2% of transactions that may not be adequately handled by other features), the transaction manager may include a preference to include or select a step or feature for liveness detection or biometric deterrence, if available amongst the range of possible steps or features.

The transaction manager may update the ease or difficulty of use quotient for the transaction based on a modification in remaining steps or features of the transaction, the modification responsive to a failure to satisfy a requirement of at least one selected step or feature. The transaction manager may update the remaining steps of the transaction based on a failure to satisfy a requirement of at least one selected step or feature. The transaction manager may update the ease or difficulty of use quotient for the remaining steps or features of the transaction, based on a modification of steps or features for the transaction. The transaction manager may update the security metric for the transaction responsive to a failure to satisfy a requirement of at least one selected step. The transaction manager may update the security metric responsive to a modification in remaining steps of the transaction. For example, the user, data provided or equipment involved may fail to authenticate the user, match with a biometric template, or satisfy liveness requirements. This may be due to insufficient quality in the biometric data or signature acquired, the user exceeding a time threshold to perform a step or feature, or an equipment or system failure or malfunction for example.

C. Efficient Compression of Biometric Data

Figure 3A:
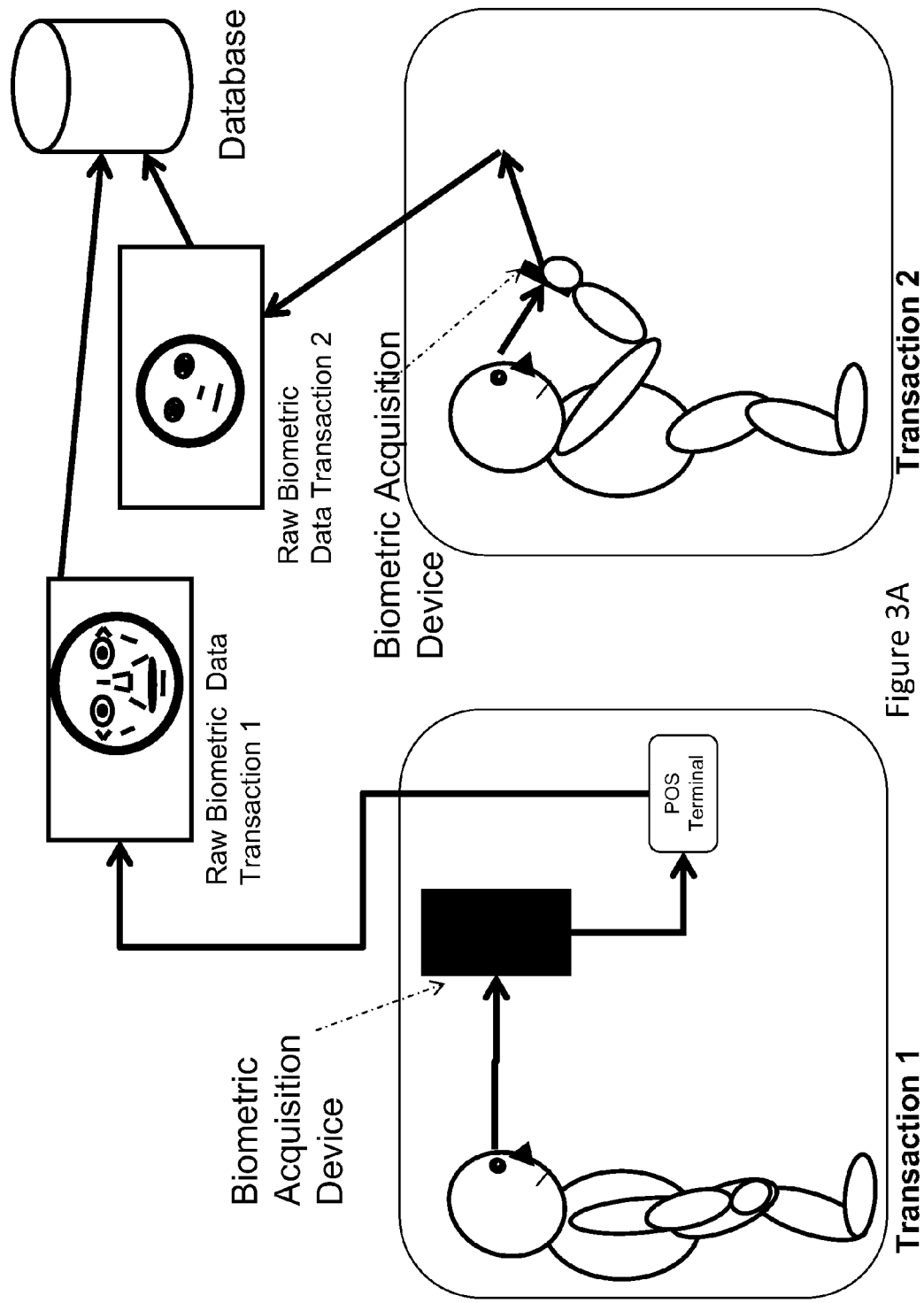
FIG. 3A depicts one embodiment of a system for efficient compression of biometric data.

Referring to FIG. 3A, one embodiment of a system for efficient compression of biometric data is depicted. The system may include one or more biometric acquisition devices, each of which may include or communicate with an evaluation module. A biometric acquisition device may include one or more sensors, readers or cameras, in a biometric acquisition module for example, for acquiring biometric data (e.g., iris, face, fingerprint, or voice data). The evaluation module may comprise hardware or a combination of hardware and software (e.g., an application executing on a POS terminal, a remote server, or the biometric acquisition device). The evaluation module is sometimes referred to as an acquisition selection module.

Each biometric acquisition device may include a compression module or transmit acquired biometric data to a compression module (e.g., residing on a server or POS terminal). The compression module may be in communication with one or more databases and/or biometric processing modules (e.g., residing on a remote server). The compression module may hereafter be sometimes generally be referred to as a processor, which may comprise or operate on a custom, application-specific or general-purpose hardware processor. The system may include a pre-processing module, which may be a component of the processor. The biometric acquisition device may, in some instances, include a guidance module for providing feedback or guidance to a subject to aid biometric acquisition of data suitable or optimal for compression and subsequent recovery for manual/automatic biometric recognition.

By way of illustration, two separate transactions may be performed by the same person at two different times using one device (e.g., two different features of a device, or the same feature of the device) or two different devices (e.g., two types of devices, or the same feature of two devices). The system may acquire biometric data at the time of each transaction and may store the acquired biometric data separately in a database (e.g., a single database, a distributed database, or separate databases). The biometric data may comprise, for example, facial data, iris data, fingerprint data or voice data. The biometric data may also include data that has been encoded from or derived from raw biometric data acquired from a subject, for example, an iris template or facial template.

The size of the biometric data can vary, depending on one or more factors such as the type of biometric used. For example, if the face biometric is used and if the face image has a size of 300×300 pixels, then a color (e.g., comprising 3 channels of red, green, blue imagery) quantized to 8 bits may comprise 300×300×3=270 KBytes of data. Compression methods, such as JPEG and JPEG2000 may compress single images by different amounts, depending on the quality of the image required upon retrieval. For example, to achieve a given required quality level, a suitable compression ratio may be 5. In this case, a 270 KByte image would be compressed to 270 k/5=54 Kbytes. However, as the use of biometric transactions grows, then potentially up to or even upwards of hundreds of millions of biometric receipts may need to be compressed and recorded each day, and stored for periods of time such as years, as a reference in case of a dispute. For example, if 100 million biometric transactions are performed each day, and the biometric receipts are compressed to 54 Kbytes and stored for 5 years, with two additional independent backup databases, then the storage required may be 100e6×54e3×365×5×(1+2)=2.96e16 Bytes=29,565 Terabytes. This is a very significant amount of storage space, and may be expensive to procure and maintain. As a comparison, the first 20 years of the operation of the Hubble Telescope acquired only 45 Terabytes of data. In another comparative example, the U.S. Library of Congress estimates it has acquired 235 Terabytes of data.

The present systems and methods can optimally or appropriately select which biometric data to acquire (e.g., biometric data available to the biometric acquisition device at a specific time instance, meeting specific criteria and/or under particular conditions), compress the acquired biometric data such that the size of the required storage disk space and/or transmission bandwidth is minimized or acceptable, and at the same time ensure that the quality of the biometric data when retrieved (e.g., recovered or uncompressed) is sufficient for the purposes of subsequent automatic or manual recognition.

Referring to FIG. 3B, one embodiment of a set of biometric data acquired over a plurality of transactions is depicted. This figure illustrates an aspect in which the system may acquire and select biometric data on the basis of whether the biometric data meets criteria that are optimal for both compression and quality of the biometric data recovered for subsequent automatic or manual recognition. Biometric data that does not meet the required criteria may not be selected for compression, since the resultant data would have either occupied or required too much disk space even after compression, or would have been sub-optimal in terms of biometric quality when retrieved or uncompressed. For example and in one embodiment, in acquisition #1 (transaction #1) in FIG. 3B, the acquired image of the face may be too large and may have too much fine detail resolution to be suitable for selection by the system for compression. If this image were to be compressed, then to maintain the representation of all the fine details in the data the compressed image size would be excessive. Alternatively, the compression level would have to be adjusted so that the compressed image size is smaller, but compression artifacts introduced by the adjustment would be much more apparent in the recovered image, which may be suboptimal for subsequent manual or automatic biometric recognition.

Compression artifacts can include blockiness or distortion due to a lack of recovered granularity, which can be apparent in JPEG and MPEG compression algorithms, for example. These compression artifacts can then greatly reduce the performance of subsequent automatic or manual recognition of the stored image. In acquisition #2 in FIG. 3B for example, the user's face may be too bright (and zoomed out) such that features that can be used for recognition are not visible or washed out. If this image were to be selected and compressed, there may be few image artifacts from compression for a given size of compressed image since there are few fine details in the data that need to be represented. However, the image would still not be of sufficient quality for automatic or manual recognition of the stored image since there are not enough features visible or detectable in the first place for recognition.

By way of illustration, and referring again to FIG. 3B, acquisition #3 shows an image that meets the criteria as determined by the present systems and methods, for both minimizing compression artifacts, and for having sufficient features that can be used for automatic or manual recognition. These can be conflicting constraints; on the one hand, for automatic or manual recognition, typically it is desirable to use an image with as many uncorrupted, fine resolution features and as fine an image texture as possible. On the other hand, however, such an image occupies significant disk space or transmission bandwidth even when compressed, as compared to that required for a compressed image with fewer fine/high resolution features and/or reduced image texture.

The system can control (e.g., via the evaluation module) the selection of the acquired imagery in the first place, to ensure that the trade-off between compression and the quality of the biometric data is optimal with regard to the complete system including data acquisition. Other biometric data that would not result in such an optimal criterion may not be acquired and subsequently compressed. If the optimal criteria are not met, the system (e.g., via the guidance module) may provide instructions, feedback or guidance to the user to adjust the user's position, orientation, distance or exposure to illumination, for example, so that optimal data can be acquired. Alternatively, or in addition, more data can be acquired opportunistically with no or minimal instruction to the user, which may increase a likelihood that biometric data that meets the optimal criteria will be acquired.

Figure 3C:
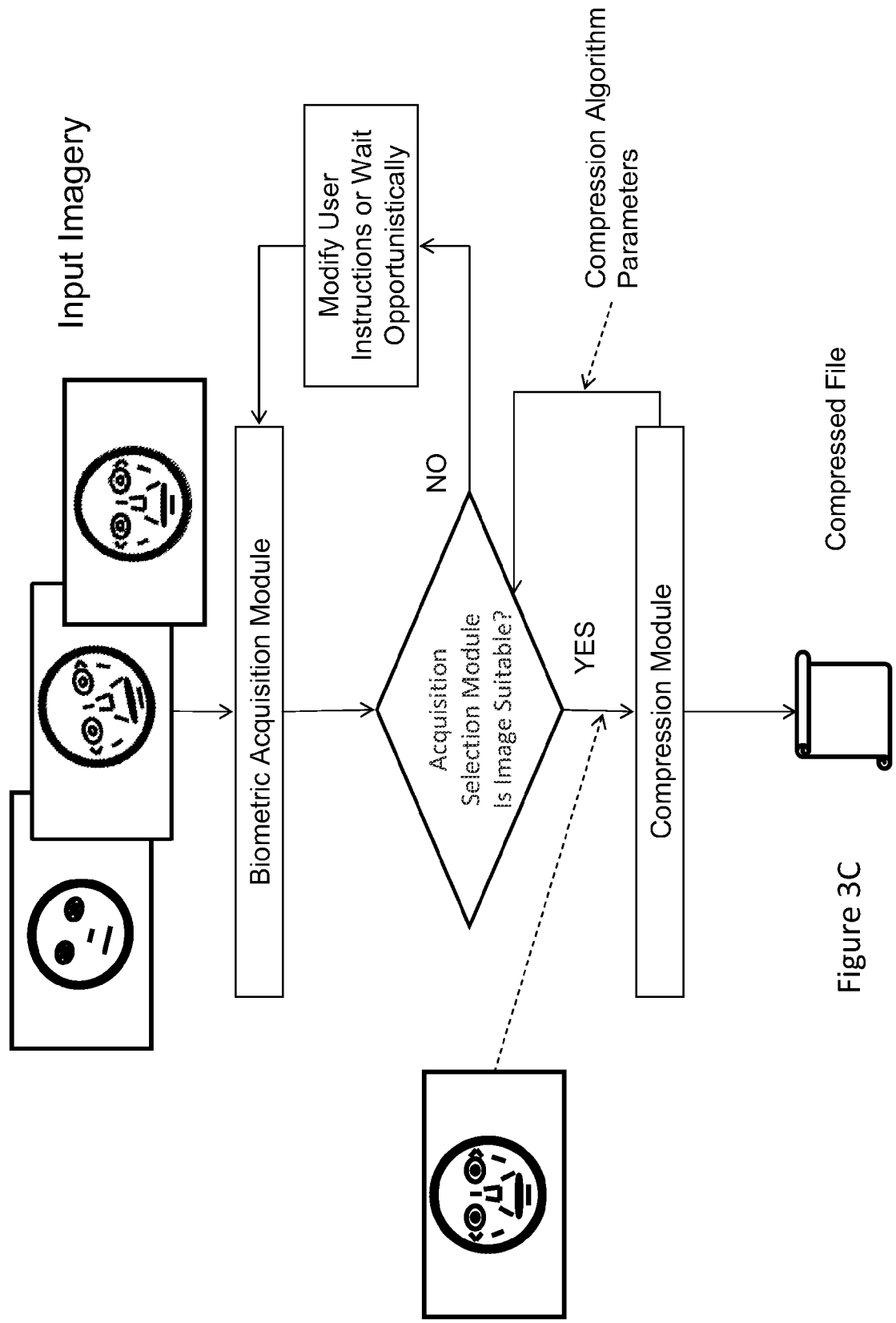
FIG. 3C depicts one embodiment of a system and method for efficient compression of biometric data.

Referring to FIG. 3C, one embodiment of a system and method for efficient compression of biometric data is depicted. By way of illustration, input biometric data of any type may be acquired, such as iris, fingerprint, palm-vein, face, or voice. FIG. 3C shows one example with face imagery. Imagery may be acquired by a biometric acquisition module and passed to an Acquisition Selection Module (sometimes referred to as an evaluation module). The Acquisition Selection Module may perform a series of biometric quality tests or measurements (e.g., based on biometric data quality parameters), described herein, and at the same time may use compression algorithm parameters to determine whether a compressed version of the image would satisfy the criteria defined by biometric data quality parameters.

Figure 3E:
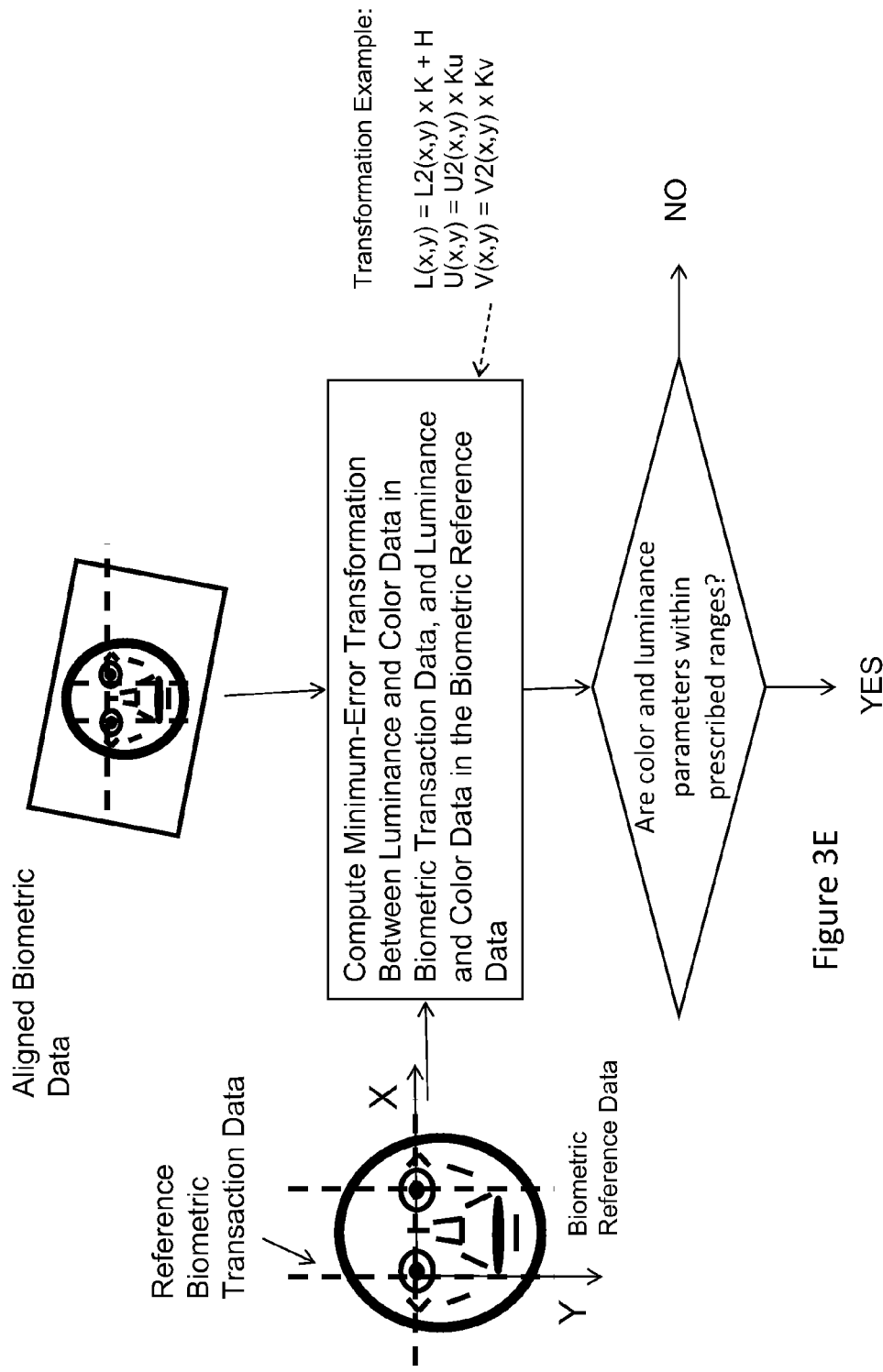

Referring to FIGS. 3D and 3E, example embodiments of the Acquisition Selection Module, which may comprise a series of Acquisition Selection Sub-Modules, are depicted. Geometric Position of the Biometric Data in the Camera View.

A geometric position of the biometric data in the camera view may be measured or determined using the Acquisition Selection Sub-Module as shown in FIG. 3D. This determination ensures that the biometric data is in fact present in the camera view, and that the biometric data is sufficiently far from the edge of the camera view to avoid acquisition of partial data, which may reduce the performance of subsequent automatic or manual recognition processes. As implemented in the system, a sub-module of the evaluation module may detect that the biometric data is in the field of view of the camera. In the case of facial biometric data, the sub-module detects the presence of a face in the image. If the face is not detected, the evaluation module may determined that the image is not suitable for acquisition. In addition, it is determined in the sub-module whether the location of the face is outside a pre-determined threshold range of the edge of the image. If the face is centered somewhere outside the pre-determined threshold range then the sub-module may determine that the geometric position of the biometric data is suitable for acquisition. If the face is not detected or is detected within the pre-determined threshold range from the edge of the image, then feedback from the guidance module, such as a voice-prompt or a graphical box displayed on the screen, can be provided to the user in order to position the user differently. An embodiment of the guidance or feedback module ("Modify User Instructions or Wait Opportunistically") is shown in FIG. 3C. Alternatively or in addition, more images can be acquired and the system can wait opportunistically until a suitable image is acquired. In one embodiment, we use a combination of opportunistic and guided acquisition. For example, in an initial phase of acquisition, images may be acquired opportunistically with minimal user prompt methods, but if the acquired images remain unsuitable for acquisition and subsequent compression for a pre-determined time period, then user prompts may be provided. This can prevent issuance of annoying user prompts for experienced users, yet enable these prompts for inexperienced users if such users are struggling to position the device appropriately. This method can be used for any of the biometric criteria discussed herein and below.

Resolution of the Biometric Data.

The Acquisition Selection Sub-Module can measure or determine the resolution of acquired biometric data. This determination can be used to ensure that there is sufficient resolution for automatic or manual matching for performance according to a predefined accuracy level. The corresponding method may be implemented by detecting a face in the image, and by measuring a distance in pixels between the eyes either explicitly using the locations of the eyes, or implicitly using the detected face zoom as a measure of the distance between the eyes. The performance of automatic recognition algorithms in relation to pixel separation between eyes may be in accordance to, for example, ISO standards for a minimal pixel separation between eyes. An additional step, may be a check by the sub-module on whether the measured eye separation is within a threshold of the reference eye separation. The system may not necessarily want to acquire an image with more resolution than is required for automatic or manual recognition since this may result in an image with more granular features than is required, which can result in a larger compressed image. If the sub-module determines that the measured eye separation lies outside the prescribed range, feedback may be provided to the user to position or adjust the user for more optimal image capture. For example, feedback from the guidance module may include a voice prompt or a displayed message asking the user to move further or closer to the device or illuminator so that the resolution or quality of the image changes.

Geometric Orientation of the Biometric Data.

The Acquisition Selection Sub-Module, for example as shown in FIG. 3D, may measure or determine the geometric orientation of the biometric data. This determination may be used to ensure that the data is oriented within the angular capture range of a subsequent automatic matching algorithm, or within a predetermined angular range of a manual matching process protocol. The method may be implemented by, for example, detecting a face in the image using standard methods of detecting the face, measuring the orientation of the face by recovering the pixel location of the eyes, and using standard geometry to compute the angle of the eyes with respect to a horizontal axis in the image. The predetermined range can vary depending on the particular automatic face recognition algorithm that will be used or on the manual protocol that will be used. The measured orientation may be compared to the predetermined orientation range within the sub-module. If the sub-module determines that the measured orientation lies outside the predetermined orientation range, feedback from the guidance module may be provided to the user to re-orient the device in the required or appropriate direction.

Maximum and Minimum Range of the Intensities in the Biometric Data.

The Acquisition Selection Sub-Module, for example as shown in FIG. 3E, may measure or determine a maximum and minimum range of the intensities (e.g., color and luminance intensities) in the biometric data. This determination may be used to ensure that significant parts of the biometric data are not too saturated or too dark for subsequent automatic or manual recognition. This method may be implemented by detecting a face in the image to create an aligned image as shown, computing a histogram of the intensities within the face region, and computing the average of a top percentage (e.g., 20%) and the average of a bottom percentage (e.g., 20%) of the intensities in the histogram, and determining whether the average top percentage is beneath a threshold range and whether the average of the bottom percentage is above a threshold range. Alternatively or in addition, the method may compute the parameters of an illumination-difference model between a reference or canonical image of a face, and the acquired face. If the top and bottom percentages or the illumination-difference parameters (e.g., depending on which method steps are used) do not lie within prescribed ranges, then feedback from the guidance module may be provided to the user to position the user for more optimal image capture. For example, the feedback may be a voice prompt or a displayed message guiding the user to move to a more shaded region away from direct sunlight that may have resulted in a highly saturated image.

Determination of Whether the Eyes are Open, if Facial Imagery is Used.

The evaluation module may determine if acquired images include eyes that are open, for example in the case where facial imagery is acquired. Images acquired by the system showing open eyes can provide more information for an automatic or manual recognition system since a significant number of discriminating features are typically located in and around the eye region. The method for this may include detecting the location of the face and eye locations using a face detector as described earlier. The evaluation module may determine, detect or measure a difference, or distinguish, between the appearance of an eyelid and an eye. More specifically, the evaluation module may include a convolution filter that can detect the darker pupil/iris region surrounded by the brighter sclera region. The same filter performed on an eyelid may not result in the detection of an eye since the eyelid has a more uniform appearance compared to the eye. If the eyes are detected as being closed, then feedback from the guidance module may be provided to the user, e.g., by voice prompt or by a message on a screen to open their eyes.

Determination of Compression Artifacts.

The evaluation module or engine may determine, calculate or estimate an expected amount of compression artifacts that compression may introduce to a set of biometric data. The amount compression artifacts, as determined, can provide a metric for measuring the degree of compression artifacts and their impact on performance of subsequent automatic or manual recognition processes. This method may be implemented by modeling the compression artifacts, measuring the artifacts in the image, and comparing the measured artifact level to a pre-computed table that lists performance of automatic or manual recognition with respect to the measured artifact level, for example. The values in the table can be pre-calculated or pre-determined by taking a pristine, non-compressed set of biometric images, and compressing the images to different sizes, which may result in different artifact levels depending on the size of the compressed image. Highly compressed images may have more compression artifacts compared to less compressed images. Automatic recognition algorithms or manual recognition protocols may be performed on the various compressed image sets, and the performance of the recognition methods may be tabulated versus the known ground truth performance. This pre-computed table can provide an index that relates the image artifact level to a desired level of performance of the particular recognition method. An example of a means for detecting artifacts, e.g., in the case of JPEG compression, is to perform a block detector filter on the image, to detect block artifacts that result from JPEG compression.

System for Efficient Compression of Biometric Images, Including Pre-Processing

Figure 3F:
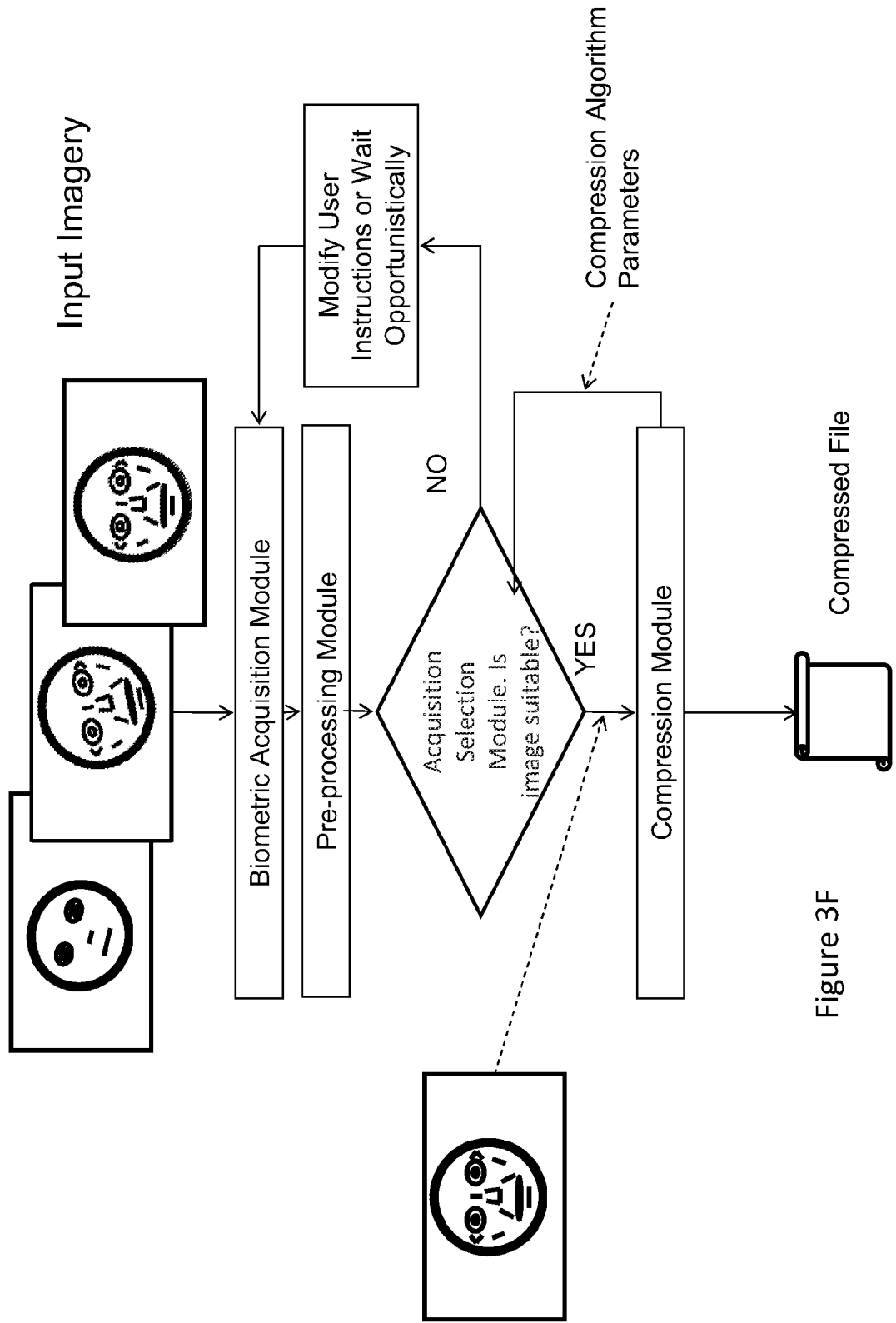
FIG. 3F depicts one embodiment of a system for efficient compression of biometric data, using a pre-processing module.

For an image to be classified to be retained or transmitted for subsequent compression, the evaluation module may required a specific set of desired criteria, which may include any of the criteria described herein, to be met. If an image acquired is determined to be not optimal for compression, the device may prompt the user to perform an action, such as rotating the device, adjusting for illumination, or bringing the device closer to the user, so that there is a higher probability that an optimal image can be acquired. In some aspects, pre-processing may be performed (e.g., by a processor of the biometric acquisition device), in an attempt to compensate for the sub-optimal acquisition. In some cases, the compensation attempt may not be successful, but in others it may be successful as discussed herein. An advantage provided by the disclosed systems and methods is that the range of images that can be acquired and that are suitable for compression without special intervention by the user is increased. Referring to FIG. 3F, one embodiment of a system for efficient compression of biometric data, using a pre-processing module, is depicted, including some functional steps of the system. By way of illustration, a Pre-Processing Module may interface between the Acquisition Module and the Acquisition Selection Module, or interface between the Acquisition Selection Module and the compression module. The pre-processing Module may comprise several sub-modules each dedicated to different compensation methods.

Figure 3G:
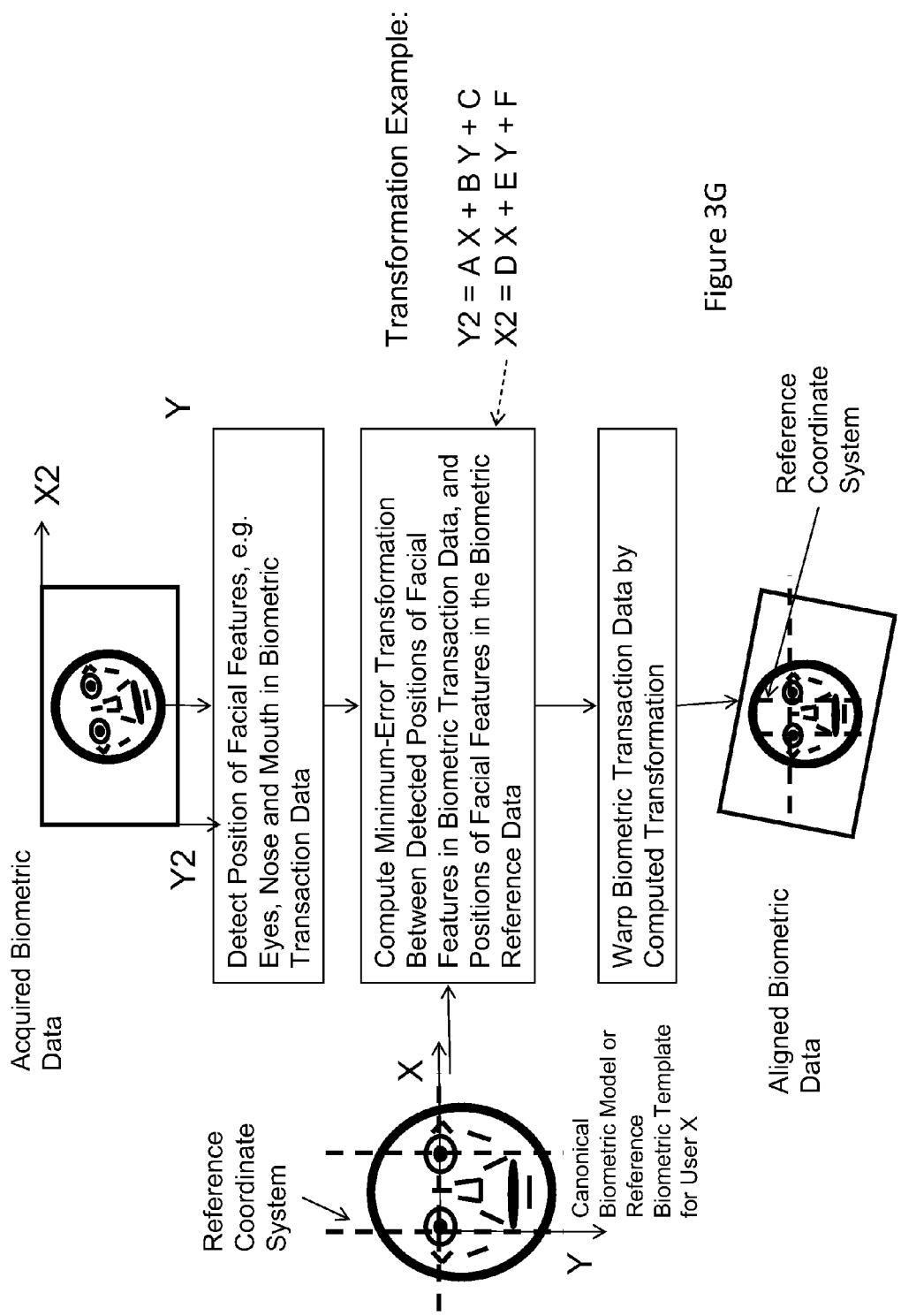
FIGS. 3G and 3H depict one example embodiments of a pre-processing sub-module.

Referring to FIG. 3G, one example embodiment of a Pre-Processing Sub-Module is depicted, including functional steps of the sub-module. Facial image is used as an example although other biometric data can be used as discussed herein. Biometric data may be registered or stored according to a common coordinate system. This is illustrated in FIG. 3G for the case of facial data. Raw biometric data may be acquired by the biometric acquisition module in coordinate system X2, Y2, which may be the coordinate system of the sensor or camera on the device. The steps in FIG. 3G are an example of a method to recover a transformation between raw biometric data and a known or predetermined canonical reference biometric model that is valid for all users or a particular set of users. Alternatively, or in addition, a specific reference biometric template that is valid for a particular user can be used. The example transformation, shown on the right side in FIG. 3G, is an affine transformation, but may also be a translation, rotation and zoom transformation, as examples. The method for recovering the transformation in FIG. 3G may include recovering locations of eyes, nose and mouth in the raw biometric data and determining a transformation that recovers a least squared error between the locations and the corresponding locations in the reference template. Various methods may be employed by the sub-module for recovering the positions of such features in images such as facial images. The sub-module may employ various methods for aligning known features with respect to each other in order to recover model parameters, such as [Bergen et al, "Hierarchical Model-Based Motion-Estimation", European Conference on Computer Vision, 1993].

Based on the recovered model parameters, the sub-module may warp, orientate, resize, stretch and/or align the raw biometric data to the same coordinate system as the reference biometric data, e.g., as shown by the vertical and horizontal dotted lines in the aligned biometric data in FIG. 3G. This alignment step may be performed for all acquired biometric data classified under a specific group (e.g., biometric data expected to be associated with a particular person). This step may modify one or more of: the translation of the image (e.g., related to biometric criteria 1), the zoom of the image (related to biometric criteria 2—image resolution), and the orientation of the image (related to biometric criteria 3). There may not necessarily be a direct one-to-one relationship between, for example, the zoom parameter and the image resolution criteria since a heavily zoomed-out image can be brought into registration to a canonical zoomed-in image geometrically using an affine transform, but the actual biometric data may be heavily interpolated and low quality, and thus not suitable for subsequent automatic or manual recognition. The evaluation module can ensure that unsuitable images are not acquired for compression, by for example determining the geometric transform between the acquired data and the canonical data as described, determining whether the translation parameters are within a pre-determined range, whether the zoom parameter is within a pre-determined range, whether the rotation parameter is within a pre-determined range, and/or whether the translation parameters are within a pre-determined range.

Figure 3H:
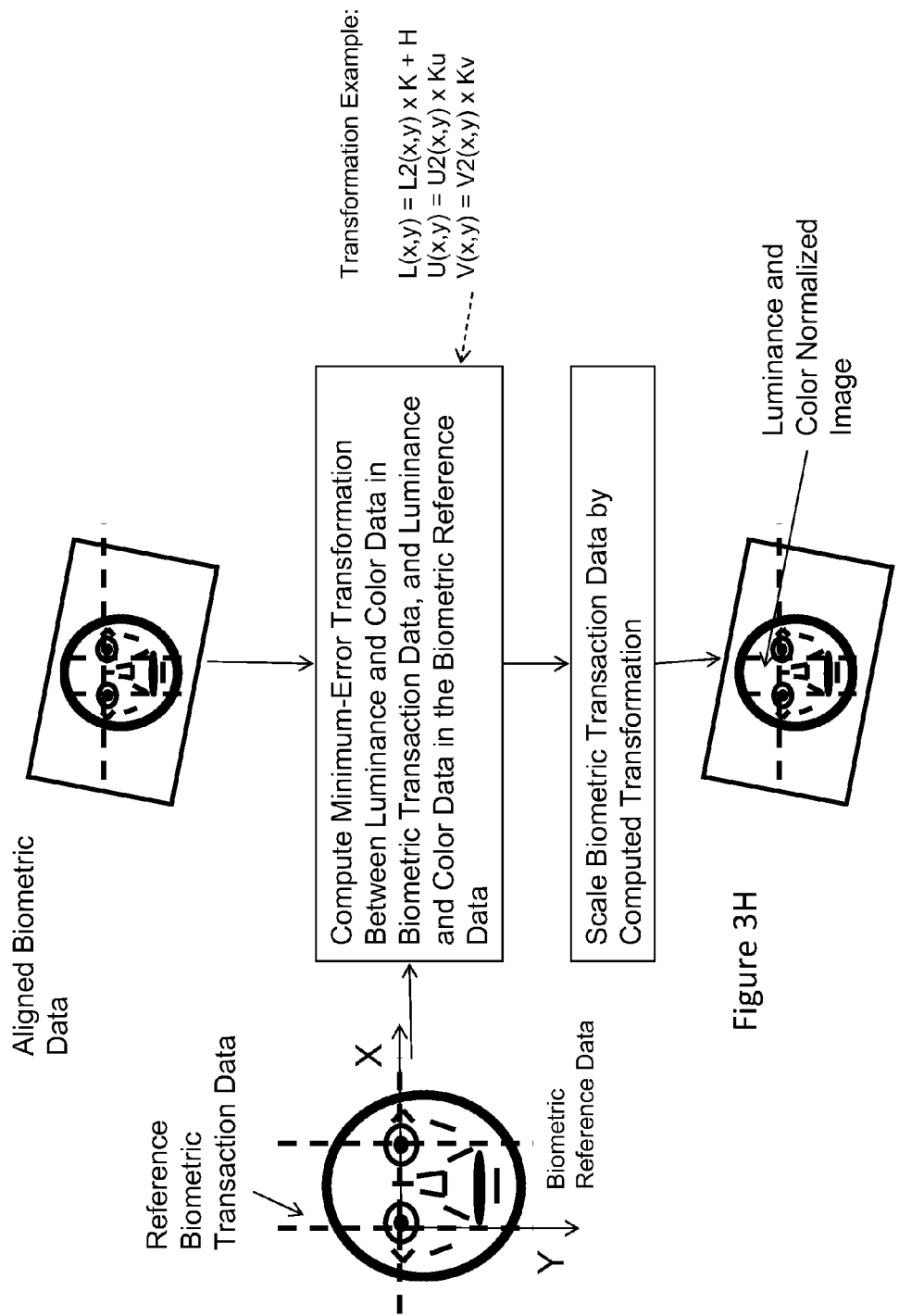

Referring to FIG. 3H, one embodiment of a pre-processing sub-module is depicted. The pre-processing sub-module may normalize the acquired biometric data to a common illumination and/or color reference. Illumination differences in the biometric data can occur due to differences in ambient illumination that is present during different transactions. The system can overcome these differences by computing or leveraging on a model of the illumination difference between the aligned biometric data and the reference biometric data. In the example shown in FIG. 3H, the model comprises a gain and offset for the Luminance L, and a gain for the U and V color components of the image data. LUV (or sometimes known as YUV) may be used to represent color images. The model may be determined or computed by calculating the parameters that yield a minimum least squares difference or error between the aligned biometric data and the reference biometric data. The aligned biometric data may be transformed by the model (e.g., by the sub-module) to produce an illumination-compensated, aligned pre-processed biometric data, for example as shown at the bottom of FIG. 3H. This compensation or modification is related to or addresses biometric criteria 4 (maximum and minimum brightness of intensities). There may not be a direct one-to-one relationship between the intensity-transformed image data and biometric criteria 4. For example, the original image may be very saturated or very dark so that even though the images are technically adjusted so that the intensities lie within a pre-determined range, the images may be too noisy or too clipped for use for subsequent automatic or manual recognition. The sub-module may therefore determine whether the illumination transform parameters are within a threshold range to ensure that such imagery is not acquired.

Multiple Biometric Data Grouping and Sorting

As described, the system can acquire and select biometric data for an individual transaction on the basis of whether the biometric data meets criteria that are optimal for both compression and quality of the biometric data for subsequent automatic or manual recognition. The system may further comprise a classification or grouping module, to group and sort multiple biometric data that was selected from individual transactions, to further optimize subsequent compression and reduce the required disk space or transmission bandwidth for the data.

The classification module may group a plurality of transactions on the basis of which user or individual is expected to use a particular device or set of devices, or provide the corresponding sets of biometric data. This method may be performed by detecting or identifying a device ID or account ID associated with a particular individual. This is as opposed to treating all transactions separately without any consideration of grouping, or by using only temporal (e.g., time-based) grouping for example.

Referring again to FIG. 3B, the table may include a plurality of transactions grouped on the basis of who is expected to use a particular device or set of devices, or whose biometric data is expected to be acquired during the transactions, is depicted. The left column shows a transaction number or identifier, the middle column shows the biometric data acquired, and the right column includes a comment or description on the biometric data acquired. For the vast majority of these transactions, the biometric data acquired may correspond to the same expected person. An exception is shown in transaction 4, where the biometric data acquired corresponds to a different person since it was a fraudulent transaction for example. However, fraudulent transactions are typically infrequent, and even only considering higher risk online transactions (compared to lower-risk point of sale transactions), then only 2.1% of online transactions may be fraudulent Thus, if there are 100 online transactions purported to be performed by a particular user, then statistically approximately 98 of the those transactions may involve acquisition of biometric data for that user, and about 2 would be that of a fraudulent user.

In certain cases, the time between transactions for a given user may be typically measured in hours or days, or weeks, and it may be atypical for the time between transactions to be extended (e.g., years for example). The closer the transactions are in time for a particular user, the more likely it is that the appearance of the user remains relatively similar between transactions. For example, most natural appearance changes such as aging (e.g. wrinkle-formation) occur over an extended period of time, e.g., over years and not months. Certain infrequent appearance changes can occur, such as a new hairstyle, scar or a new beard, but such events are typically step events that happen at one instance in time and are remain stable for a period of time afterwards.

The classification module of the system may group sets of biometric data or biometric receipts by the identity of the expected person (e.g., the person expected to use a particular device or set of devices, or having access to the transaction, or otherwise likely to provide the biometric data), and then use the statistical likelihood of similarity (e.g., in appearance) of the acquired biometric data to significantly improve the compression of the set of biometric data.

These sets of biometric data (e.g., pre-processed) can be fed to a compression module applying a compression algorithm designed to take advantage of the similarity in data between adjacent data sets. Examples of such compression algorithms include algorithms that compute motion vectors and prediction errors between frames, such as MPEG2 and H.264. These algorithms may be used for compressing video sequences where each image in the video is acquired literally fractions of seconds apart, typically with equal time separation between each image, and where the data may be stored and recovered in the temporal order in which it was acquired.

In the disclosed systems and methods, each biometric data set may be acquired at different times that may be minutes or hours or weeks apart, acquired from different devices, and/or stored in an order that is different to the temporal order in which the data was acquired. However, due at least to any of the evaluation, pre-processing and/or grouping steps disclosed herein (e.g., the first and second and third steps), the images fed into the motion-compensation compression algorithm should generally have similar characteristics to a video sequence. For example, due to the grouping step as well as due to the low likelihood of acquiring data from a fraudulent user as described earlier, then it is probabilistically likely that the same person is present in successive frames of the images fed into the compression algorithm, much like in a video sequence in which the same object appears in successive frames.

Additionally, due to the alignment step, corresponding features between images do not jump or place randomly between frames or data sets, much like the consistent position of objects between frames in a video sequence. Further, due to the color and illumination normalization step, the brightness, contrast and/or color of the biometric data sets are not likely to vary substantially between frames even if they were acquired months apart, much like the brightness and color of adjacent frames in a video sequence are similar. If the occasional aligned, and illumination and color compensated biometric data set does not appear like the previous frame in the grouping (e.g., due to the occurrence of a fraudulent transaction, or the growth of a beard for example), compression algorithms employed by the compression module that use motion vectors and prediction errors can still encode the data, but not as efficiently as they otherwise could, since the prediction errors may be substantial and may require significant bits for encoding. However, these events are more likely to happen infrequently as discussed earlier. The analogy in the compression of video sequences is the occurrence of a scene cut, which typically results in a dramatic appearance change but happens very infrequently.

By determining or calculating a delta change or difference (hereafter sometimes referred to as a "delta" or "difference") between data sets, the compression module can for example compress the delta instead of each individual data set. Incremental deltas can be determined between successive data sets. Such deltas, or incremental deltas, can be contained in delta or difference files, and compressed individually or as a collection.

Referring now to FIG. 3I, one embodiment of a system for efficient compression of biometric data sets is depicted. Pre-processed biometric data may be fed a compression algorithm described above, resulting in a highly compressed database of biometric data (e.g., due to the use of deltas and compression thereof).

Figure 3J:
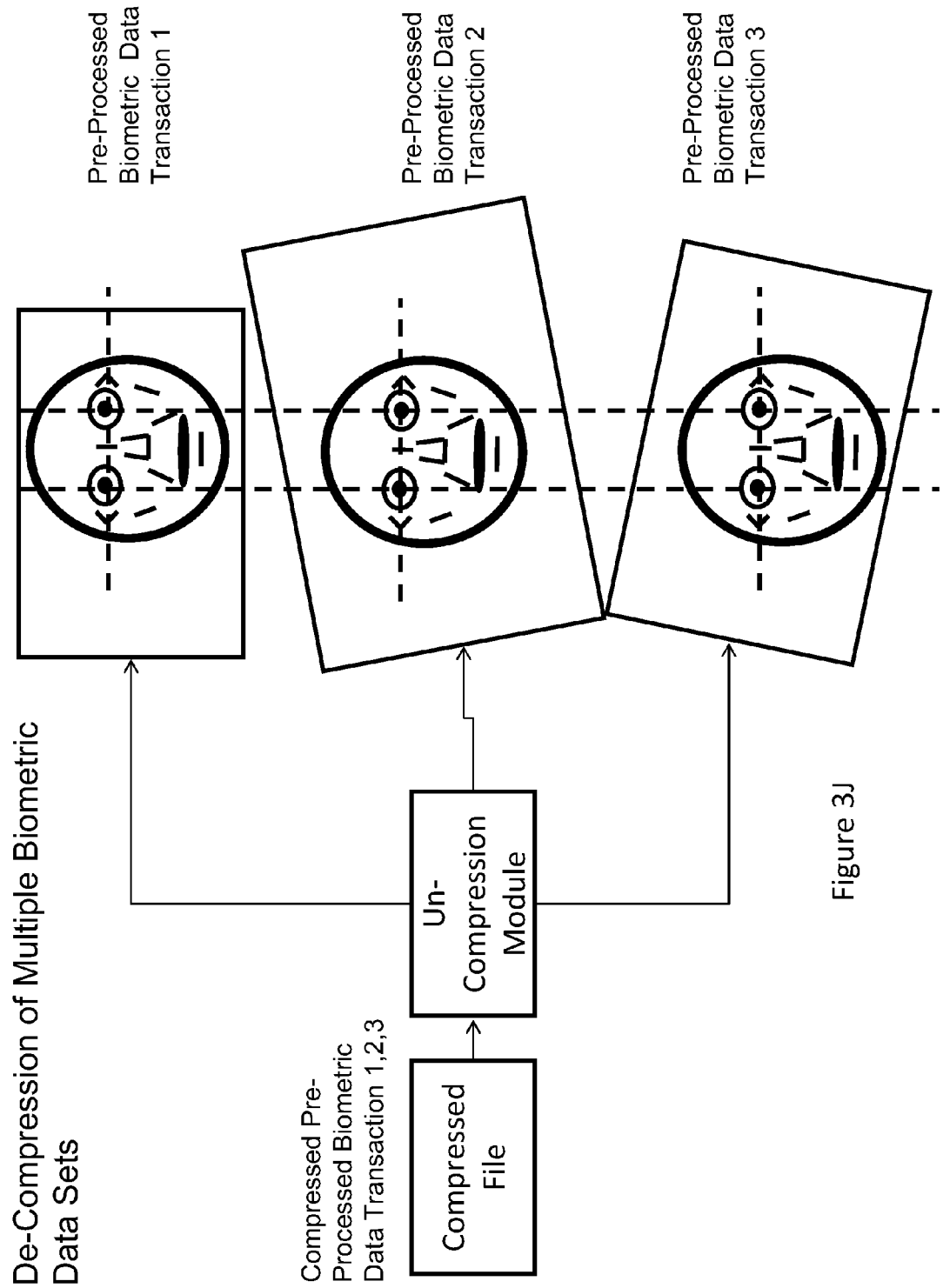
FIG. 3J depicts one embodiment of a system for recovering biometric data sets from compression.

Referring now to FIG. 3J, one embodiment of a system for recovering biometric data sets from compression is depicted. Compressed data can be recovered by uncompressing a delta file or a compressed collection of deltas. In some cases, the compression module may uncompress or recover deltas in the appropriate sequence (e.g., transactional or ordering sequence) to recover the data sets in the correct sequence or order.

Figure 3K:
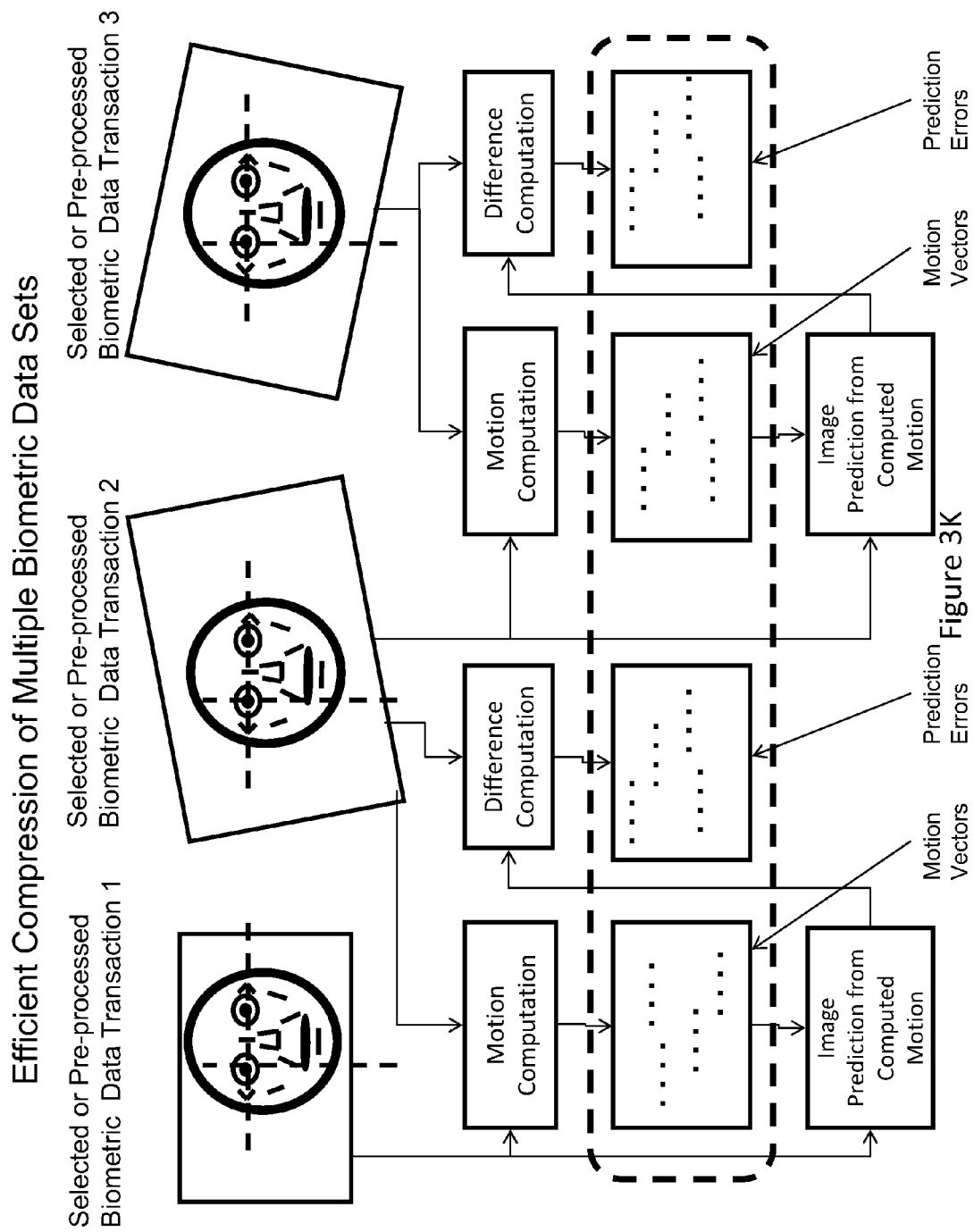
FIG. 3K depicts one embodiment of a system for efficient compression of biometric data.
Figure 3L:
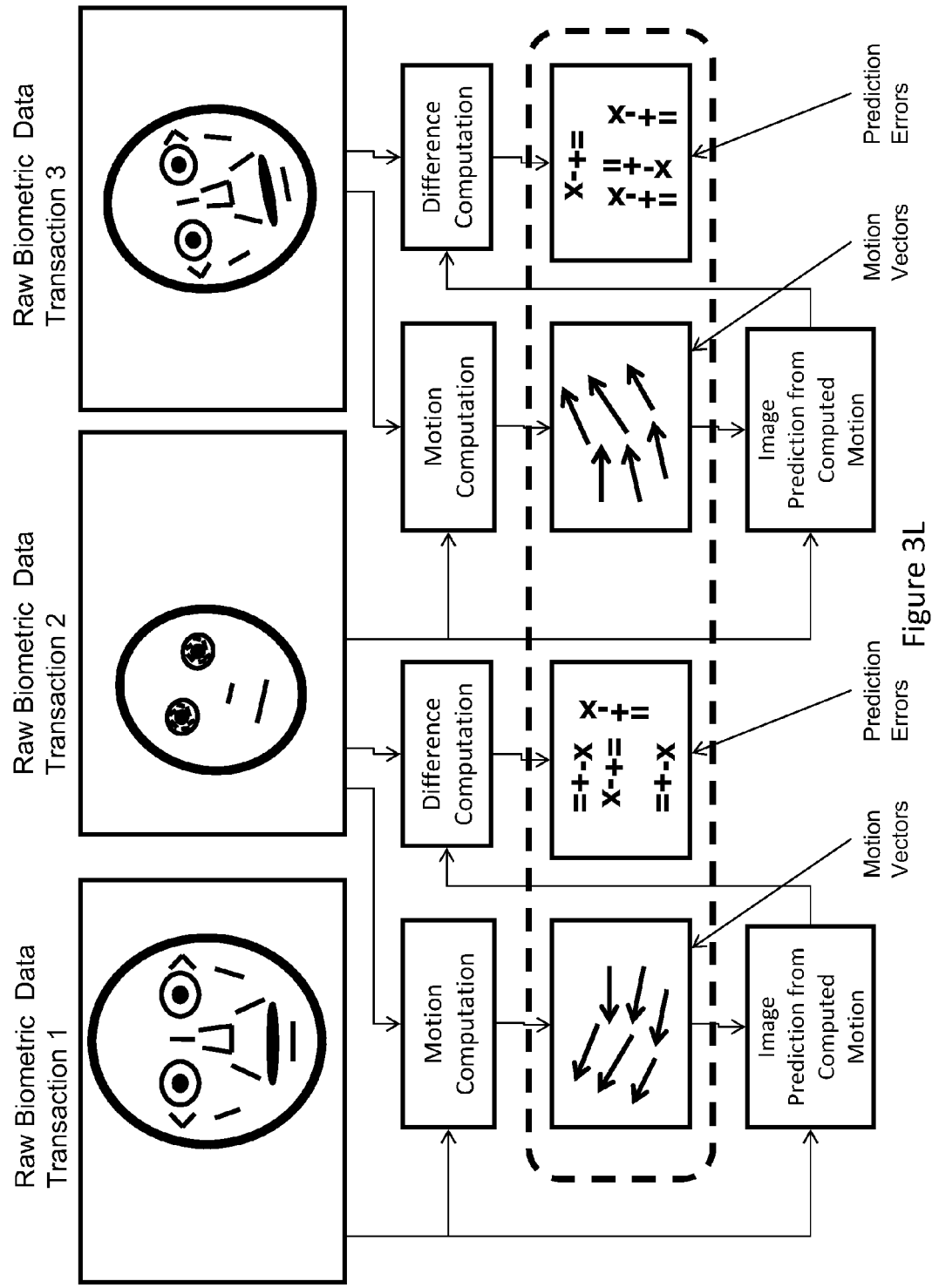
FIG. 3L depicts one embodiment of a system for compression of data.

Referring now to FIG. 3K, one embodiment of a system for efficient compression of biometric data is depicted. The sequence-based compression algorithm of the system may use motion vector computation and/or prediction error computation as bases for compression. Selected or Pre-processed biometric data is shown in sequence at the top of the figure. In the compression algorithm, motion or flow vectors are computed between successive pre-processed biometric images fed into the algorithm. These flow vectors are stored and may be used to warp a previous image to make a prediction of what the successive image may look like. The difference or delta between the predicted image and the actual image may be stored as a prediction error. The result is that by storing just a first pre-processed biometric image (compressed using standard JPEG or JPEG2000 compression methods) together with a series of flow vectors and prediction errors, a long sequence of biometric images can be stored. Significantly, due to the steps described above, the flow vectors and the prediction errors can be extremely small (e.g., as shown by the dots in the dotted rectangular area in FIG. 3K, which may represent small deltas in image pixels), which results in extremely efficient compression since the pre-processed biometric data has been modified to be statistically a very good predictor for the next pre-processed biometric data. Referring now to FIG. 3L, another embodiment of a system for compression of data is depicted. This figure illustrates how inefficient a compression algorithm can become, comparatively, if there are image shifts and/or illumination differences between the biometric data. Flow vectors and/or the prediction errors (e.g., shown in the dotted rectangle, and represented by symbols such as arrows) are now significant in magnitude and complexity between images, and may not encode nearly as efficiently as the small flow vectors and prediction errors resulting from the method and system illustrated in FIG. 3K.

Each of the alignment, and illumination and color compensation pre-processing steps performed by the pre-processing sub-modules before compression can each independently or cumulatively improve compression performance, e.g., depending on the compression requirements.

Figure 3M:
FIG. 3M depicts an example embodiment of a biometric image.

Referring now to FIG. 3M, an example embodiment of a biometric image is depicted, with a table showing a corresponding result of compression of the being geometrically misaligned, compared to a version of the image that is geometrically aligned. The file size of the aligned data set is significantly smaller than that of the unaligned data set. For this illustration, the compression module applied MPEG compression (e.g., an embodiment of the implementation is located at www.ffmpeg.org), and the quality of the image was set to be a constant for each test.

Figure 3N:
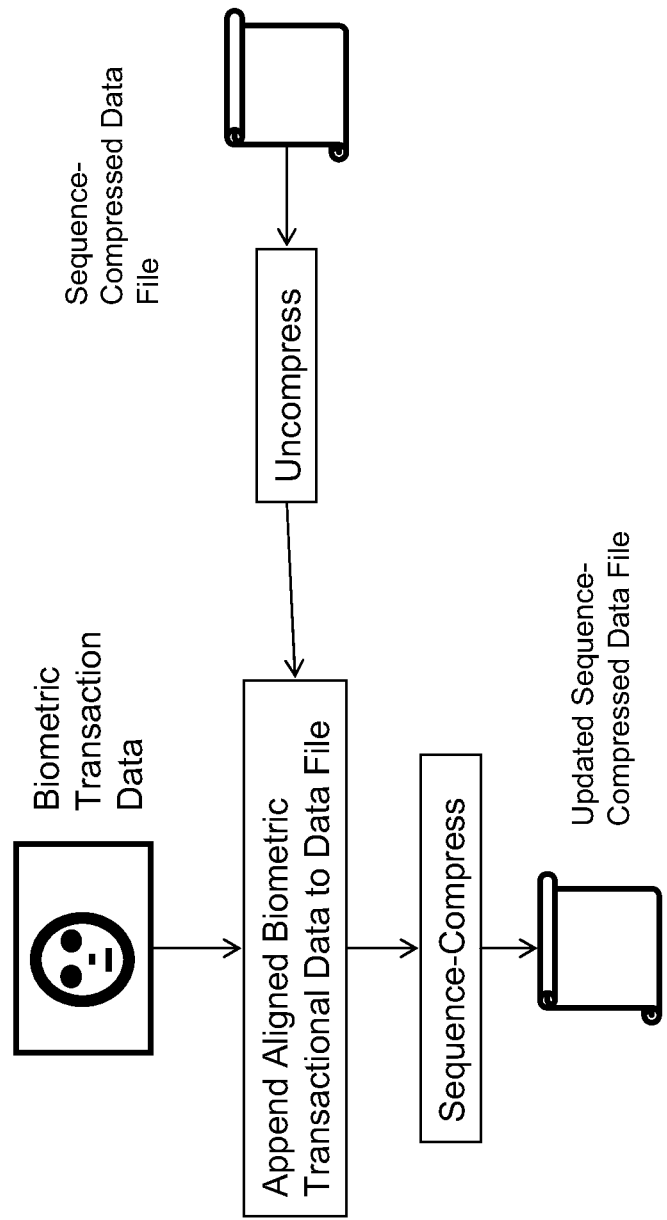
FIG. 3N depicts one embodiment of a system for appending biometric data to a sequence-compressed data.
Figure 30:
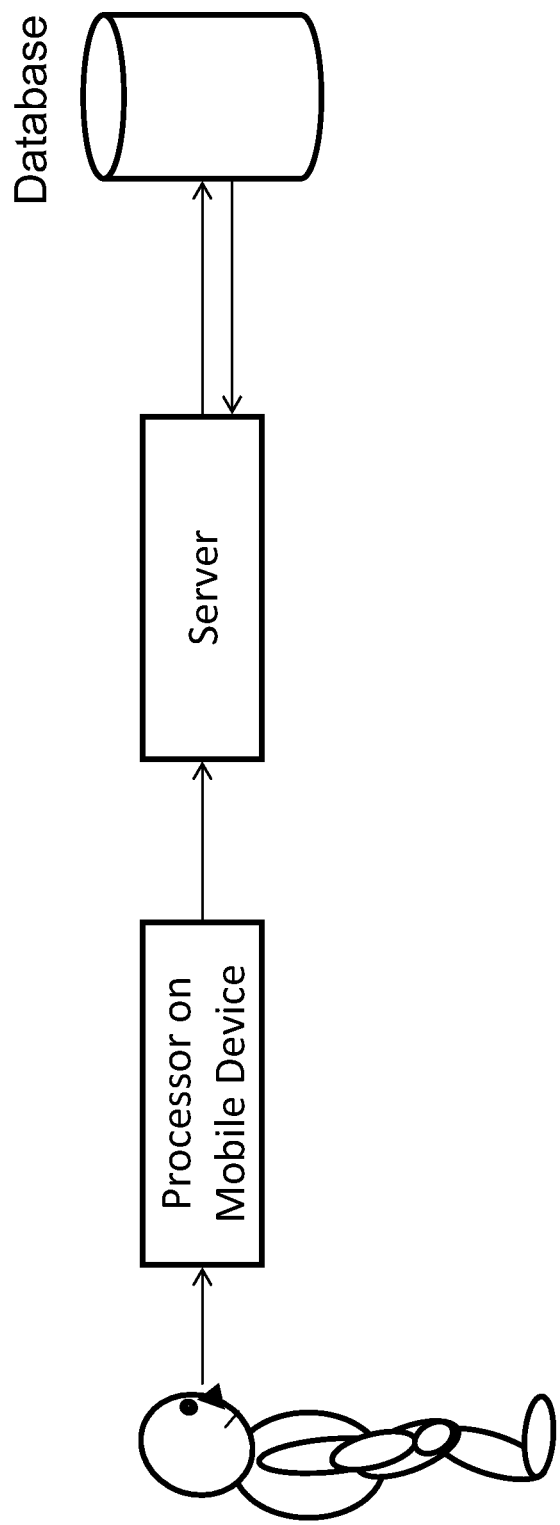

Referring now to FIG. 3N, one embodiment of a system for appending biometric data to a sequence-compressed data file is depicted. Biometric data may be selected and/or pre-processed as disclosed. An existing compressed transaction-sequence file may be uncompressed either in whole or in part, and a new set of biometric data (or delta) is appended to the transaction-sequence file, and the transaction-sequence file recompressed.

Referring now to FIG. 3O, an illustrative embodiment of a system for efficient compression of biometric data is depicted. FIG. 3O illustrates how the disclosed methods and algorithms may be performed on specific hardware. For example, the biometric data may be (1) acquired, (2) pre-processed and/or (3) compressed on a mobile device, and may be (4) sent to a server for storage in a database, where the compressed file may (5) read from the database, (6) decompressed, the pre-processed biometric data is (7) appended to the decompressed file, (8) recompressed and (9) stored on the database.

Non-Facial Biometrics

Figure 3P:
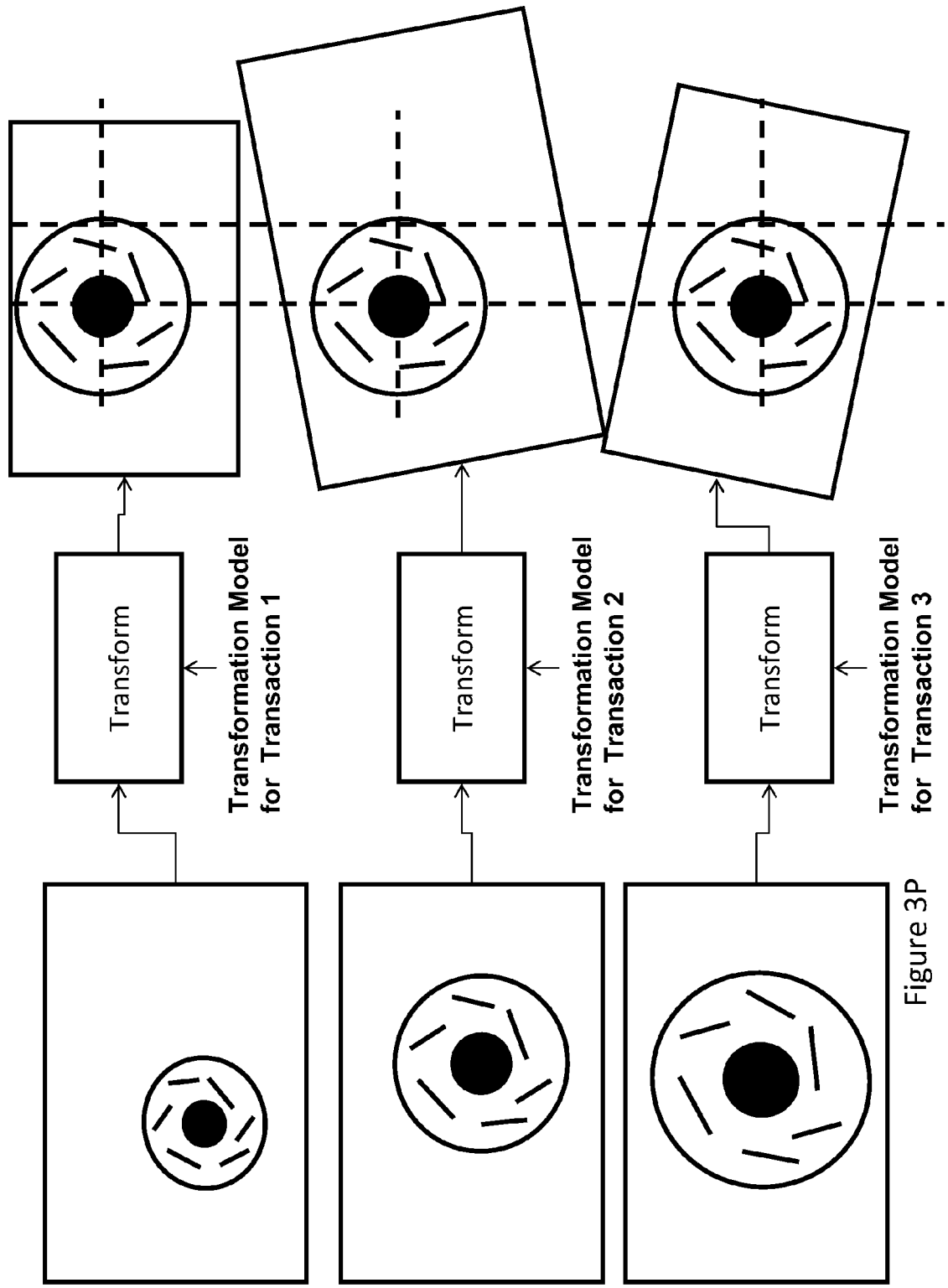
FIG. 3P depicts one embodiment of a method for pre-processing biometric data.

Referring now to FIG. 3P, one embodiment of a method for pre-processing biometric data (e.g., to center and orientate the image) is depicted. FIG. 3P illustrates how the pre-processing methods can be used for a wide variety of biometric data, for example, iris biometric imagery. In this case, the iris biometric imagery may be selected and acquired at different zoom settings and camera/user positions, and may be pre-processed such that the images are aligned to the same coordinate system, as described earlier. This may be performed by recovering parameters describing the pupil and iris, and mapping them onto a reference or canonical set of pupil and iris parameters.

Figure 3Q:
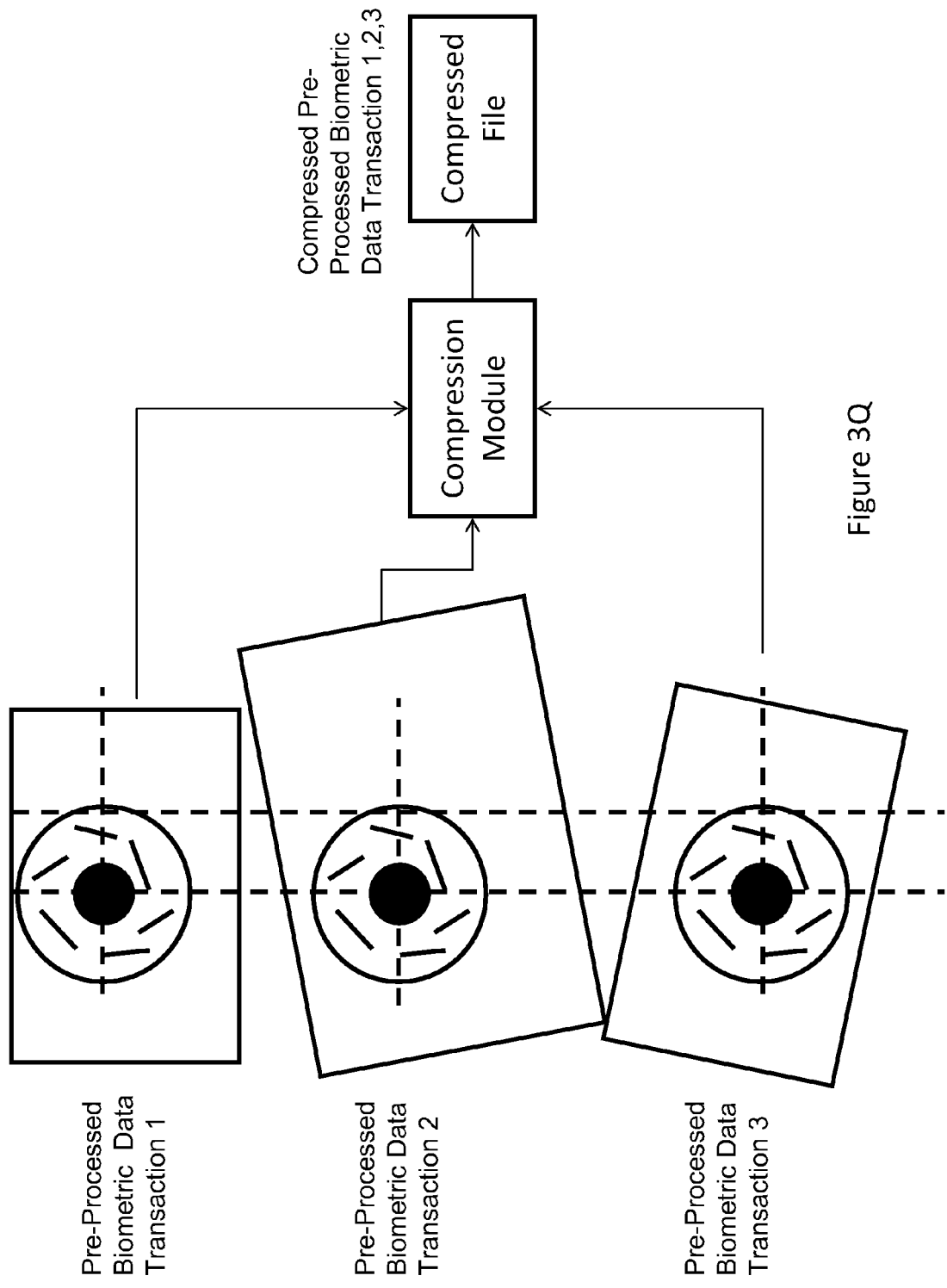
FIGS. 3Q and 3R depict aspects of a method for pre-processing biometric data.

Referring now to FIG. 3Q, another aspect of a method for pre-processing biometric data is depicted. Pre-processed biometric data sets may be sent to the pre-processing module's motion-compensation based compression algorithm.

Figure 3R:
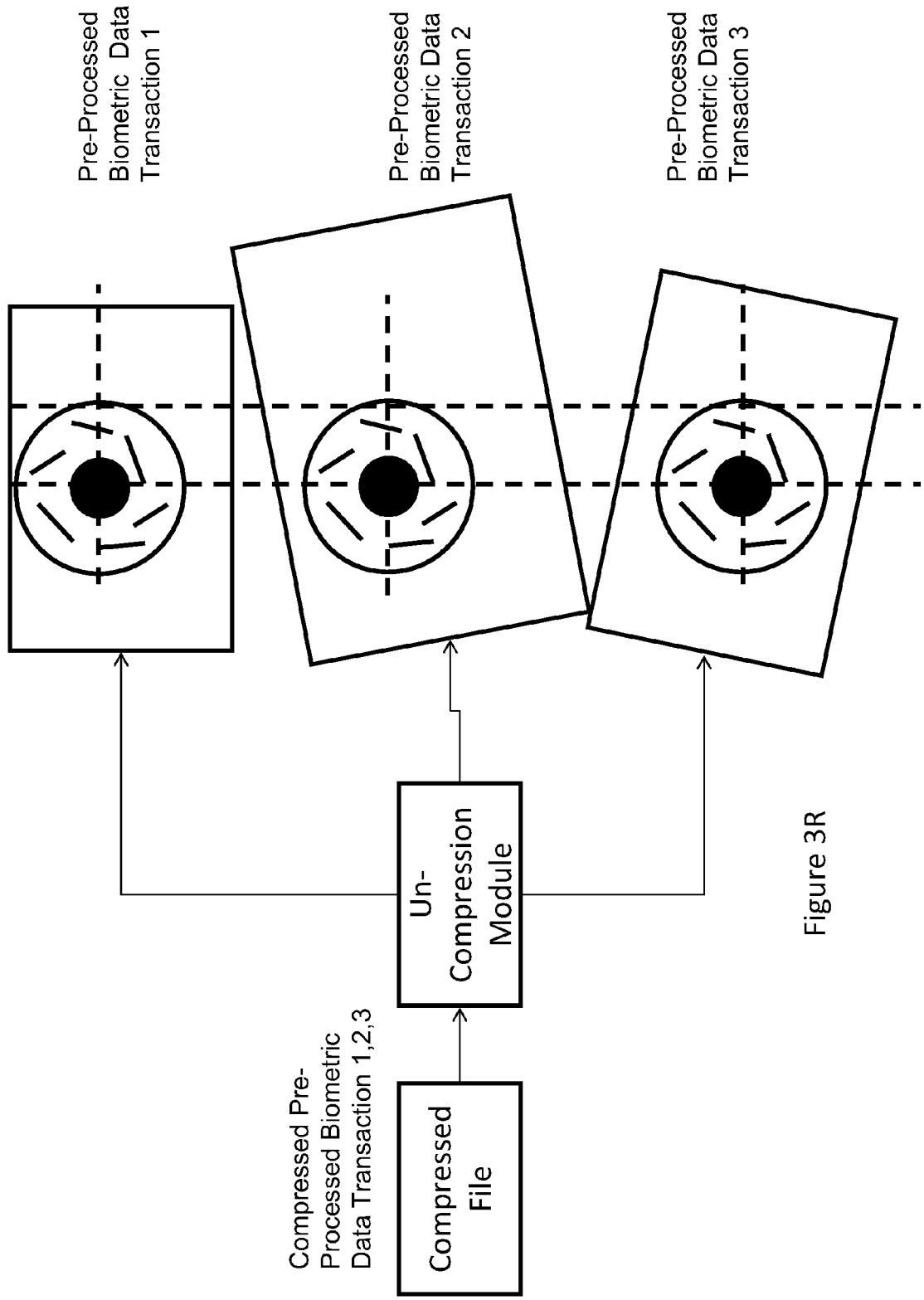

Referring now to FIG. 3R, yet another aspect of a method for pre-processing biometric data is depicted. FIG. 3R illustrates how the motion-compressed data may be uncompressed in a substantially similar same way as with facial data.

Figure 3S:
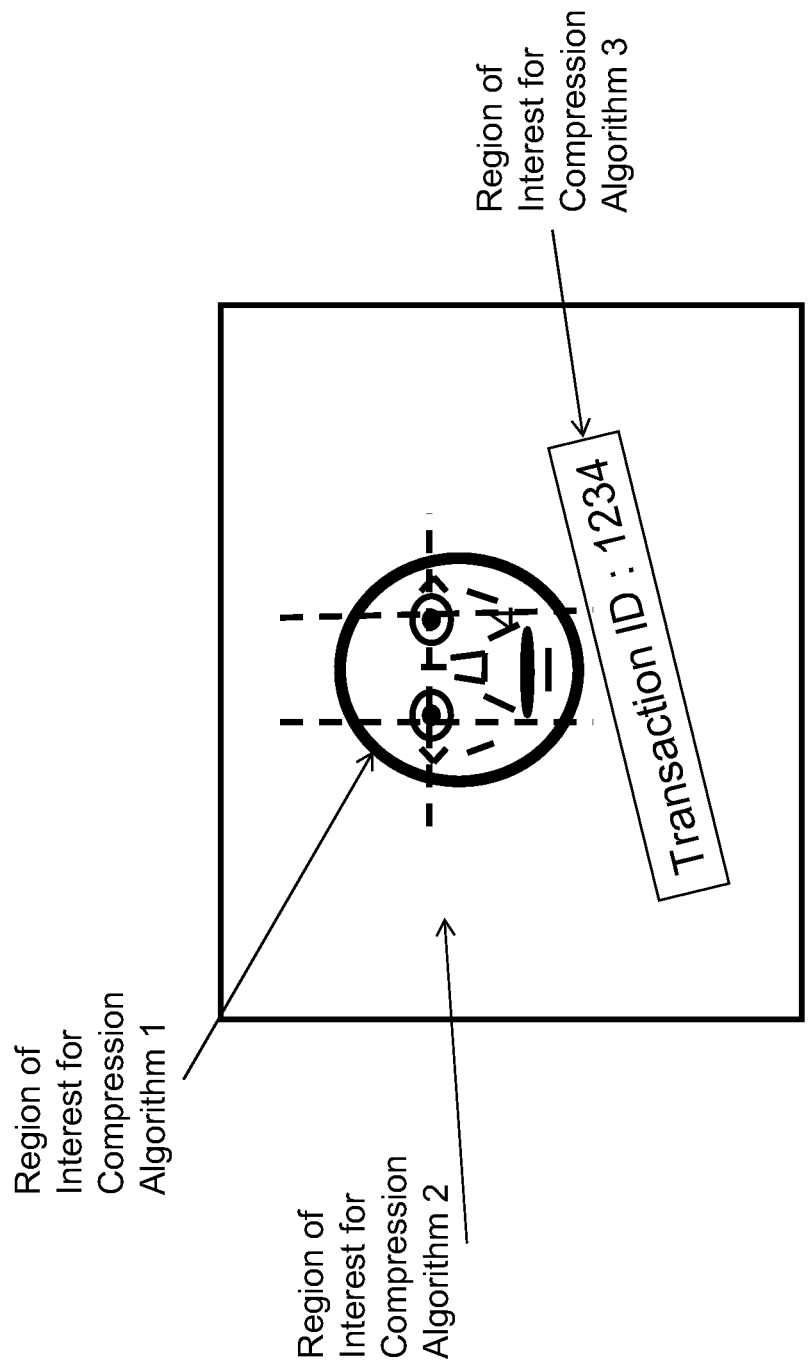
FIG. 3S depicts one embodiment of a biometric receipt employing multiple compression algorithms.

Referring now to FIG. 3S, one embodiment of a biometric receipt employing multiple compression algorithms is depicted. The present systems and method recognizes that it may be desired to compress different regions of the image using different parameters of the compression algorithm. For example, it may be desired to have a very high resolution image of the face of the user, but the background can be compressed at a lower resolution since it is less significant for the purposes of automatic or manual recognition of the user. Similarly, it may be desired to store text or other information in great detail on the image even though such information may comprise just a small portion of the image. The compression module can accomplish this by storing or applying a compression-parameter mask or mask-image (e.g., in the same reference coordinate system described earlier).

The mask may include one or more regions shaped to match how compression characteristics may be required or desired. For example, in FIG. 3S there are 3 mask regions: (i) a region for the face (e.g., a region of influence for automatic or manual biometric recognition), (ii) a region for the background, and (iii) a region for text describing the transaction (e.g., a region of influence for biometric deterrent). Raw acquired biometric data may be aligned or warped to the reference coordinate system, as disclosed earlier, such that the masked regions can correspond to the regions in the warped biometric data. The mask image may be used to call up specific compression parameters for each region, which are then applied in the corresponding regions in the warped biometric data as shown in FIG. 3S.

By selectively applying different compression techniques or compression levels, more data storage space or transmission bandwidth can be recovered since fewer bits are used to encode the background, for example. A user may perform transactions in multiple locations, and so while the user's pre-processed biometric data (facial data for example) may appear very similar between transactions (e.g., small delta), but the background data could appear very different between transactions (large delta for compression). This selective compression technique allows the context of the background to still be encoded but with a different (e.g., typically lower) precision compared to that of the biometric data itself, thereby optimizing the use of compression data bits across the image, and potentially minimizing storage space even further.

Figure 3T:
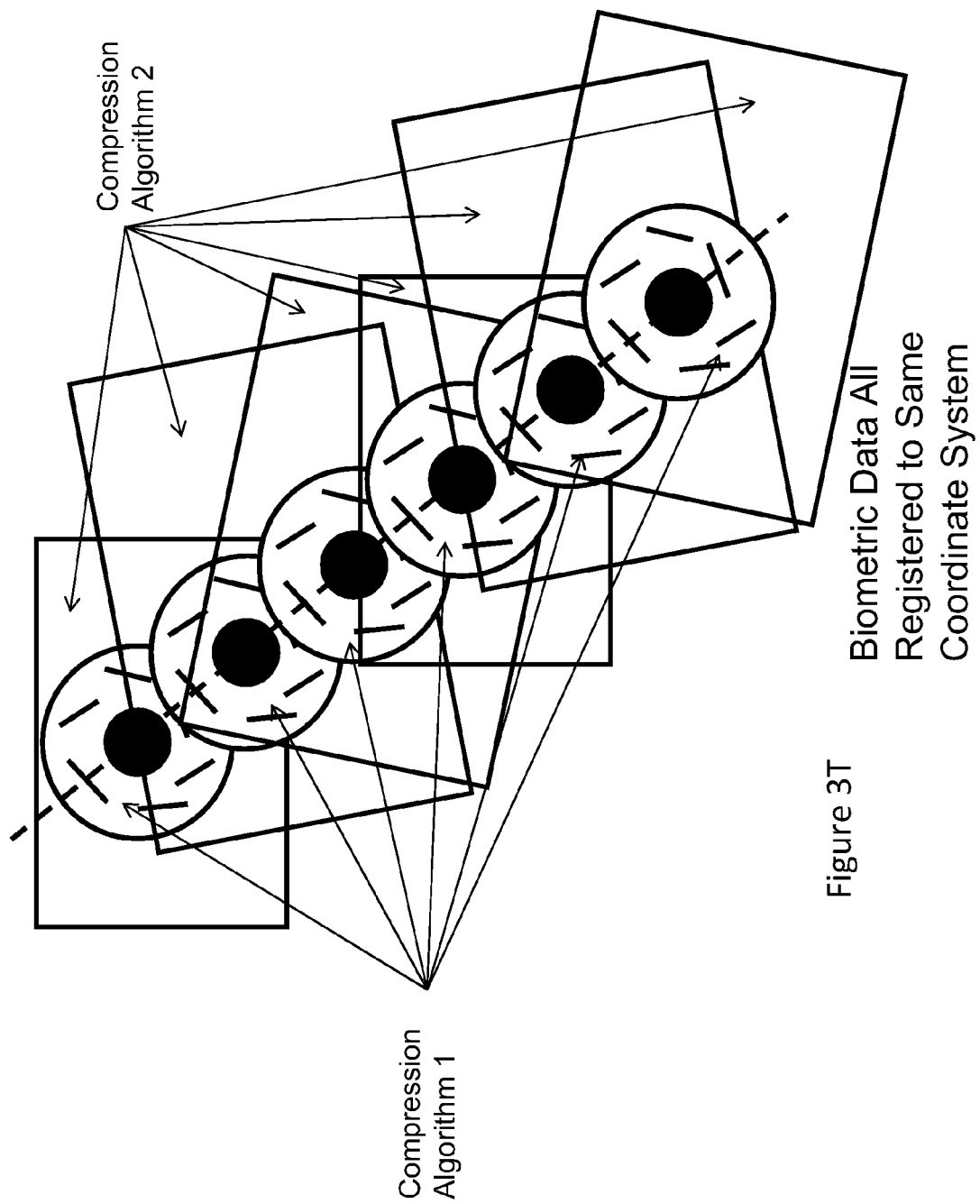
FIG. 3T depicts one aspect of a biometric pre-processing method.

Referring now to FIG. 3T, one aspect of a biometric pre-processing method is depicted. The disclosure has described a grouping of biometric data on the basis of an expected identity of the subject that provides the biometric data (e.g., identity of the subject expected to have access to particular devices). Here, the classification module may group the biometric data further before compression based on the particular type of device, specific device or software used to perform the transaction, etc. For example, a single user may perform transactions on a home PC, an office smart phone, a personal smart phone, or using a device at a point of sale. These devices may have different sensor resolution, light response and optical/illumination characteristics, and may have different interface software that may require the user to position themselves differently compared to software running on other devices.

The classification module may group together biometric data recovered from similar types of devices, the same device, and/or the same software (e.g., in addition to grouping the transactions on the basis of who is expected to perform the transaction). This grouping is illustrated by the arrows in FIG. 3U, whereby an ungrouped transaction list (e.g., ordered by time) may be shown on the left and a transaction list grouped or ordered by device ID may be shown on the right. By performing this classification, the biometric data are likely to appear even more similar (e.g., even with the alignment and normalization steps), and can therefore compress even more efficiently due using algorithms similar to motion-compensated compression algorithms.

Figure 3V:
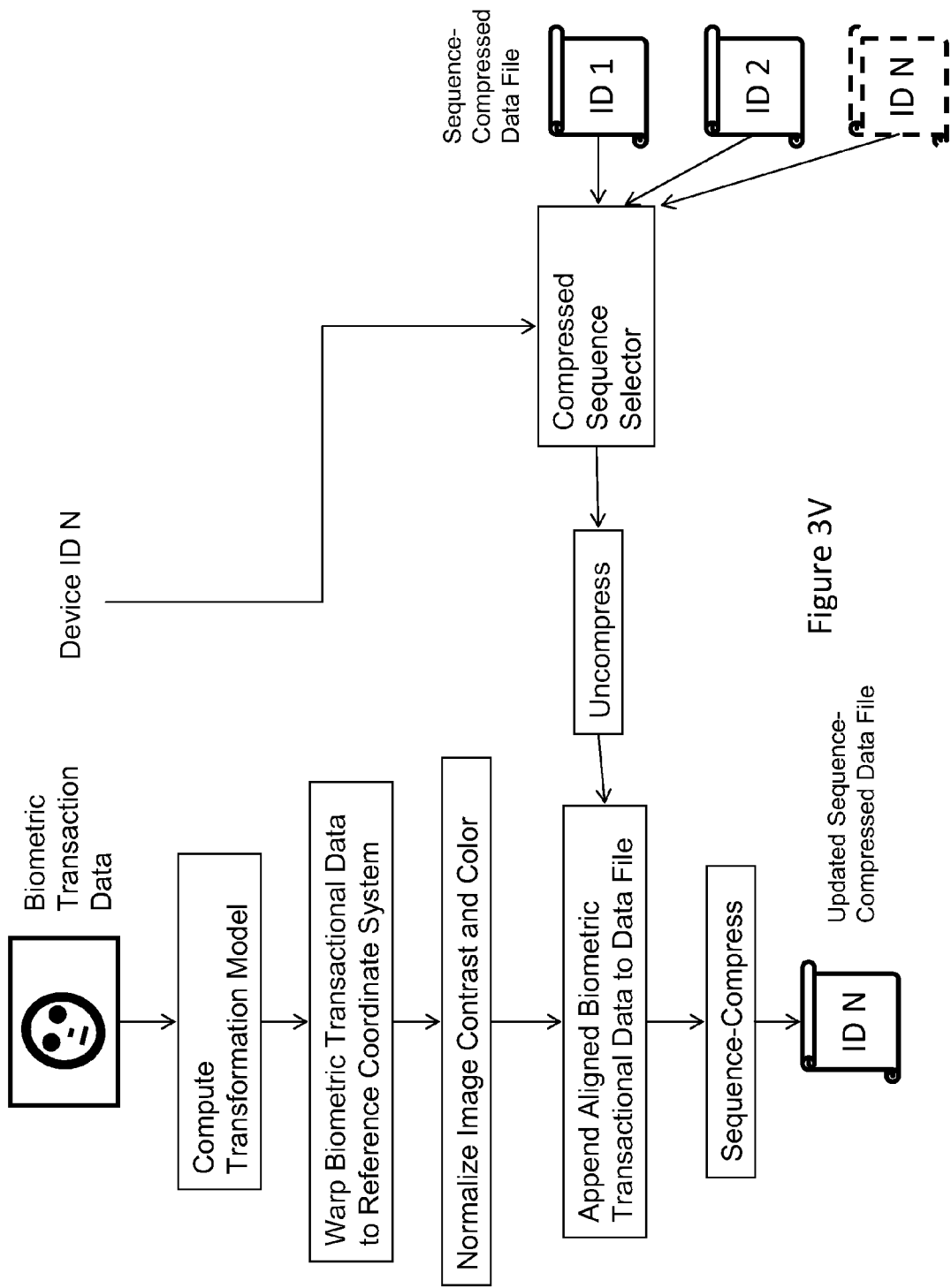
FIG. 3V depicts one embodiment of a system and method for updating sequence-compress files.

Referring now to FIG. 3V, one embodiment of a system and method for updating sequence-compress files is depicted. Multiple compressed data files, or segments of a compressed data file, may include data derived from a particular device. Each device may be identified by a respective device ID. The device ID on which a transaction is performed may be used, for example, to select a corresponding compressed data file, or segment of the data file, to which additional biometric transaction data may be appended.

Figure 3Y:
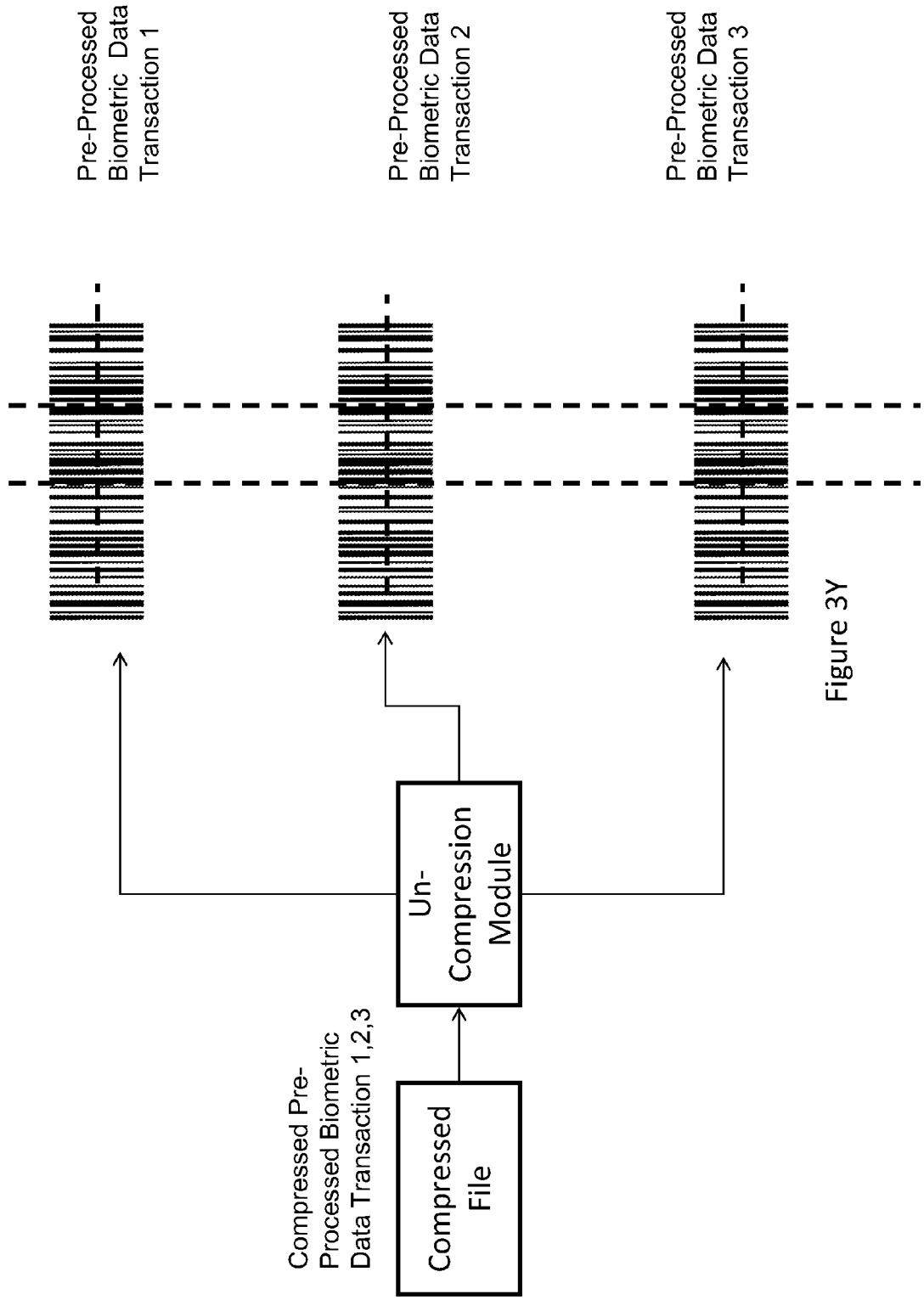

Referring now to FIGS. 3W, 3X and 3Y, embodiments of a system and method for pre-processing or transforming biometric data into encoded data (e.g., templates), are depicted. Biometric data may be transformed or encoded (e.g., FIG. 3W) before being sent to the compression module (e.g., FIG. 3X) (e.g., employing a motion-compensated compression algorithm). Additionally, biometric data may be uncompressed (e.g., FIG. 3Y). The transformation employed on each set of biometric data may include any of the pre-processing methods disclosed above. Each set of biometric data may be transformed by the pre-processing module before being encoded (e.g., by an encoder). In particular, FIGS. 3Q-3R illustrate the case whereby iris imagery can be transformed or mapped onto a polar coordinate system. This method can be used, for example if the specific application requires storage of the encoded form of biometric data, as oppose to the biometric data in raw form.

Figure 3Z:
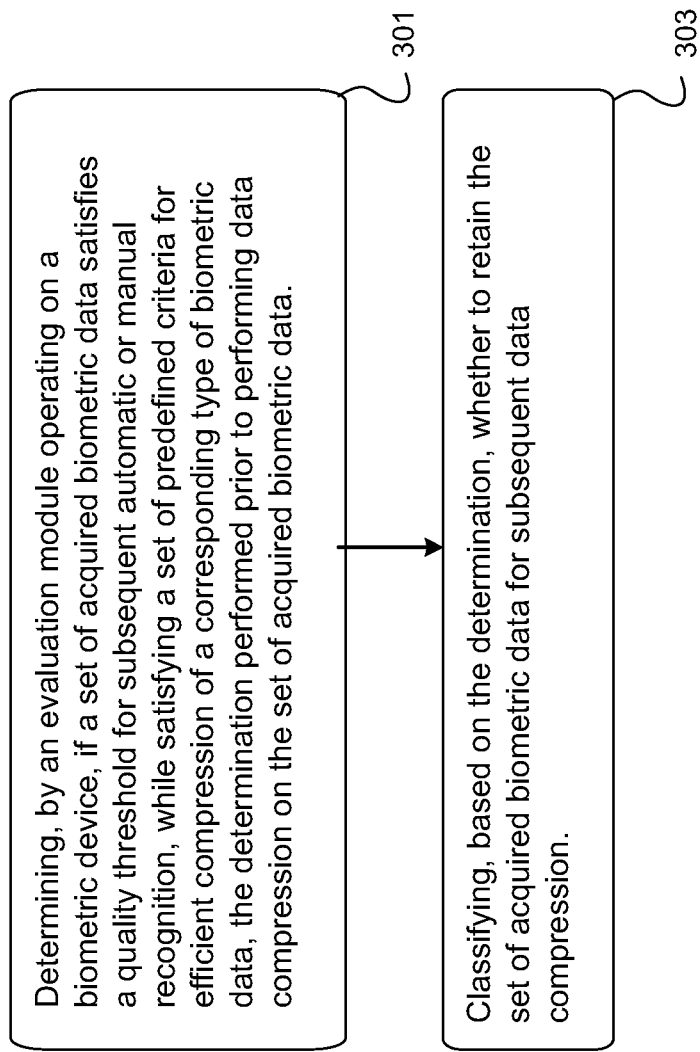
FIG. 3Z depicts one embodiment of a method for selective identification of biometric data for efficient compression.

Referring now to FIG. 3Z, one embodiment of a method for selective identification of biometric data for efficient compression. The method may include determining, by an evaluation module operating on a biometric device, if a set of acquired biometric data satisfies a quality threshold for subsequent automatic or manual recognition, while satisfying a set of predefined criteria for efficient compression of a corresponding type of biometric data, the determination performed prior to performing data compression on the acquired biometric data (301). The evaluation module may classify, decide or identify, based on the determination, whether to retain the acquired set of acquired biometric data for subsequent data compression (303).

Referring to (301) and in further details, an evaluation module operating on a biometric device may determine if a set of acquired biometric data satisfies a quality threshold for subsequent automatic or manual recognition, while satisfying a set of predefined criteria for efficient compression of a corresponding type of biometric data, the determination performed prior to performing data compression on the acquired biometric data. The evaluation module may determine if a set of pre-processed biometric data satisfies a quality threshold for subsequent automatic or manual recognition, while satisfying a set of predefined criteria for efficient compression of a corresponding type of biometric data, the determination performed prior to performing data compression on the pre-processed biometric data.

The evaluation module may determine if the set of biometric data satisfies a quality threshold for subsequent automatic or manual recognition, comprising determining if the set of acquired biometric data meets a threshold for data or image resolution. The evaluation module may determine, estimate or measure the resolution of acquired biometric data. This determination can be used to ensure that there is sufficient resolution for automatic or manual matching for performance according to a predefined accuracy level. For example, the evaluation module may detect a face in the image, and measure a distance in pixels between the eyes.

The evaluation module may determine if the set of biometric data satisfies a set of predefined criteria for efficient compression of a corresponding type of biometric data. The evaluation module may determine at least one of: an orientation, a dimension, a location, a brightness and a contrast of a biometric feature within the acquired biometric data. The evaluation module may determine a geometric position of the biometric data in a camera or sensor view. The evaluation module may determine if biometric data (e.g., iris, face or fingerprint) is present within the camera or sensor view, and that the biometric data is sufficiently far from the edge of the camera or sensor view to avoid acquisition of partial data, which may reduce the performance of subsequent automatic or manual recognition processes. In the case of facial biometric data, the evaluation module may detect the presence of a face in the image. If the face is not detected, the evaluation module may determined that the image is not suitable for acquisition.

The evaluation module may determine the geometric orientation of the biometric data. This determination may be used to ensure that the data is oriented within the angular capture range of a subsequent automatic matching algorithm, or within a predetermined angular range of a manual matching process protocol. For example, the evaluation module may detect a face in an acquired image, measure the orientation of the face by recovering the pixel location of the eyes, and use standard geometry to compute the angle of the eyes with respect to a horizontal axis in the image.

The evaluation module may determine a maximum and minimum range of the intensities in the biometric data. This determination may be used to ensure that significant parts of the biometric data are not too saturated or too dark for subsequent automatic or manual recognition. For example, the evaluation module may detecting a face in an acquired image to create an aligned image, compute a histogram of the intensities within the face region, and computing the average of a top percentage and the average of a bottom percentage of the intensities in the histogram, and determine whether the average top percentage is beneath a threshold range and whether the average of the bottom percentage is above a threshold range. Alternatively or in addition, the evaluation module may compute the parameters of an illumination-difference model between a reference image of a face (or other biometric data), and the acquired face (or other biometric data).

The evaluation module may determine if the biometric images include eyes that are open, for example in the case where facial imagery is acquired. The evaluation module may detect the location of the face and eye locations using a face detector. The evaluation module may determine, detect or measure a difference, or distinguish, between the appearance of an eyelid and an eye. The evaluation module may apply a convolution filter that can detect the darker pupil/iris region surrounded by the brighter sclera region.

A guidance module or mechanism of the biometric device may provide, responsive to the determination, guidance to a corresponding subject to aid acquisition of an additional set of biometric data from the subject. The guidance module or mechanism may provide guidance or user prompts via voice instruction, audio signals, video animation, displayed message or illumination signals. The guidance module may provide feedback to the user to position or adjust the user for more optimal biometric capture, such as changing an orientation, changing a position relative to a biometric sensor, or altering illumination to aid biometric acquisition. If an image acquired is determined to be not optimal for compression, the guidance module may prompt the user to perform an action so that there is a higher probability that an optimal image can be acquired.

The evaluation module may determine an amount of distortion that data compression is expected to introduce to the set of biometric data, prior to storing the set of biometric data in a compressed format. The evaluation module may determine, calculate or estimate an expected amount of compression artifacts that compression may introduce to a set of biometric data. The evaluation module may model the compression artifacts on a set of biometric data, measure the artifacts, and compare the measured artifact level to a pre-computed table that lists performance of automatic or manual recognition with respect to the measured artifact level.

The evaluation module may determine whether to pre-process an acquired set of biometric data. A processor of the biometric device may preprocess the acquired set of biometric data prior to data compression, the preprocessing comprising at least one of performing: an image size adjustment, an image rotation, an image translation, an affine transformation, a brightness adjustment, and a contrast adjustment. The processor may perform pre-processing in an attempt to compensate for the sub-optimal acquisition of the biometric data. The processor may determine at least one of: an orientation, a dimension, a location, a brightness and a contrast of a biometric feature within the acquired biometric data. The processor may transform the acquired biometric data, comprising performing at least one of: a size adjustment, rotation, stretch, alignment against a coordinate system, color adjustment, contrast adjustment, and illumination compensation. The processor may perform pre-processing comprising transforming the set of biometric data to minimize least squared error between corresponding features in the transformed set of biometric data and a reference template, prior to data compression.

Referring to (303) and in further details, the evaluation module may classify, based on the determination, whether to retain the set of acquired biometric data for subsequent data compression. The evaluation module may classify, based on the determination, whether to retain the set of pre-processed biometric data for subsequent data compression. The evaluation module may retain the set of biometric data for subsequent data compression if the quality threshold and the set of predefined criteria are satisfied. The evaluation module decide or determine not to retain the set of biometric data for subsequent data compression if any of the quality threshold or the set of predefined criteria are not satisfied.

The processor or a classification module may group the set of biometric data with one or more previously acquired sets of biometric data that are likely to be, expected to be, or known to be from a same subject, and calculating a delta image or delta parameters between at least two of the biometric data sets, for compression. The processor or a classification module may group the set of biometric data with one or more previously acquired sets of biometric data based on the identity of a person expected to have access to certain device or group of devices. The processor or a classification module may group sets of biometric data acquired by the same device or software, or by the same type of device or software.

The processor or a compression module may calculate a delta image/change or delta parameters between the set of biometric data and another set of biometric data, for compression. The processor or compression module may calculate a delta image/change or delta parameters between two sets of biometric data belonging to a same group. The processor or compression module may determine or calculate a delta change or difference between data sets, and may compress the delta change or difference instead of each individual data set. The processor or compression module may determine or calculate a delta change or difference between subsequent sets of data, e.g., according to a transaction sequence. In some embodiments, the processor or compression module may perform a first level of compression on a first portion of the acquired set of biometric data, and a second level of compression on a second portion of the acquired set of biometric data. For example, the level of compression applied on a region of influence for biometric matching may be lower than other regions.

D. Efficient Biometric Deterrent

Biometric Deterrent Data

Embodiments of the present systems and methods may leverage on a class of biometric features referred to as biometric deterrents. Biometric deterrents include biometric features that are acquired by the systems disclosed herein, for the purposes of registering or storing a biometric record of a corresponding transaction with a third party, such as a bank, as a deterrent against a fraudulent transaction from occurring. Not all biometrics are powerful biometric deterrents. For example, to be a strong deterrent, this disclosure recognizes that it may be important that simple manual recognition processes can be used on a biometric data set so that it is clear to a fraudulent user that that user can be recognized by any of their friends and associates, and not just by an anonymous automated recognition process. A face biometric is an example of a powerful deterrent with a high risk mitigation factor. Ironically perhaps, fingerprint and iris biometrics that typically provide more accurate automated match score results, may provide a lower risk mitigation factor in a sense since such biometrics are not easily recognizable by friends and associates.

An acquired biometric data may be of little or no use unless it meets certain criteria that makes the biometric data useful for subsequent automatic or manual biometric recognition. This disclosure provides a number of key quality criteria, that embodiments of the present systems can determine and utilize. These quality criteria include the following, and are discussed earlier within the disclosure: (i) Geometric position of the biometric data in the camera view; (ii) Resolution of the biometric data; (iii) Geometric orientation of the biometric data; (iv) Maximum and minimum range of the intensities in the biometric data; and (v) Determination of whether the eyes are open, if facial imagery is used.

Non-Biometric Deterrent Data

The present systems and methods recognize that other non-biometric data can also be used as a deterrent. For example, credit card companies may print account records and statements in the format of an electronic database or list that is available online, for example, However, such databases or lists are often anonymous and it is difficult even for an authentic user to recall if they performed a particular transaction recorded in such databases or lists. For example, the name of an entity or group (corporate entity or merchant identifier) performing the transaction may be very different to a name (e.g., store name) that the user remembered when executing the transaction. This is particularly the case for mobile vendors (e.g., taxis and water-taxis, for example), which may have no particular name other than anonymous vendor names (e.g. "JK trading Co" with which the user would be unfamiliar). Another aspect is that the list or database is generally displayed as a rapidly-generated, computer-generated data set. A common perception of such lists is that mistakes can be made in the representation of the list. For example, there are occasional news articles describing events where a user receives an excessive utility bill. For example, an article describes a lady who received a bill for 12 qn Euros In another example, a lady in Texas was sent a utility bill for $1.4 m since her utility company was charging $1,000 per Kw hour due to a system glitch, rather than 8-12 cents per hour.

Thus, it is generally accepted that computers can make mistakes, and simply observing an anonymous list that itemizes a credit card number, a merchant name and a transaction value is not a strong deterrent against fraud. Users can flatly deny that they ever made the transaction, at which point it is the word of the credit card company versus the user. Since it may be expensive or difficult to perform a forensic analysis of such an event (e.g. sending a police officer to the store and then to the user for interviews and investigation), banks typically give way and agree to remove a disputed transaction fee from the disputing user's account. This can translate to a large degree of fraud, which may be paid for by large fees and interest rates on credit cards. In addition, banks generally do not want to annoy honest users by interrogating or investigating them on their movements and location at the time of the transaction, since it may appear to the user that they are being treated like a criminal. For an honest user, this is disturbing and provides a significant incentive to move to another bank or service provider.

For this reason, banks are less likely to interrogate or dispute customers on charges that are reported as being fraudulent, and therefore true fraudsters may indeed perform fraud with impunity.

Exploiting Fundamentals of Deterrent

Leveraging on the fundamentals of what a user may perceive as a deterrent, the systems disclosed herein overcomes the issues above to maximize the deterrent effect to potential fraud. Our system may fuse and/or watermark the provenance (e.g., information) of the transaction with acquired biometric data into a single, detailed, monolithic, biometric transactional record that customers, service providers and ultimately the judicial system can comprehend.

Figure 4A:
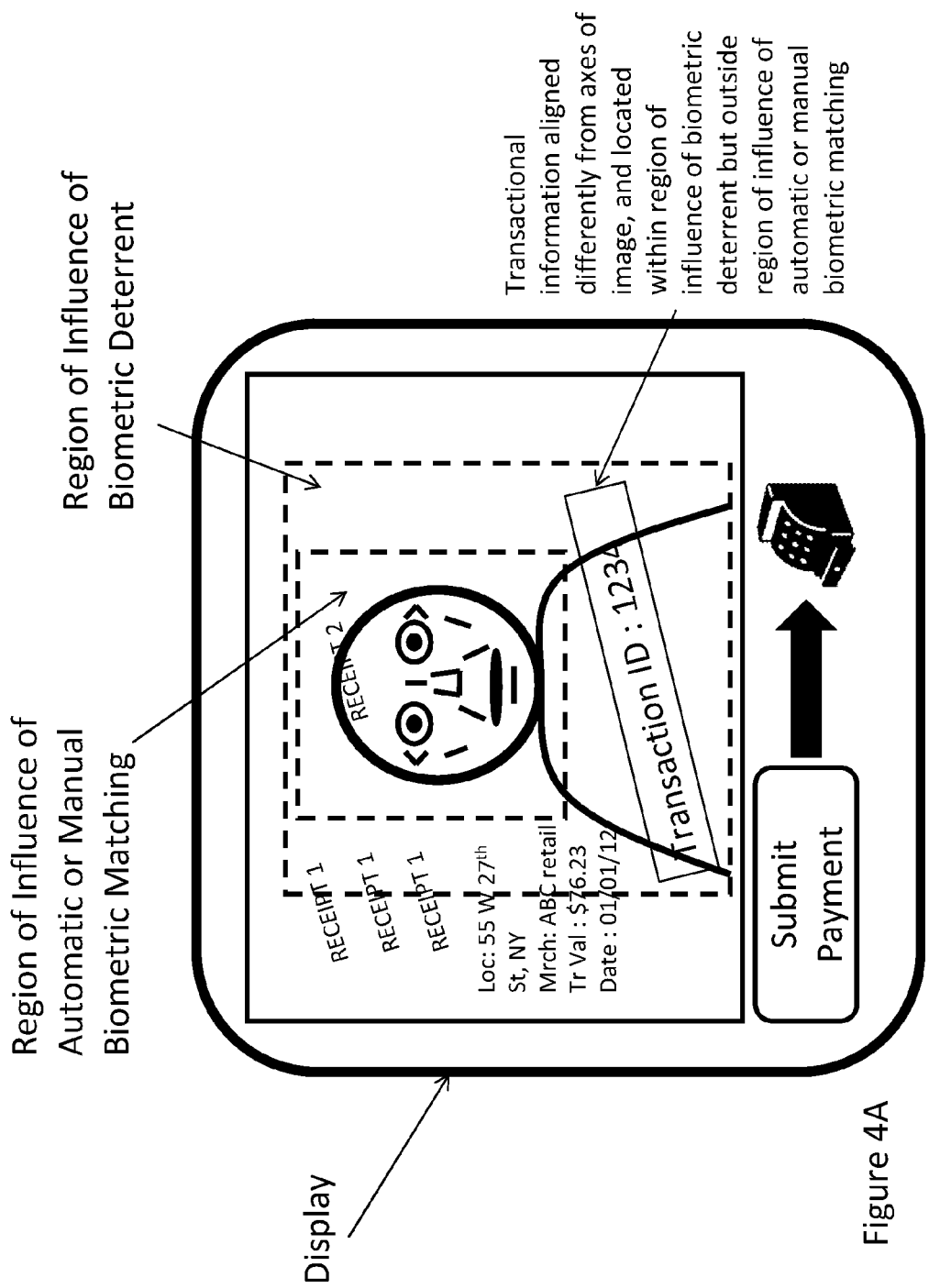
FIG. 4A depicts one embodiment of a system for managing risk via deterrent.

Referring to FIG. 4A, one embodiment of a system, including a display, for managing risk via deterrent is depicted. The system may include a device and processor for acquiring an image of the user, for blending an acquired image of a user of the device during a transaction with information about the transaction, the acquired image being suitable for manual or automatic recognition, and a display for presenting the resultant deterrent image to the user. The system may display an image to a person involved in a transaction, the image designed to perceptibly and convincingly demonstrate to the person involved in the transaction, that components on the image (e.g., acquired biometric data, and data relating to the traction) are purposefully integrated together to provide an evidentiary record of the person having performed and accepted the transaction. The displayed image may incorporate one or more elements designed to enhance deterrent effects, including but not limited to: watermarking, noise, transaction information on a region of influence for biometric deterrent, presentation of a transaction contract or agreement, and an indication that the image will be stored with a third party and accessible in the event of a dispute.

One fundamental aspect of the deterrent method employed by the system is the recording, or the "threat" of recording, of biometric information that can be used for automatic or manual recognition, especially by friends and associates. The deterrent in this case is the potential that people with whom the criminal have an emotional, social and/or professional connection, may see the biometric information (e.g., published in the news), thereby shaming the criminal. The biometric transaction system disclosed herein provides this biometric deterrent by incorporating an image acquisition method, described above in section B.

Another fundamental aspect is associating the acquired biometric data with the non-biometric transaction data closely together and purposefully into a single transaction record, and presenting this to the user. The present methods and systems recognize that the deterrent here is that since the endpoint of the fraud (e.g., the transaction amount) is physically close to the biometric and is therefore associated, the user may be much more aware of the significance of the fraudulent attempt. The biometric transaction system, by putting the transaction value, the transaction location (e.g., store name), and a timestamp close to the biometric can be a strong deterrent for a potential fraudster to actually continue to the point of committing the fraud. In particular, on a processor device, a processor of the system may blend an image of a user of the device acquired during a transaction, with information about the transaction, the acquired image comprising an image of the user suitable for manual or automatic recognition, the information comprising a location determined via the device, an identification of the device, and a timestamp for the image acquisition.

Another fundamental aspect related to this is to create the appearance of at least some portion of the biometric transactional record to be non-automated, or that the merging of information is nontrivial and purposeful to serve as a strong or valid evidentiary tool. In one aspect, the processor may orientate at least some of the non-biometric (transaction) data to be at a different angle from either the vertical or horizontal axis of the biometric image data, for example as shown in FIG. 4A. By purposefully orienting the data at a different angle to the biometric data, the system provides the user a perception that considerable (e.g., computing) effort has gone on into orienting and fusing the data, which suggests that significant effort has been expended in getting the transaction data correct in the first place. In other words, the user is likely to have more confidence in a rotated set of text compared to a non-rotated set, and therefore the former can provide a stronger deterrent.

Yet another fundamental aspect is related to an earlier-described aspect. The processor may segregate the biometric image into several regions, for example as shown in FIG. 4A. A first region is the region of influence of automatic or manual biometric matching or recognition. This is the area that algorithms or humans would inspect in order to recognize the transaction individual. This is typically the face region, but may include a small border around the face, e.g., to ensure that subsequent image processing algorithms are not confused by high-contrast text features just next to the face.

A second region is the region of influence of biometric deterrent. This region is outside the region of influence of the automatic or manual matching, yet is close enough that text or non-biometric information residing within is still perceived by the user to be associated very closely to the biometric data. The processor, in generating the blended image, may place at least some key non-biometric transactional data within the region of influence of biometric deterrent, so that it serves as a strong deterrent as discussed.

In most implementations, the processor may exclude transactional information from the region of influence of automatic or manual processing. While locating the information within this region may serve as a strong deterrent since it is closer to the biometric data, it can also serve to at least partially obscure the actual biometric data, which can hinder the automatic or manual recognition process. The region of influence of biometric deterrent may includes some portion of the region of influence of automatic or manual matching, and in the case of facial imagery, the region of influence of biometric deterrent may extend below the face of the user. In particular, the chest of the person is physically connected to the face, and therefore has more deterrent influence (for example, color and type of clothes) as compared to the background scene which lies to the left, right and above the region of influence of automatic or manual biometric matching.

In certain embodiments, the biometric transaction device may display (e.g., via a display of the device) the location, a device ID, the date and the transaction value blended with the biometric data, for example as shown in FIG. 4A. All or a subset of this information may be included in the displayed blended image.

The biometric transaction device may, in a further aspect, provide a strong deterrent by creating and displaying the blended image as though it is a monolithic data element, to be stored. This is as opposed to a set of fragmented data elements. Fragmented data elements have much less deterrent value, since there is less conviction on behalf of the user that the data is in fact connected and/or accurate. The biometric transaction device can convincingly convey a perception of a monolithic data element in at least three ways; first, once the processor fuses the biometric data with the non-biometric data as discussed, the processor can add image noise.

The image noise may serve at least two purposes; first it further links the non-biometric data and the biometric data by virtue of the fact they now share a common feature or altering element, which is the noise. Secondly, the noise introduces the concept of an analog monolithic element, which may be pervasively embedded across or intertwined with the blended image, as oppose to a separable digital data element. In particular, many users are used to digital manipulation (e.g., of the positions) of synthetic blocks of text and data (e.g. Microsoft Powerpoint slides) and therefore the deterrent effect of a close association to such text and data is minimized since the perception to the user is that such association may be easily changed. However, if noise is added, then the text and data become non-synthetic in appearance and nature, and appears to the user that the text and data cannot easily be manipulated since it appears as though there is an analog signal layer embedded throughout the image (e.g., almost like adding a separate signal layer), giving more credibility to the integrity of the underlying signal layer which in this case is the biometric and non-biometric data.

Another method of making the data elements appear as though they are a single monolithic data element is by inserting a watermark throughout the image. The processor can insert the watermark at an angle that is different to that of the vertical or horizontal axes of the data element, for example as shown in FIG. 4A, for the same reason of inserting at least some of the non-biometric transaction information at an angle, as discussed earlier. The watermark has similar benefits to the addition of noise in that it purposefully affects and associates both the non-biometric and biometric data. It also has the advantage however of conveying a further deterrent effect since text or imagery can be displayed as part of the watermarking. By way of illustration, the processor may introduce watermarking that includes any one or more of the words "Audit", "Receipt" or "Biometric Receipt", or similar words, to further reinforce the deterrent effect.

The processor may blend the watermark (or noise, transaction data, etc) into the image in at least two different blending levels. For example, a blending level may be defined as opacity, or the extent to which an element (e.g., watermark, noise) appears within the monolithic data element or not. Blending to a 100% level or opacity may mean that the watermark completely obscures any other co-located data element, whereas blending to 0% means that the watermark is not visible at all relative to a co-located data element. The processor may blend watermarking (and optionally noise) with a smaller blending value within the region of influence of automatic or manual biometric matching, compared to the blending value within the region of influence of the biometric deterrent. This serves to reduce the corruption of the biometric data by the watermark (or other data element such as noise), which may affect automatic or manual biometric matching.

The display of the biometric transaction device may present or display an icon (e.g., next to a "SUBMIT PAYMENT" button) that indicates that the monolithic data element is to be sent to a third party (e.g., a bank) for storage and possible retrieval in case the user attempts to commit fraud or dispute the transaction. An example is shown in FIG. 4A. By way of illustration, icons that may be effective deterrents include the picture of a cash register or bank. This encourages the perception to the user that a copy of the receipt will be stored in a physical location that a human or other entity can access and view as an evidentiary record, rather than stored in an anonymous database in a remote server.

Figure 4B:
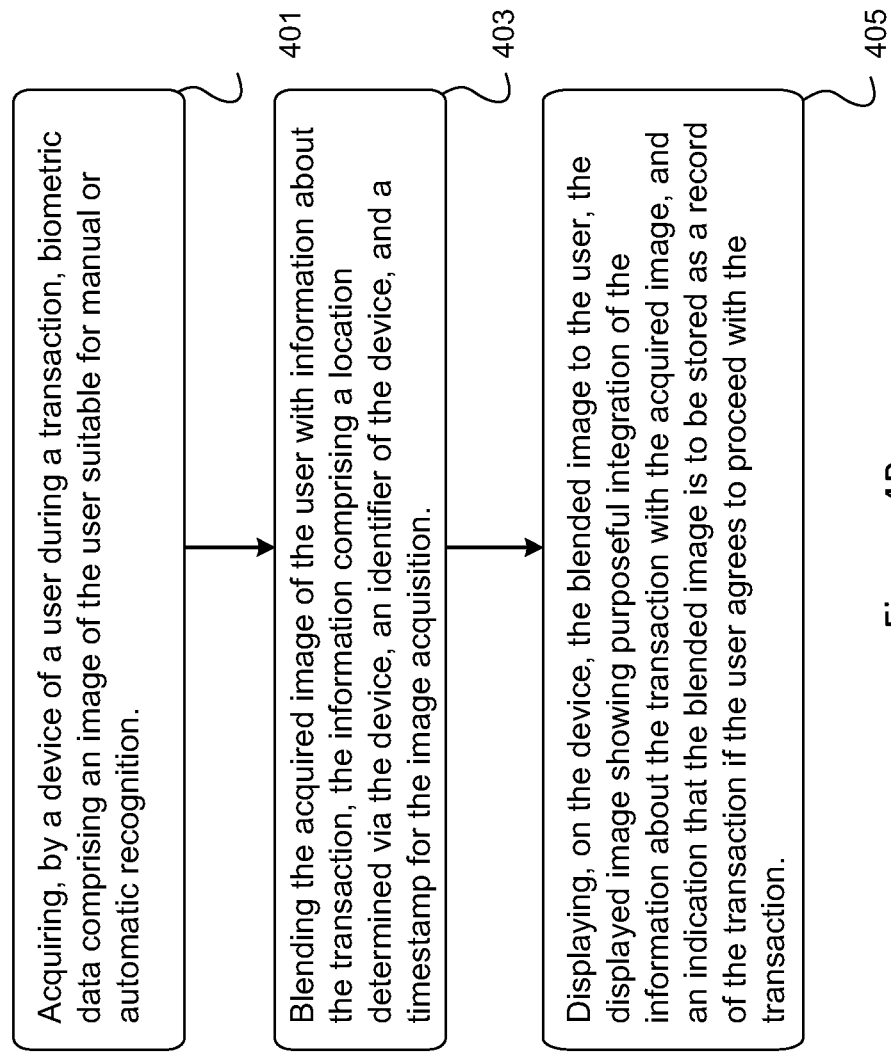
FIG. 4B depicts one embodiment of a method for managing risk in a transaction with a user.

Referring to FIG. 4B, one embodiment of a method for managing risk in a transaction with a user, which presents to the user, with sufficient detail for inspection, an image of the user blended with information about the transaction, is depicted. The method may include acquiring, by a device of a user during a transaction, biometric data comprising an image of the user suitable for manual or automatic recognition (401). The device may blend the acquired image of the user with information about the transaction (403). The information may include a location determined via the device, an identifier of the device, and a timestamp for the image acquisition. The device may display the blended image to the user (405). The displayed image may show purposeful integration of the information about the transaction with the acquired image, and an indication that the blended image is to be stored as a record of the transaction if the user agrees to proceed with the transaction.

Referring to (401) and in further details, a device of a user acquires, during a transaction, biometric data comprising an image of the user suitable for manual or automatic recognition. The device may include a mobile device of the user, or a transaction device (e.g., ATM machine, payment terminal) at the corresponding point of sale or point of transaction. The device may acquire the image of the user based on one or more criteria for efficient image compression. The device may selectively acquire the biometric data based on the one or more biometric quality criteria discussed above in connection with section C and earlier in this section. The device may selectively acquire the biometric data that satisfies one or more of the biometric quality criteria described earlier in this section, to provide an effective biometric deterrent.

The device may perform liveness detection of the user during the transaction. For example, the device may verify liveness prior to acquiring an image of the user based on one or more criteria for efficient image compression or to provide an effective biometric deterrent. The device may introduce liveness detection as a feature or step to improve a security metric of the transaction for authorization, for example, as discussed in section B.

Referring to (403) and in further details, the device may blend the acquired image of the user with information about the transaction. The blending and any associated processing of the image and data may be performed by a processor of the device, or a processor (e.g., of a point-of-transaction device) in communication with the device. The information may include a location determined via the device (e.g., GPS information, or a store/vendor/provider name provided by a point of transaction device), an identifier of the device (e.g., a device ID of the user's mobile device, or of a point of transaction device), and a timestamp (e.g., time, date, year, etc) for the image acquisition. The information may include a value or subject of the transaction, for example, the value and/or description of a purchase or service, or a cash value of a deposit, withdrawal or redemption. The information may include a username or user ID of the person performing the transaction. The information may include information about a payment method, such as partial information of a credit card.

The processor may blend the acquired image of the user with information about the transaction into a single alpha-blended image. The blending may be performed on a pixel-by-pixel basis, for example, generating a single JPEG image. The processor may blend the information about the transaction on a portion of the acquired image proximate to but away from at least one of: a face and an eye of the user. For example, the processor may blend the information about the transaction within a region of influence of biometric deterrent that excludes a face of the user. The processor may exclude the information from a region of influence for biometric matching that includes the face.

The processor may incorporate, in the blended image, watermarking or noise features that permeate or are pervasive across the image of the user and the information about the transaction, on at least a portion of the image presented. The processor may incorporate watermarking and/or noise at a perceptible but low level of opacity relative to co-located image elements. The processor may incorporate watermarking comprising text such as "receipt" or "transaction record". The processor may incorporate watermarking to comprise text or a pattern that is in a specific non-horizontal and/or non-vertical orientation. The processor may incorporate watermarking and/or noise away from the region of influence for biometric matching. The processor may incorporate a lower level of watermarking and/or noise in the region of influence for biometric matching relative to other regions.

Referring to (405) and in further details, the device may display the blended image to the user. The device may present the blended image to the user via a display of the device during the transaction. The displayed image may show purposeful and/or perceptible integration of the information about the transaction with the acquired image, and an indication that the blended image is to be stored as a record of the transaction if the user agrees to proceed with the transaction. The presented image may comprise a deterrent for fraud, abuse or dispute. The presented image may serve as a convincing evidentiary record to deter fraud, abuse or dispute.

The presented image may include an image of the user's face with sufficient detail for inspection by the user prior to proceeding with the transaction. The presented image may include the information about the transaction in textual form with sufficient detail for inspection by the user prior to proceeding with the transaction. The presented image may include the information about the transaction in textual form having a specific non-horizontal orientation and having sufficient detail for inspection by the user prior to proceeding with the transaction. The presented image may further display at least a portion of the information about the transaction in textual form using at least one of: a uniform font type, a uniform font size, a uniform color, a uniform patterned scheme, a uniform orientation, a specific non-horizontal orientation, and one or more levels of opacity relative to a background.

The presented image may include a region of influence of biometric deterrent within which the information about the transaction is purposefully integrated, and a region of influence of biometric matching that excludes the information. The presented image may include watermarking or noise features that permeate or is pervasive across the image of the user and the information about the transaction, on at least a portion of the presented image. The presented image may include watermarking or noise features that uniformly distorts or alters co-located image elements such as text and biometric imagery. The presented image may include watermarking or noise features that convey a purposely integration of the blended image into a single monolithic, inseparable data record or evidentiary record.

The display may present to the user an indication or warning that the presented image is to be stored as a record of the transaction if the user agrees to proceed with the transaction. The display may present an icon or widget comprising a picture, image, text and/or indication that the presented image will be stored as a transaction and evidentiary record. For example, the display may present an icon or widget with a picture that indicates to the user that acceptance of the transaction will be accompanied by an action to store the displayed image with a third party as a transaction and evidentiary record (e.g., for possible future retrieval in the event of fraud or dispute). The icon or widget may be located near or associated with a selectable widget (e.g., button) that the user can select to proceed with the transaction.

The display may present to the user an agreement of the transaction for inspection or acceptance by the user. The agreement may include contractual language of any length, for example a concise statement that the user agree to make a payment or proceed with the transaction. The agreement may comprise a partial representation of the transaction agreement, or a widget (e.g., link or button) that provides access to the transaction agreement. The agreement may include a statement that the user agrees to have the user's imagery stored as a transaction record.

The system may store the blended image on at least one of: the device and a server. The user's device, or a point of transaction device, may send the blended image to a database (e.g., of a third party such as a bank) for storage. The system may process and/or compress the blended image according to any of the compression techniques described in section C.

Having described certain embodiments of the methods and systems, it will now become apparent to one of skill in the art that other embodiments incorporating the concepts of the invention may be used. It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method of managing difficulty-of-use and security for a transaction with a user, the method comprising:
   (a) determining, by a transaction manager operating on a computing device in use for the transaction with the user and in communication with one or more devices providing different security measures available for securing the transaction, a range of possible steps for the transaction corresponding to the security measures available for the transaction, wherein at least one of the one or more devices is enabled to acquire a biometric of the user as a security measure;
   (b) identifying a threshold for a security metric to be exceeded for authorizing the transaction, wherein the security metric is to be determined based on successful performance of a combination of steps selected for the transaction;
   (c) identifying, by the transaction manager, a plurality of combinations of steps from the range of possible steps for the transaction, that would each yield a corresponding security metric that exceeds the identified threshold if the performance of the corresponding combination of steps is successfully completed;
   (d) calculating a corresponding difficult-of-use for completing each of the identified combinations of steps that would yield the corresponding security metric that exceeds the identified threshold if the performance of the corresponding combination of steps is successfully completed;
   (e) selecting, for completion by the user in the transaction by using the one or more devices, a first combination of steps from the identified combinations of steps, that has a least calculated difficulty-of-use among those calculated for the identified combinations of steps; and
   (f) allowing the transaction to complete if the user successfully completes the first combination of steps.

2. The method of claim 1, wherein each of the steps from the identified combinations of steps is assigned a score for difficulty-of-use based on at least one of: an amount of action expected from the user, an amount of attention expected from the user, and an amount of time expected of the user, in performing the respective step.

3. The method of claim 1, comprising modifying remaining steps of the transaction, the modification responsive to a failure to satisfy a requirement of at least one step of the selected first combination of steps.

4. The method of claim 1, comprising identifying the threshold for the security metric based on at least one of: a value of the transaction, risk associated with a person involved in the transaction, risk associated with a place or time of the transaction, risk associated with a type of the transaction, or security measures available for the transaction.

5. The method of claim 1, wherein (e) comprises selecting, from the identified combinations of steps, the first combination of steps that has the least calculated difficulty-of-use as a first priority, and that yields a security metric that exceeds the identified threshold by a most amount as a second priority.

6. The method of claim 1, comprising updating the security metric responsive to a failure to satisfy a requirement of at least one selected step.

7. The method of claim 1, comprising updating the security metric responsive to a modification in remaining steps of the transaction.

8. The method of claim 1, comprising acquiring biometric data as part of the selected first combination of steps, the biometric data comprising at least one of: iris, face, voice, palm print, palm vein, or fingerprint.

9. The method of claim 1, comprising acquiring biometric data as part of the selected first combination of steps, the biometric data for at least one of liveness detection and biometric matching.

10. The method of claim 1, comprising acquiring biometric data as a prerequisite of at least one step of the selected first combination of steps.

11. The method of claim 1, comprising performing biometric matching as a prerequisite of at least one step of the selected first combination of steps.

12. The method of claim 1, comprising at least requiring a step for acquiring a first type of biometric data, in the event of a failure to satisfy a requirement of the selected first combination of steps.

13. The method of claim 1, comprising at least requiring a step for acquiring a second type of biometric data if a first type of biometric data is unavailable, of insufficient quality, or fails a liveness detection or biometric matching.

14. The method of claim 1, comprising performing liveness detection as part of the selected first combination of steps.

15. The method of claim 1, comprising performing liveness detection as a prerequisite of at least one step of the selected first combination of steps.

16. The method of claim 1, comprising at least requiring a step for performing liveness detection, in the event of a failure to satisfy a requirement of the selected first combination of steps.

17. The method of claim 1, comprising performing a deterrence activity as part of the selected first combination of steps.

18. The method of claim 1, comprising performing a deterrence activity as a prerequisite of at least one step of the selected first combination of steps.

19. The method of claim 1, comprising at least requiring a deterrence activity, in the event of a failure to satisfy a requirement of the selected first combination of steps.

20. A system for managing difficulty-of-use and security for a transaction with a user, the system comprising:
circuitry configured to implement a transaction manager operating on a computing device in use for the transaction with the user, the circuitry in communication with one or more devices providing different security measures available for securing the transaction, the circuitry further configured for:
determining, by the transaction manager, a range of possible steps for the transaction corresponding to the security measures available for the transaction, wherein at least one of the one or more devices is enabled to acquire a biometric of the user as a security measure;
identifying a threshold for a security metric to be exceeded for authorizing the transaction, wherein the security metric is to be determined based on successful performance of a combination of steps selected for the transaction;
identifying, by the transaction manager, a plurality of combinations of steps from the range of possible of steps for the transaction, that would each yield a corresponding security metric that exceeds the identified threshold if the performance of the corresponding combination of steps is successfully completed;
calculating a corresponding difficultly-of-use for completing each of the identified combinations of steps that would yield the corresponding security metric that exceeds the identified threshold if the performance of the corresponding combination of steps is successfully completed;
selecting, for completion by the user in the transaction by using the one or more devices, a first combination of steps from the identified combinations of steps, that has a least calculated difficulty-of-use among those calculated for the identified combinations of steps; and
allowing the transaction to complete if the user successfully completes the first combination of steps.

\* \* \* \* \*